United States Patent
McFadden et al.

(10) Patent No.: US 12,551,491 B1
(45) Date of Patent: Feb. 17, 2026

(54) DOSAGE REGIMENS FOR BENZGALANTAMINE

(71) Applicant: Alpha Cognition Inc., Vancouver (CA)

(72) Inventors: Michael McFadden, Frisco, TX (US); Denis G. Kay, Stanhope (CA)

(73) Assignee: Alpha Cognition Inc., Vancouver (CA)

( * ) Notice: Subject to any disclaimer, the term of this patent is extended or adjusted under 35 U.S.C. 154(b) by 0 days.

(21) Appl. No.: 19/278,636

(22) Filed: Jul. 23, 2025

(51) Int. Cl.
*A61K 31/55* (2006.01)

(52) U.S. Cl.
CPC .................... *A61K 31/55* (2013.01)

(58) Field of Classification Search
CPC ...................................... A61K 31/55
See application file for complete search history.

(56) References Cited

U.S. PATENT DOCUMENTS

| | | | | |
|---|---|---|---|---|
| 6,150,359 | A * | 11/2000 | Barvian | C07D 471/04 546/122 |
| 6,316,439 | B1 * | 11/2001 | Kosley, Jr | C07D 491/10 540/581 |
| 6,323,195 | B1 * | 11/2001 | Kosley, Jr | A61P 25/28 540/487 |
| 6,323,196 | B1 * | 11/2001 | Kosley, Jr | C07D 491/10 540/581 |
| 9,763,953 | B2 | 9/2017 | Maelicke | |
| 10,265,325 | B2 | 4/2019 | Maelicke | |
| 11,077,119 | B2 | 8/2021 | Maelicke | |
| 11,795,176 | B2 | 10/2023 | Sancilio | |
| 12,157,743 | B2 | 12/2024 | Sancilio | |
| 12,208,167 | B1 * | 1/2025 | McFadden | A61K 9/2886 |
| 2003/0060423 | A1 | 3/2003 | Plata-Salaman | |
| 2006/0034937 | A1 | 2/2006 | Patel | |
| 2021/0322437 | A1 | 10/2021 | Maelicke | |
| 2025/0248941 | A1 | 8/2025 | McFadden et al. | |

FOREIGN PATENT DOCUMENTS

| | | | | |
|---|---|---|---|---|
| WO | WO 2007/039138 | A1 | 4/2007 | |
| WO | WO-2009127218 | A1 * | 10/2009 | A61P 43/00 |
| WO | WO-2014016430 | A1 * | 1/2014 | A61P 39/02 |
| WO | WO 2022/025785 | A1 | 2/2022 | |
| WO | WO 2022/150917 | A1 | 7/2022 | |
| WO | WO 2022/236396 | A1 | 11/2022 | |
| WO | WO 2023/092231 | A1 | 6/2023 | |
| WO | WO 2024/239120 | A1 | 11/2024 | |
| WO | WO 2025/166455 | A1 | 8/2025 | |

OTHER PUBLICATIONS

Battacharya et al., "Nasal Application of the Galantamine Pro-drug Memogain Slows Down Plaque Deposition and Ameliorates Behavior in 5X Familial Alzheimer's Disease Mice", Journal of Alzheimer's disease, 2015, 46: 123-136.
Bakker et al., "Safety, pharmacokinetics, and pharmacodynamics of Gln-1062, a prodrug of galantamine", Alzheimer's Dementia, 2020, 6(1): e12093 (in 10 pages).
Baakman et al., "First in human study with a prodrug of galantamine: Improved benefit-risk ratio?", Alzheimer's & Dementia, Jan. 2, 20160; 2(1): 13-22.
Kay et al., "ALPHA-1062 Reduces Phospho-Tau Deposition, is Neuroprotective and Enhances Restoration of Sensory, Motor and Cognitive Performance in a Preclinical Model of Moderate Traumatic Brain Injury", Military Health System Research Symposium 2023 (MHSRS 2023); Abstract ID: MHSRS-23-10468.
Kay DG et al., "A Quantitative-EEG Assessment of Alpha-1062, a Novel Pro-Drug of Galantamine for the Treatment of Mild to Moderate Dementia Associated with Alzheimer's Disease", Alzheimer's & Dementia 2022; 18(Suppl. 10): e068223.
Kay DG et al., "Multiple Ascending Dose Study with A Prodrug of Galantamine: Evidence of DiminishedSide Effects.", The Journal of Prevention of Alzheimer's Disease—JPAD @ vol. 3, Supplement 1, 2016, P3-26.
Kay DG et al., "Multiple Ascending Dose Study with A Prodrug of Galantamine: A Pharmaco-EEG Analysis With Evidence of Positive Effects On Cognition", The Journal of Prevention of Alzheimer's Disease—JPAD@ vol. 4, No. 4, 2017, LBP21.
Maelicke et al., "Memogain is a Galantamine Pro-drug having Dramatically Reduced Adverse Effects and Enhanced Efficacy". Journal of Molecular Neuroscience, Jan. 1, 2010, vol. 40, No. 1-2135-137.
Sornsuvit, C et al. (2020) "Pharmacokinetics of 8 mg galantamine hydrobromide prolonged-release capsules under fed and fasting conditions," The Journal of Pharmaceutical Sciences: vol. 44(1): 23-29.
Van Kampen et al."Neurogenic effects of the galantamine prodrug, GLN-1062a", Alzheimer's & Dementia, 2012, P2-369.
Van Kampen et al., "Memogain Regulates Tau Phosphorylation In An Immunotoxin Model Of Cholinergic Cell Loss", Alzheimer's & Dementia 2018, P4-022.
Alpha Cognition Inc.—Drug Label Information: Zunveyl, benzgalantamine tablet, delayed release, Feb. 18, 2025, (34 pages).

* cited by examiner

*Primary Examiner* — Kevin E Weddington
(74) *Attorney, Agent, or Firm* — Knobbe, Martens, Olson & Bear, LLP

(57) ABSTRACT

A method of effectively reducing the pharmaceutical load of galantamine relative to oral administration of galantamine or a method of effectively administering galantamine in a subject in need of galantamine therapy for the treatment of mild to moderate dementia of the Alzheimer's type, the methods including orally administering a dosage form of benzgalantamine gluconate according to the following dosage regime: administering a starting dosage of 5 mg benzgalantamine gluconate, twice daily, for a minimum of four weeks.

21 Claims, 4 Drawing Sheets

DOSAGE REGIMENS FOR BENZGALANTAMINE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The invention is in the field of pharmaceutical dosing regimens for effectively administering galantamine. More specifically, the invention is in the field of dosing regimens designed to reduce the pharmaceutical load of galantamine and otherwise improve the effective administration of galantamine by orally administering benzgalantamine.

Description of the Related Art

Galantamine, chemically known as (4aS,6R,8aS)-3-Methoxy-11-methyl-4a,5,9,10,11,12-hexahydro-6H-benzofuro[3a,3,2-ef][2]benzazepin-6-ol (CAS 357-70-0), is a tertiary amide, belonging to the phenanthrene chemical class, which occurs naturally in bulb plants and can also be produced synthetically (José Marco-Contelles et al. "Synthesis and Pharmacology of Galantamine" Chem. Rev.; 2006; 106:116-133). Galantamine is an inhibitor of the acetylcholinesterase (AChE) and further enhances cholinergic activity by non-competitive, allosteric modulation of the nicotinic acetylcholine receptors (nAChR), in particular the $\alpha 7$ subtype of nAChR. This slows the degradation of acetylcholine (ACh) and enhances the responsiveness of the nAChR to existing ACh. This mechanism of action results in an improvement of the cholinergic transmission which is, e.g., impaired in Alzheimer's disease.

Galantamine was introduced as a drug for Alzheimer's disease in 2000 and now is approved in several countries worldwide. The approved indication is generally mild to moderate dementia of Alzheimer's type. It is currently available as an immediate release tablet, oral solution and extended-release capsule and tablet. The branded form is marketed as RAZADYNE® ER in the U.S., and as REMINYL® elsewhere. Several generic equivalents have been approved by the Food and Drug Administration (FDA) and in several European countries by the European Medicines Agency (EMA). REMINYL® and RAZADYNE® ER extended-release capsules and tablets were developed to reduce the dosage regime to one capsule daily, while bioequivalence to twice-daily immediate-release tablets is maintained.

Through their primary action, cholinomimetics, such as galantamine, increase enteric increased cholinergic activity. Like other cholinesterase inhibitors, the most common adverse effects of galantamine ($\geq 5\%$ of adverse effects), in particular when applied orally, occur within the gastrointestinal tract (GIT), including nausea, vomiting, diarrhea. Other common side effects include dizziness, headache, and decreased appetite. The most common adverse reactions resulting in discontinuation of therapy ($\geq 1\%$) in galantamine-treated patients from double-blind clinical trials were nausea (6.2%), vomiting (3.3%), decreased appetite (1.5%), and dizziness (1.3%).

During oral therapy with galantamine, the initial dose administered is therefore low and then subsequently increased over a period of several weeks, adjusted according to the level of side effects perceived as acceptable by the patient. As a consequence of the side effects, many patients thus never reach the therapeutically most effective dose or discontinue therapy altogether. The majority of adverse reactions related to the gastrointestinal tract occurred during the dose-escalation period. In those patients who experienced the most frequent adverse reaction, nausea, the median duration of the nausea was 5-7 days.

Galantamine has been chemically modified to improve its lipophilicity and thus its passage through the blood-to-brain barrier (BBB) and mucosal tissue. Galantamine derivatives and pro-drugs are described in EP 1940817 B1, WO 2009/127218 A1 and US 2009/0253654 A1.

The galantamine prodrug benzgalantamine, also termed galantamine benzoate or ALPHA-1062, chemically known as ((4aS,6R,8aS)-4a,5,9,10,11,12-hexahydro-3-methoxy-11-methyl-6H-benzofuro[3a,3,2-ef][2]benzazepin-6-benzoate gluconate), is a benzoic ester of galantamine that exhibits limited or no pharmacological activity at therapeutic doses, until it is cleaved by esterase activity or in acidic conditions, which results in release of galantamine.

WO 2014/016430 discloses transmucosal administration of benzgalantamine via intranasal, buccal or sublingual modes, in addition to various formulations and salts of benzgalantamine, including for example lactate, gluconate, maleate and saccharate salts. Further, nasal application of benzgalantamine in comparison to oral application of Galantamine was evaluated in a study by Baakman et al (2016). Therein, nasal application of benzgalantamine resulted a lower incidence of gastrointestinal adverse effects such as nausea and vomiting in comparison to oral administration of Galantamine. Reduced side effects of benzgalantamine in comparison to Galantamine were also observed in a multiple ascending dose study of benzgalantamine administered by intranasal application (Bakker et al., 2020). In terms of the daily dosing of benzgalantamine versus oral galantamine, benzgalantamine was well tolerated up to a twice daily dose of 22 mg showing a reduced incidence of GI side effects relative to a single 16 mg dose of oral galantamine. No gastrointestinal adverse events were observed at a twice daily dose of 11 mg benzgalantamine.

Often drug solutions or emulsions are used for transmucosal administration of drugs, such as via the nasal but also via the sublingual or buccal route. Thereby, the use of drug solutions has several disadvantages over solid dosage forms for oral application, including the need for a highly soluble drug to achieve effective single dose levels, as the volume that can be applied to the nasal or oral cavity in a single dosing event is limited. Further, often long-term stability issues of drug solutions occur, thus requiring for example reconstitution directly before administration or additional stabilizing and viscosity control agents within the solution. Salts of benzgalantamine and stability issues of their solutions are disclosed in WO 2014/016430. Highly concentrated solutions of benzgalantamine gluconate were metastable, with the salts converting to less-soluble stable salt forms upon storage, requiring subsequent heating of the solution and precautions for avoiding precipitation upon storage.

In comparison to drug solutions or suspensions, solid dosage forms for oral application, such as tablets provide high stability and easier and straightforward manufacturing. However, the advantageous properties of the prodrug benzgalantamine over Galantamine, such as reduced gastrointestinal side effects due to pharmacological inactivity prior to cleavage, are typically difficult to obtain when administered orally as tablets. This is because the pro-drug benzgalantamine is an ester that has been found to be instable in acidic environments (such as exists in the stomach) and is cleaved enzymatically in many tissues. The cleavage of benzgalantamine results in the presence of Galantamine in the stomach, provoking gastrointestinal adverse effects. In general, the occurrence of adverse effects such as gastrointestinal adverse effects can reduce adherence to oral therapy. It is likely that adherence can be improved by reduced or less severe adverse effects.

It is known in the prior art that dosage forms for oral application, such as tablets and capsules can be coated with an acid resistant, enteric coating, thereby preventing dissolution of the tablet or capsule in the acidic environment and thus preventing release and cleavage of the drug in the stomach. The possibility of employing enteric coated tablets comprising benzgalantamine (ALPHA-1062) is disclosed in WO 2014/016430. However, no details are provided regarding particular formulations, excipients, methods of manufacture, pH values at which release is intended, or any reports of efficacy or potential side effects.

Despite the provision of various formulations of galantamine and benzgalantamine and salts thereof in the prior art, further developments are required for improved, more efficacious oral formulations for delivering galantamine to a subject, that are clinically effective and afford reduced side effects.

SUMMARY OF THE INVENTION

Disclosed herein is a method of effectively reducing the pharmaceutical load of galantamine relative to oral administration of galantamine in a subject in need of galantamine therapy for the treatment of mild to moderate dementia of the Alzheimer's type, the method including orally administering a dosage form of benzgalantamine gluconate according to the following dosage regime: administering a starting dosage of 5 mg benzgalantamine gluconate, twice daily, for a minimum of four weeks.

In some examples, the method further includes administering a maintenance dosage of 10 mg benzgalantamine gluconate, twice daily, after the starting dosage has been administered for the minimum of four weeks.

In some examples, the 10 mg of benzgalantamine gluconate is administered for at least four weeks.

In some examples, the method further includes administering a maximum dosage of 15 mg benzgalantamine gluconate, twice daily after administering the 10 mg benzgalantamine gluconate.

In some examples, a steady state of galantamine is achieved within one week.

In some examples, the dosage form is a tablet.

In some examples, the dosage form is a delayed release tablet.

In some examples, the dosage form includes calcium silicate.

In some examples, the dosage form includes at least one of colloidal silicon dioxide, mannitol, and methacrylic acid.

In some examples, the delayed release tablet comprises an enteric coating including methacrylic acid.

In some examples, the enteric coating includes a methacrylic acid-ethyl acrylate copolymer.

Some embodiments relate to a method of effectively administering galantamine to a subject in need of treatment for mild to moderate dementia of the Alzheimer's type, the method including orally administering a dosage form of benzgalantamine gluconate according to the following dosage regime: administering a starting dosage of 5 mg benzgalantamine gluconate, twice daily, for a minimum of four weeks.

In some examples, the method further includes administering a dosage of 10 mg benzgalantamine gluconate, twice daily, after the starting dosage has been administered for the minimum of four weeks.

In some examples, the method further includes administering a maximum dosage of 15 mg benzgalantamine gluconate, twice daily.

In some examples, a steady state of galantamine is achieved within one week.

In some examples, the dosage form is a tablet.

In some examples, the dosage form is a delayed release tablet.

In some examples, the dosage form includes calcium silicate.

In some examples, the dosage form includes at least one of colloidal silicon dioxide, mannitol, and methacrylic acid.

In some examples, the delayed release tablet includes an enteric coating comprising methacrylic acid.

In some examples, the enteric coating includes a methacrylic acid-ethyl acrylate copolymer.

BRIEF DESCRIPTION OF THE DRAWINGS

The disclosure is demonstrated by way of the figures disclosed herein. The figures provide support for a detailed description of potentially preferred, non-limiting embodiments of the disclosure.

DETAILED DESCRIPTION OF THE PREFERRED EMBODIMENT

Figure 1:
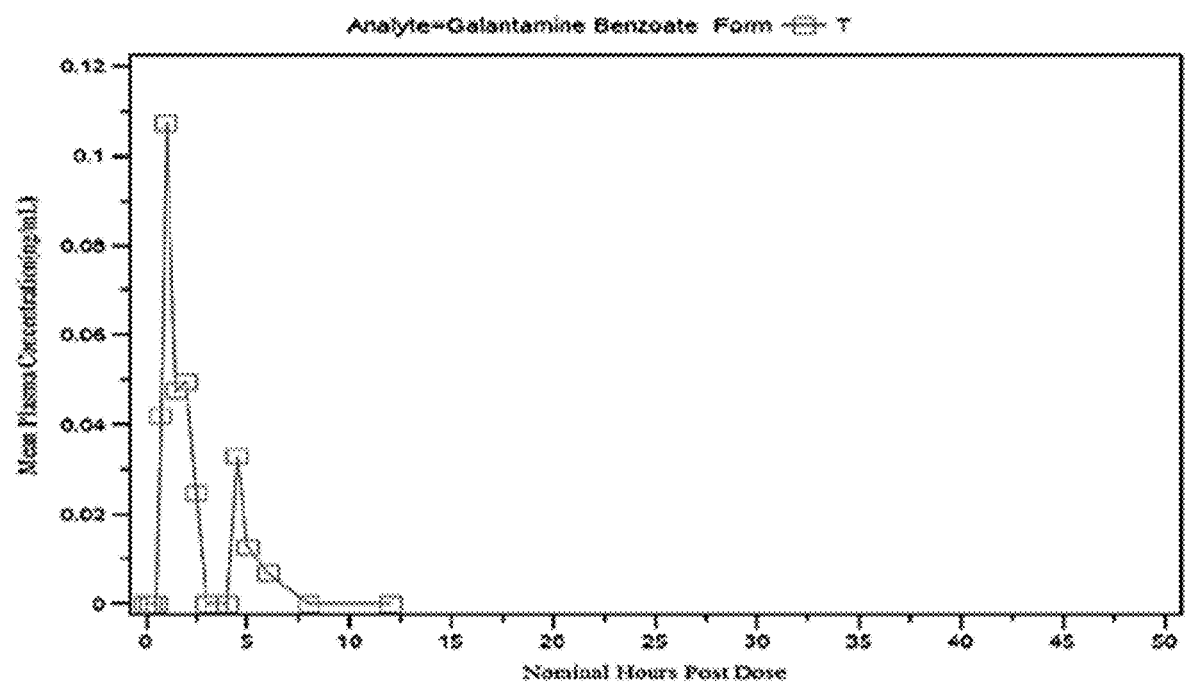
FIG. 1: Mean plasma benzgalantamine concentrations vs. Time Plots-Linear Scale. Clinical study evaluating the disclosed Galantamine Benzoate (benzgalantamine, ALPHA-1062) delayed release 5 mg tablet (T, Test) vs. Galantamine Hydrobromide 4 mg tablet (R, Reference).

In light of the prior art, the technical problem underlying the disclosed methods was the provision of pharmaceutical compositions comprising benzgalantamine (ALPHA-1062) for oral administration that do not exhibit the disadvantages of the prior art.

One object of the disclosed methods was to provide improved or alternative means for devising pharmaceutical compositions comprising benzgalantamine for oral delivery, that result in reduced adverse effects, in particular reduced gastrointestinal adverse effects, while demonstrating high bioavailability.

Another object of the disclosed methods was to provide improved or alternative means of galantamine administration, that are clinically effective and result in reduced adverse effects, in particular reduced gastrointestinal adverse effects, while demonstrating high bioavailability. Considering that the active metabolite of benzgalantamine is galantamine itself, one aim of the present disclosure is to provide galantamine treatment via oral delivery without or with reduced unwanted side effects.

Another benefit underlying the disclosed methods was the provision of oral solid dosage forms and formulations comprising benzgalantamine showing improved pharmacokinetic properties in comparison to the dosage forms and formulations disclosed in the prior art, thereby providing effective treatment of diseases and/or symptoms associated with cognitive impairment and/or cholinergic deficits while reducing adverse effects.

Another benefit underlying the disclosed methods was the provision of oral solid dosage forms and formulations comprising benzgalantamine showing improved pharmacokinetic properties in comparison to the dosage forms and formulations disclosed in the prior art independent of the food and beverage intake of a subject.

These beneficial effects are provided by the features of the independent claims. Preferred embodiments of the presently disclosed methods are provided by the dependent claims.

In one aspect, the disclosed methods relate to a pharmaceutical composition in the form of a tablet, said tablet comprising:
  a. a tablet core, wherein said core comprises benzgalantamine or salt thereof, and
  b. an enteric coating, wherein said enteric coating is configured for dissolution at pH 5.5 and above.

Surprisingly, the compositions of the presently disclosed methods show excellent pharmacokinetic properties and provide a basis for treatment efficacy while showing a low incidence of adverse effects in a subject.

As benzgalantamine is an ester, which is instable in acidic environment in the stomach, and is cleaved enzymatically in many tissues, oral administration of benzgalantamine would be anticipated to result in pro-drug cleavage and provoking gastrointestinal adverse effects due to the effect of galantamine in the stomach. Enteric coating of solid dosage forms for oral administration prevents release of benzgalantamine in the stomach and thus acidic or enzymatic cleavage.

The disclosed composition, comprising an enteric coating dissolving at pH 5.5 and above, surprisingly shows an advantageous pharmacokinetic profile, while showing reduced gastrointestinal adverse events.

As shown in the examples below, the disclosed composition results in a decreased maximum plasma concentration ($C_{max}$) of Galantamine while maintaining an area under the curve (AUC) of Galantamine in plasma comparable to an immediate release reference formulation of galantamine (without enteric coating).

Further, the disclosed compositions result in an increased $C_{max}$ of Galantamine while maintaining an AUC comparable to RAZADYNE extended-release capsules.

The disclosed compositions thus provide benefits over the compositions known in the prior art, with respect to adverse effects, in particular gastrointestinal adverse events, being reduced due to lower $C_{max}$ compared to immediate release formulations, while treatment efficacy is maintained due to increased $C_{max}$ over RAZADYNE extended-release capsules and similar AUC to the oral galantamine compositions known in the prior art.

Such beneficial effects of the disclosed compositions, which in embodiments achieved by the enteric coating configured to dissolve at pH 5.5 or above, could not have been expected by a person skilled in the art.

The enteric coating of the disclosed compositions is selected to facilitate the release of benzgalantamine occurring in the intestine above pH 5.5, resulting in a slower and lower rise to $C_{max}$ of Galantamine compared to an immediate release composition, releasing galantamine in the stomach, and a higher $C_{max}$ compared to an extended-release composition. Both the rate at which plasma concentrations of benzgalantamine increase, and the absolute concentration of benzgalantamine in plasma, influence the side effect profile and efficacy. The slower rise to $C_{max}$ and lower $C_{max}$ of the disclosed composition compared to an immediate release formulation thus advantageously reduces side effects.

As shown in Examples 2 to 4 below, the observed time to peak concentration of galantamine ($T_{max}$) was delayed using the methods disclosed herein when compared to the RAZADYNE extended-release formulation. This delay is evident in both fed and fasted studies. Thus, the delayed $T_{max}$ may allow a potentially greater therapeutic effect to be achieved over a longer period of time. The pharmacokinetic properties of the methods described herein are therefore beneficial and may represent improvements over the earlier RAZADYNE formulations.

After release of benzgalantamine from the disclosed compositions in the intestine, the drug is potentially subject to conversion to galantamine through esterase action in the compartments: (a) in the lumen of the intestine, (b) during its transport across the intestinal wall (Ho et al. 2017, Xu et al. 2015), and (c) exposed to esterase activity in (portal) blood (Rudakova et al. 2010).

The disclosed composition surprisingly does not provoke the side effect profile observed with immediate release formulations known in the prior art, even though benzgalantamine is completely or nearly completely converted to galantamine and only negligible (or below the limit of quantitation) amounts of benzgalantamine are detected in the systemic blood compartment after administration to a subject (see examples 2 and 3 below). This leads to the finding that the disclosed composition surprisingly does not result in free galantamine concentrations in the gastrointestinal tract and in the gastric and intestinal walls that provoke gastrointestinal side effects observed for compositions of the prior art.

This represents a surprising and beneficial effect, as it would have been expected that conversion of benzgalantamine in compartments (a-c), as discussed above, after release in the intestine may have resulted in galantamine concentrations activating the enteric cholinergic nervous system, resulting in gastrointestinal adverse events such as nausea, vomiting, diarrhea. The disclosed formulation thus advantageously provides protection against gastrointestinal adverse events, while achieving complete conversion of the prodrug to galantamine and a similar AUC compared to the immediate and extended-release reference formulations.

Further, without being bound to theory, the results of the examples below demonstrate that the rate at which the drug is presented to the liver for first pass metabolism, is such that it doesn't overwhelm its metabolic capacity in order to completely, or nearly completely, convert benzgalantamine to galantamine. This increases the safety profile and tolerability of the disclosed compositions over compositions known in the prior art.

The disclosed compositions thus enable a combination of beneficial features and properties that a skilled person would not have expected. Achieving a substantial reduction of gastrointestinal adverse effects while maintaining or and potentially enhancing treatment efficacy, in addition an increased safety profile, represents an unexpectedly beneficial tablet formulation that shows surprising advantages over formulations of the prior art and/or the expectations of a skilled person in the field of drug formulation. Thereby, the disclosed enteric coated composition configured to dissolve at pH 5.5 advantageously enables treatment of patients who previously have discontinued treatment with AChE inhibitors due to intolerable gastro-intestinal side effects associated with orally administered tablets.

The delayed release ZUNVEYL® tablet composition both protects from benzgalantamine release in the gastric acid environment as well as promotes drug release at pH 5.5.

In one embodiment, the enteric coating is configured for dissolution at pH 5.5 and above, such as at pH 5.5, 5.6, 5.7, 5.8, 5.9, 6, 6.1, 6.2, 6.3, 6.4, 6.5, 6.6, 6.7, 6.8, 6.9 or 7, or at values above 7. In one embodiment, the enteric coating is configured for dissolution within a range of pH values formed from any two values disclosed herein. By way of example, in some embodiments, the enteric coating is configured for dissolution at pH 5.5 to 7, at pH 5.5 to 6.5, or pH 5.5 to 6.

In one embodiment, the enteric coating is a copolymer of methacrylic acid and ethyl acrylate.

In one embodiment, the copolymer comprises a ratio of carboxylic acid groups of methacrylic acid and ester groups of ethyl acrylate of 2:1 to 1:2, or about 1:1, and the average molecular weight of the copolymer is about 250 kDa.

In one embodiment, the copolymer comprises a ratio of carboxylic acid groups of methacrylic acid and ester groups of ethyl acrylate of 2:1 to 1:2, such as 2:1, 1.8:1, 1.6:1, 1.5:1, 1.4:1, 1.2:1, 1:1, 1:1.2, 1:1.4, 1:1.5, 1:1.6, 1:1.8 and 1:2.

In one embodiment, the enteric coating is or comprises Acryl-Eze II and/or Eudragit L 100-55.

By way of example, Acryl-Eze II and/or Eudragit L 100-55 are considered a gold standard for delayed release coatings for drug release in mid to upper small intestine, and reliably allow dissolution above pH 5.5. Eudragit products are typically available from Evonik Operations GmbH, Eudragit L 100-55 has a Cas-No of 25212-88-8, and a composition of methacrylic acid-ethyl acrylate copolymer (1:1). Acryl-EZE II is available in various pigmented formulations, is available from Colorcon, and employs Evonik's globally accepted enteric polymer Eudragit L 100-55. Acryl-Eze II and/or Eudragit L 100-55 coatings may be used to achieve desired $T_{max}$ (time until the maximum measured plasma concentration) values. $T_{max}$ is also defined as the first time point of $C_{max}$. A common feature of the delayed release coatings used in the dosage forms of the methods disclosed herein is that they allow the time to peak serum concentrations disclosed herein.

In one embodiment, the tablet core comprises a water-soluble filler.

In one embodiment, the water-soluble filler is a sugar.

In one embodiment, the sugar is mannitol.

In one embodiment, the tablet core comprises a glidant.

In one embodiment, the glidant is colloidal silicon dioxide.

In one embodiment, the tablet core comprises one or more lubricants.

In one embodiment, the lubricant is sodium stearyl fumarate and/or magnesium stearate.

In one embodiment, the tablet core comprises sodium stearyl fumarate and magnesium stearate.

In one embodiment, the tablet core is coated by a film coating comprising hydroxypropyl methylcellulose (HPMC), wherein said film coating is in direct contact with the tablet core and is coated by the enteric coating.

In one embodiment, the film coating comprises HPMC and polyethylene glycol, preferably wherein the film coating is or comprises Opadry YS-1-7006.

In one embodiment, the benzgalantamine is present as a gluconate salt.

In one embodiment, the benzgalantamine gluconate salt is present as crystalline solid form A (anhydrous form). Reference is made to WO 2022/150917 (U.S. Pat. No. 11,795,176B2), which is incorporated by reference in full, in which the crystalline solid form of benzgalantamine gluconate Form A is disclosed.

Figure 6:
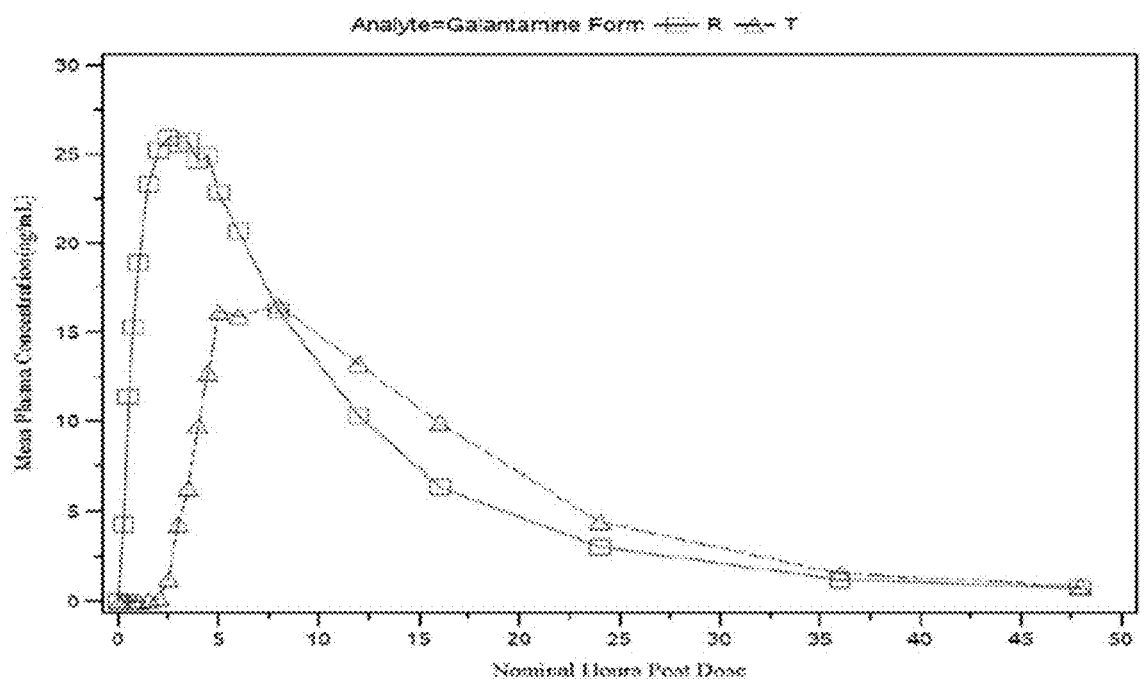
FIG. 6: Mean Plasma Galantamine Concentrations Vs. Time Plots-Linear Scale.

As described therein, polymorphic studies were conducted with benzgalantamine (ALPHA-1062) utilizing a variety of solvents and crystallization conditions (Table 5 of WO 2022/150917) and subsequent XRPD analyses. Seven unique crystalline materials were observed and isolated, and were designated as Forms A, B, C, D and Materials E, F and G (FIG. 6 of WO 2022/150917). Form A of benzgalantamine is an anhydrous crystalline material with concomitant melt/decomposition onset near 117° C. Based upon WO 2022/150917, anhydrous Form A, stored under appropriate temperature and humidity conditions to maintain its form and stability, appears best suited of the various benzgalantamine forms to be used in formulation and manufacture of drug products.

In one embodiment, the disclosure relates to a composition comprising a crystalline solid form of benzgalantamine gluconate (Form A), wherein said crystalline form has prominent peaks at 3.61, 10.98, 14.41 and 18.44 degrees 2-theta (±0.2) in a powder X-ray diffraction pattern. Although enteric coated formulations have been previously postulated, none of the prior art formulations have employed Form A. The use of Form A of benzgalantamine gluconate is in some embodiments advantageous due to its high stability during storage, maintaining both high chemical stability with none, low or negligible amounts of chemical impurities, and also stability of Form A itself, thus avoiding conversion to other forms or hydrates, and a high solubility, thereby also enabling the advantageous effects described herein.

In one embodiment, Form A has one or more additional prominent peaks at 15.20, 17.31, 17.79, 22.77, 23.64, 24.88 and 34.31 degrees 2-theta (±0.2) in a powder X-ray diffraction pattern. These peaks are selected from the prominent peak list presented in WO 2022/150917 and appear to exhibit no substantial overlap with prominent peaks in the XRPD patterns for Forms B-D, or Materials E-G. In one embodiment, Form A has at least five prominent peaks selected from the list consisting of 3.61, 10.98, 13.80, 14.41, 14.56, 15.08, 15.20, 17.02, 17.31, 17.79, 18.44, 19.24, 20.18, 20.91, 21.22 and 22.40 degrees 2-theta (±0.2) in a powder X-ray diffraction pattern.

The use of Form A of benzgalantamine gluconate represents a preferred and advantageous embodiment of the disclosed methods, as stability of Form A can be maintained after formulation during storage. Form A can also enable high drug solubility and effective therapeutic effect.

As demonstrated within the examples below (example 5) the disclosed compositions comprising benzgalantamine gluconate as crystalline solid form A (anhydrous form) possess high chemical and crystalline stability and advantageous dissolution properties even upon long term storage, also under accelerated conditions. No impurities or decomposition products were detected, showing high chemical stability of the API benzgalantamine within the disclosed compositions. Further, no changes in dissolution under acid stage and buffered stage were observed, when compared to the dissolution before storage, demonstrating no change in the crystalline form upon storage.

In one embodiment, the tablet core comprises:
Benzgalantamine or salt thereof in an amount (wt % of the tablet core) of 5-20%,
A water-soluble filler in an amount of 60-90%,
A glidant in an amount of 0.1-5%, and
One or more lubricants in an amount of 0.1-5%.

In one embodiment, the tablet core comprises:
Benzgalantamine or salt thereof in an amount (wt % of the tablet core) of 5-20%,
Mannitol in an amount of 60-90%,
Colloidal silicon dioxide in an amount of 0.1-5%,
Sodium stearyl fumarate in an amount of 0.1-5%, and
Magnesium stearate in an amount of 0.1-5%.

In one embodiment, the tablet core comprises:
Benzgalantamine or salt thereof in an amount (wt % of the tablet core) of 10-15%,
Mannitol in an amount of 70-90%,
Colloidal silicon dioxide in an amount of 0.5-2%,
Sodium stearyl fumarate in an amount of 1-4%, and
Magnesium stearate in an amount of 0.5-2%.

In some embodiments, the tablet comprises calcium silicate, a compound with the chemical formula $Ca_2SiO_4$ or $CaO \cdot SiO_2$ (among others, depending on the specific form). It is a white to cream-colored powder and may be used as an anticaking agent, a filler, a diluent, or a stabilizer.

The above-mentioned formulations and embodiments disclose preferred amounts of each component. Variation in these amounts, or combinations of different ranges of each component from different embodiments, is envisaged.

In one embodiment, the enteric coating is present in an amount, determined by weight gain in % in addition to the tablet core, of 5-20%, preferably of 7-15%, more preferably about 8%, about 10%, about 12% or about 14%.

In one embodiment, the film coating is present in an amount, determined by weight gain in % in addition to the tablet core, of 2-10%, preferably about 3-7%, more preferably about 5%.

In one embodiment,
a. the tablet core comprises:
   Benzgalantamine or salt thereof in an amount (wt % of the tablet core) of 10-15%,
   Mannitol in an amount of 70-90%,
   Colloidal silicon dioxide in an amount of 0.5-2%,
   Sodium stearyl fumarate in an amount of 1-4%, and
   Magnesium stearate in an amount of 0.5-2%, and
b. the enteric coating is present in an amount, determined by weight gain in % in addition to the tablet core, of 7-15%, and
c. a film coating is present in an amount, determined by weight gain in % in addition to the tablet core, of 3-7%, wherein said film coating is in direct contact with the tablet core and is coated by the enteric coating.

All values provided herein, for example the specific preferred values for each component, may vary by +/−2 wt %, or by +/−1 wt %. All values for each of the tablet components provided herein, may be used to characterize the presently claimed methods independent of the presence or amount of any other component, or in combination with other components of the example compositions. The preferred range disclosed below for each component may be used to define the composition, either independent of other components or in combination with other components. These embodiments are not limited by total weight of the compositions, but in some embodiments by the wt % values of each component without limitation to absolute weight.

Embodiments relating to benzgalantamine (ALPHA-1062), 5 mg, 10 mg or 15 mg tablets:

| Component | Function | % wt | mg/tablet 5 mg | mg/tablet 10 mg | mg/tablet 15 mg | Preferred rage % wt |
|---|---|---|---|---|---|---|
| Tablet Core | | | | | | |
| Benzgalantamine (Galantamine Benzoate API; Gluconate Form A) | API | 12.692% | 7.506 | 15.012 | 22.516 | 5-20 |
| Mannitol | Water-soluble filler | 82.768% | 48.949 | 97.898 | 146.833 | 60-90 |
| Colloidal Silicon Dioxide | Glidant | 1.000% | 0.591 | 1.182 | 1.774 | 0.1-5 |
| Sodium Stearyl Fumarate | Lubricant | 2.540% | 1.502 | 3.004 | 4.506 | 0.1-5 |
| Magnesium Stearate | Lubricant | 1.000% | 0.591 | 1.182 | 1.774 | 0.1-5 |
| Total | | 100.000% | 59.140 | 118.2801 | 77.403 | — |

-continued

Embodiments relating to benzgalantamine (ALPHA-1062), 5 mg, 10 mg or 15 mg tablets:

| Component | | Function | % wt | 5 mg | 10 mg | 15 mg | Preferred rage % wt |
|---|---|---|---|---|---|---|---|
| Tablet Coating | | | | | | | |
| Opadry (seal) (sub-coating) | | Film Coating | 5% of tablet core | 2.957 | 5.914 | 8.870 | 2-10% of tablet core |
| Acryl-EZE II (enteric) | White/RM4123 | Enteric Coating | 10% of sub-coated tablet core | 6.210 | — | — | 2-10% of tablet core |
| | Grey/RM4131 | Enteric Coating | 7.5% of sub-coated tablet core | — | — | 13.970 | 2-10% of tablet core |
| | Purple/RM4130 | Enteric Coating | 9% of sub-coated tablet core | — | 11.178 | — | 2-10% of tablet core |
| Total | | | — | 68.306 | 135.372 | 200.244 | — |

In some embodiments, a benzgalantamine dosage form may comprise benzgalantamine in an amount of 1 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, 20 mg, 25 mg or 30 mg.

In some embodiments, a dosage form may be administered once per day, twice per day, three times per day or four times per day.

In some embodiments, an initial dosage is administered for 1 week, 2 weeks, 3 weeks, four weeks, five weeks, six weeks, seven weeks, 8 weeks, 9 weeks or 10 weeks.

In some embodiments, a maintenance dosage, following the initial dosage, may be administered once per day, twice per day, three times per day or four times per day.

In one embodiment, the composition is configured to release benzgalantamine after administration to a subject in the small intestine of said subject at pH 5.5 and above.

In one embodiment, the composition shows at most 10% dissolution of benzgalantamine in the dissolution test according to USP 711 under acidic stage (pH 1,2) after 120 minutes and at least 80% release of benzgalantamine in the dissolution test according to USP 711 under buffered stage (pH 5.5 or 6.8) after 60 minutes.

In one embodiment, the composition shows at most 10% dissolution of benzgalantamine in the dissolution test according to USP 711 under acidic stage (pH 1,2) after 120 minutes and/or at least 80% release of benzgalantamine in the dissolution test according to USP 711 under buffered stage (pH 5.5 or 6.8) after 60 minutes.

In one embodiment, the composition shows at most 5% dissolution of benzgalantamine in the dissolution test according to USP 711 under acidic stage (pH 1,2) after 120 minutes and at least 80% release of benzgalantamine in the dissolution test according to USP 711 under buffered stage (pH 5.5 or 6.8) after 45 minutes.

In one embodiment, the composition shows at most 5% dissolution of benzgalantamine in the dissolution test according to USP 711 under acidic stage (pH 1.2) after 120 minutes and/or at least 80% release of benzgalantamine in the dissolution test according to USP 711 under buffered stage (pH 5.5 or 6.8) after 45 minutes.

In one embodiment, the composition shows at most 10% dissolution of benzgalantamine in the dissolution test according to USP 711 under acidic stage (pH 1.2) and in the presence of 20% (v/v) or less ethyl alcohol after 90 minutes.

In one embodiment, the composition shows at most 5% dissolution of benzgalantamine in the dissolution test according to USP 711 under acidic stage (pH 1.2) and in the presence of 20% (v/v) or less ethyl alcohol after 90 minutes.

The disclosed compositions surprisingly show no dissolution or dissolution of negligible amounts under acidic conditions even in the presence of up to 20% (v/v) ethyl alcohol. Further, the compositions show no change in the release profile under buffered conditions in the presence of up to 20% (v/v) ethyl alcohol. These results demonstrate that the dissolution properties and the release of benzgalantamine from the disclosed composition advantageously is not influenced by the presence of alcohol, such as up to 20% (v/v) ethyl alcohol. Thus, the disclosed compositions provide a high safety profile and advantageous pharmacokinetic properties even in the presence of alcohol, i.e., during alcohol intake of a subject the compositions are administered to.

In one embodiment, after administration of the composition to a subject, benzgalantamine is at negligible levels or below a lower limit of detection in the plasma of the subject (exhibits complete or nearly complete conversion of benzgalantamine to Galantamine).

This observation represents a surprising and beneficial effect obtained by the presently disclosed formulations. Previous studies have observed that, for example when using nasal administration, that significant amounts of benzgalantamine, in some cases up to 10% of administered compound, were not cleaved to release galantamine and benzgalantamine could be observed in the blood of subjects who received the drug. The (near) complete cleavage of benzgalantamine to galantamine, as shown in the reports below regarding clinical study participants, enables a quick and complete release of active agent and surprisingly is not associated with adverse effects, as may have been expected when observing release of galantamine in the gastrointestinal tract.

In one embodiment, after administration of the composition to a subject,
a. a lower maximal plasma concentration ($C_{max}$) of Galantamine is obtained compared to an immediate release galantamine reference composition, and
b. an area under the plasma curve (AUC) of Galantamine is obtained at 80-125% of the AUC for the reference composition,
c. wherein preferably said immediate release galantamine reference composition is a tablet comprising no coating or a coating configured for dissolution below pH 5.5 and a molar amount of Galantamine above the molar amount of galantamine in benzgalantamine in the pharmaceutical composition.

In one embodiment, after repeated administration of the composition to a subject,
a. a greater maximal plasma concentration of Galantamine at steady state ($C_{max,ss}$) is obtained compared to an extended release galantamine reference composition, and
b. an area under the plasma curve (AUC) of Galantamine is obtained at 80-125% of the AUC for the reference composition,
c. wherein preferably said extended release galantamine reference composition (8 mg QD) is a solid dosage form configured for extended release of Galantamine and comprising a molar amount of Galantamine above the molar amount of galantamine in benzgalantamine (5 mg BID) in the pharmaceutical composition.

In one embodiment, after administration of the composition to a subject, the subject has a likelihood of having an adverse event related to the gastrointestinal tract of equal to or less than 2%, such as 2%, 1.8%, 1.6%, 1.4%, 1.2%. 1%, 0.8%, 0.6%, 0.4%, 0.2% and 0%.

Surprisingly the disclosed compositions show excellent pharmacokinetic properties resulting in low incidence of adverse effects, in particular gastrointestinal adverse events, in a subject.

Thereby, gastrointestinal adverse events are reduced due to lower $C_{max}$ compared to immediate release formulations, while bioavailability is maintained due to equivalent AUC relative to galantamine immediate release (IR) ($AUC_{0-t}$ & $AUC_{0-\infty}$) and extended release (ER) ($AUC_{[0-24]ss}$). Overall, the disclosed composition provides enhanced tolerability and maintained bioavailability and can thus be considered as clinically more effective.

After release of benzgalantamine from the disclosed compositions at pH 5.5 or above in the intestine, the drug is potentially subject to conversion to galantamine through esterase action in the intestine, during transport across the intestinal wall and in the (portal) blood. It could have thus been expected that conversion of benzgalantamine after release in the intestine would result in galantamine concentrations activating the enteric cholinergic nervous system, resulting in gastrointestinal adverse events such as nausea, vomiting, diarrhea. The disclosed composition however beneficially does not result in a free galantamine concentration in the gastrointestinal tract that provokes the side effect profile observed with the immediate and extended release formulations known in the prior art, even though benzgalantamine is completely or nearly completely converted to galantamine and no or only negligible amounts of benzgalantamine are detected in the blood stream after administration to a subject.

In one aspect, the disclosure relates to a pharmaceutical composition for use in the treatment of a brain disease associated with cognitive impairment and/or with a cholinergic deficit.

In a related aspect, the disclosure further relates to a method for the treatment of a brain disease associated with cognitive impairment and/or with a cholinergic deficit, comprising administering the pharmaceutical composition as described herein to a subject in need thereof.

In one embodiment, the brain disease is selected from the group consisting of a brain disease with a cholinergic deficit, Alzheimer's disease, Parkinson's disease, dementia (including vascular dementia & mixed dementia), schizophrenia, epilepsy, stroke, poliomyelitis, neuritis, myopathy, oxygen and nutrient deficiencies in the brain after hypoxia, anoxia, asphyxia, cardiac arrest, chronic fatigue syndrome, poisoning, anesthesia, spinal cord disorders, central inflammatory disorders, Lewy Body Disease, multiple sclerosis, skeletal muscle pain, autism, Rett's syndrome, motor neuron disease such as amyotrophic lateral sclerosis, traumatic brain injury, post-traumatic stress disorder, postoperative delirium, neuropathic pain, abuse of alcohol and drugs, addictive alcohol and/or nicotine craving, severe gas in the gastro-intestinal tract (GIT), constipation, low blood pressure, erratic heart rate, and effects of radiotherapy.

In one aspect, the disclosure relates to a method for preparing a pharmaceutical composition in the form of a tablet according to any one of the preceding claims, wherein said composition is prepared by blending components of the tablet core to form a blend, compressing said blend to form a tablet core, coating said tablet core with a film coating and coating said film coating with an enteric coating.

The method for preparation of the composition of the present disclosure employs direct blending of the excipients, which are well mixable and show good flow properties when blended, allowing direct compression of the composition blend (also termed herein "blend").

It was unexpected and beneficial that direct compression could be employed for the formulation of tablets comprising high amounts of benzgalantamine, such as 15 mg benzgalantamine dosages and higher, and salts thereof such as benzgalantamine gluconate, preferably Form A. Only few active ingredients are suitable for direct compression and often require careful selection and high amounts of excipients to enable direct compression to a tablet. The presently claimed methods enable a straightforward, cost-efficient, reliable, and high-throughput approach towards formulation of benzgalantamine tablets with high single dose levels for oral administration, which represents an improvement over alternative methods of production.

The features of the disclosure relating to the composition in form of a tablet comprising benzgalantamine as described herein, are relevant to and considered disclosed in combination with other aspects of the disclosure, such as the method for manufacturing the composition and the use for the treatment of a disease and/or symptoms associated with cognitive impairment and/or with a cholinergic deficit and vice versa. For example, the composition, methods for manufacture and use of said tablet are immediately relevant to the other aspects of the disclosure and may be used to characterize them appropriately, as understood by a skilled person.

Galantamine ((4aS,6R,8aS)-3-Methoxy-11-methyl-4a,5,9,10,11,12-hexahydro-6H-benzofuro[3a,3,2-ef][2]benzazepin-6-ol (CAS 357-70-0)), is a reversible acetylcholinesterase inhibitor, (AChEI) and thus belongs to the group of reversible AChE inhibitors. It further enhances cholinergic activity by non-competitive, allosteric modulation of the nicotinic acetylcholine receptors (nAChR).

It is approved as immediate release tablet and oral solution and extended-release capsule and tablet and marketed as RAZADYNE® and RAZADYNE® ER (U.S.) and as REMINYL® (elsewhere).

The chemical structure of galantamine is:

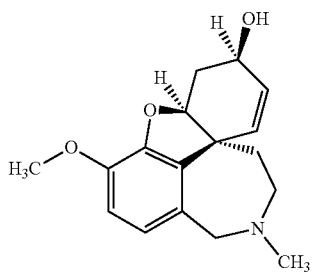

According to the full prescribing information of RAZADYNE® and RAZADYNE® ER (U.S.) and the, the regulatory approved indication is mild to moderate dementia of Alzheimer's type. According to the first approval of REMINYL in Sweden which was followed by several approvals in other European states the indication is similar to the U.S. approval for mild to moderate dementia of Alzheimer's type. RAZADYNE® tablets are available as 4 mg, 8 mg and 12 mg galantamine tablets. RAZADYNE® ER capsules are available as –8 mg, 16 mg and 24 mg extended-release capsules. The recommended initial dosage regime for RAZADYNE® 4 mg tablets is twice daily. This dose may be increased up to 12 mg twice daily. The recommended initial dose and dosage regime for RAZADYNE® ER capsules is one 8 mg capsule daily, which may be increased to 24 mg once daily.

Galantamine is well absorbed with an absolute oral bioavailability of ~90% and is rapidly and completely absorbed with a $t_{max}$ of ~1 hour. $C_{max}$ was decreased by 25% and $T_{max}$ was delayed by 1.5 hours, when galantamine was administered with food. The mean volume of distribution of galantamine is 175 L and plasma protein binding is 18% at therapeutic conditions. In whole blood, galantamine is mainly distributed into the cellular fraction (52.7%) (RAZADYNE®, 2020). Maximum inhibition of acetylcholinesterase activity of about 40% was achieved about 1 hour after a single oral dose of 8 mg galantamine in healthy male subjects (IB third edition, May 2020). Galantamine is metabolized by hepatic cytochrome P450 (CYP) enzymes, glucuronidated, and excreted unchanged in the urine. In vitro studies indicate that CYP2D6 and CYP3A4 were the major isoenzymes involved in the metabolism of galantamine, and inhibitors of both pathways increase oral BA of galantamine modestly.

Benzgalantamine, ((4aS,6R,8aS)-4a,5, 9,10,11,12-hexahydro-3-methoxy-11-methyl-6H [1]benzofuro[3a,3,2-ef][2]benzazepin-6benzoate gluconate salt) (CAS. No.: 224169-27-1, also termed galantamine benzoate, memogain, ALPHA-1062 or GLN-1062) is a galantamine prodrug, exhibiting no pharmacological effect on AChE or nicotinic cholinergic receptors. It is cleaved by carboxylesterases in an acidic environment, releasing one molecule of galantamine from each molecule of prodrug The chemical structure of benzgalantamine is:

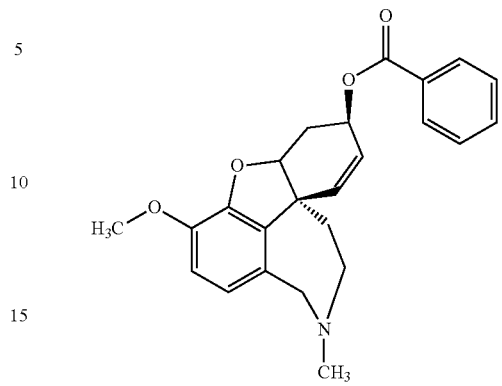

Acetylcholine (ACh) is a transmitter of the nervous system acting on postsynaptic muscarinic acetylcholine (mAChR) or nicotinic acetylcholine receptors (nAChR). ACh is cleaved by acetylcholinesterase (AChE) present in the synaptic cleft, thus inhibition of AChE and thus cleavage of ACh results in enhanced concentrations of ACh in the synaptic cleft. ACh is present in the central nervous system (CNS) and the peripheral nervous system (PNS). The PNS can be further subdivided into somatic nervous system and autonomic nervous system (parasympathetic nervous system, sympathetic nervous system, and enteric nervous system). In the somatic nervous system, ACh is a transmitter at the neuromuscular junction. In addition, ACh occurs as a transmitter in preganglionic sympathetic and in all parasympathetic neurons, mediating signal transmission from the postganglionic-parasympathetic neurons to the end organs. Effects of ACh include mediation of contraction of skeletal muscle, regulation of the autonomic nervous system influencing for example blood pressure, heart rate, digestion and metabolism, and further regulation of reward and cognitive functions in the CNS. A deficiency of ACh (cholinergic deficit) can result in impairment of functions and effects of ACh in the somatic nervous system and autonomic nervous system and further in the CNS resulting in impairments of cognitive function (cognitive impairment), learning and memory.

Diseases and/or symptoms associated with cognitive impairment and/or with a cholinergic deficit include but are not limited to brain diseases with a cholinergic deficit, a brain disease with a cholinergic deficit, Alzheimer's disease, Parkinson's disease, dementia, schizophrenia, epilepsy, stroke, poliomyelitis, neuritis, myopathy, oxygen and nutrient deficiencies in the brain after hypoxia, anoxia, asphyxia, cardiac arrest, chronic fatigue syndrome, poisoning, anesthesia, spinal cord disorders, central inflammatory disorders, Lewy Body Disease, multiple sclerosis, skeletal muscle pain, autism, Rett's syndrome, motor neuron disease such as amyotrophic lateral sclerosis, traumatic brain injury, posttraumatic stress disorder, postoperative delirium, neuropathic pain, abuse of alcohol and drugs, addictive alcohol and/or nicotine craving, severe gas in the gastro-intestinal tract (GIT), constipation, low blood pressure, erratic heart rate, and effects of radiotherapy. These medical indications represent preferred embodiments of the medical use of the disclosed methods in the treatment of a disease and/or symptoms associated with cognitive impairment and/or with a cholinergic deficit.

"Administration" or "treatment," as it applies to an animal, human, experimental subject, cell, tissue, organ, or biological fluid, refers to contact of a pharmaceutical, therapeutic, diagnostic agent, compound, or composition to the animal, human, subject, cell, tissue, organ, or biological fluid. "Administration" and "treatment" can refer, e.g., to therapeutic, placebo, pharmacokinetic, diagnostic, research, and experimental methods. The term "subject" includes both human and veterinary subjects. "Treatment," as it applies to a human, veterinary, or research subject, refers to therapeutic treatment, prophylactic or preventative measures, to research and diagnostic applications.

The disclosed methods encompass administration of an effective amount of chemical substance as described herein to a subject or patient in need thereof. "Effective amount" or "therapeutically effective amount" means an amount sufficient to elicit an appreciable biological response such as ameliorate a symptom or sign of a disorder or physiological condition when administered to a subject or patient. An effective amount for a particular patient or veterinary subject may vary depending on factors such as the condition being treated and the overall health and age of the patient. An effective amount can be the maximal dose or dosing protocol that avoids significant side effects or toxic effects. "Effective amount" also relates to an amount of the prodrug substance or pharmaceutical composition thereof, sufficient to allow or facilitate appreciable biological response such as the amelioration and of a symptom or sign of a disorder, condition, or pathological state.

A prodrug is defined as an inactive or less active agent that is transformed (also termed "metabolized") in an organism to an active agent also termed "metabolite". In this context, a prodrug is an inactive or less active precursor of an active drug that undergoes transformation into the active form of the drug in vivo by enzymatic cleavage or one or more non-enzymatic chemical processes in a predictable fashion. Prodrugs are developed to influence physicochemical, organoleptic, pharmacokinetic and pharmacodynamic properties of active drugs. Usually, prodrugs are designed such that the drug is chemically coupled to a carrier molecule, which is cleaved off in the organism (carrier-bound prodrugs) resulting in transformation to the active drug. Common carrier-bound prodrugs comprise coupling of the carrier by a covalent ester linkage (ester prodrugs). Further types of prodrugs include bio precursors, which are not coupled to a carrier molecule but metabolized or conjugated directly in the organism resulting in the active drug, and co-prodrugs (mutual prodrugs), comprising two or more active drugs coupled to each other. The prodrug of the presently claimed methods, benzgalantamine, comprises a covalent ester linkage between the active drug galantamine and benzoate, which upon cleavage releases the active drug galantamine.

The present disclosure relates further to salts of benzgalantamine. In some embodiments, benzgalantamine is present as a salt of benzgalantamine, or is present in a crystalline form of benzgalantamine, or is present as a polymorph or hydrate of benzgalantamine. The terms "salt" refers to salts prepared by conventional means that include basic salts of inorganic and organic acids, including but not limited to acetate, adipate, alginate, aspartate, benzoate, benzenesulfonate, bisulfate, butyrate, citrate, camphorate, camphorsulfonate, cyclopentanepropionate, digluconate, dodecylsulfate, ethanesulfonate, fumarate, glucoheptanoate, gluconate, glycerophosphate, hemisulfate, heptanoate, hexanoate, hydrochloride, hydrobromide, hydroiodide, 2-hydroxyethanesulfonate, lactate, maleate, methanesulfonate, 2-naphthalenesulfonate, nicotinate, oxalate, pamoate, pectinate, persulfate, 3-phenyl-propionate, picrate, pivalate, propionate, saccharate, succinate, tartrate, thiocyanate, tosylate and undecanoate. For therapeutic use, salts of the compounds are those wherein the counter-ion is pharmaceutically acceptable. However, salts of acids and bases which are non-pharmaceutically acceptable may also find use, for example, in the preparation or purification of a pharmaceutically acceptable compound.

In a preferred embodiment the salt comprises of stoichiometric and/or non-stoichiometric salts and/or hydrates of benzgalantamine, whereby the salt is preferably described as:

Benzgalantamine·n HX·m H$_2$O, whereby n, m=0-5 and n and m can be the same or different, and HX=an acid, selected preferably from acetic acid, citric acid, lactic acid, gluconic acid, maleic acid or saccharic acid.

Preferred are quaternary nitrogen salts (also termed "quaternary ammonium salts" herein) of benzgalantamine with gluconic acid (gluconate salt), acetic acid (acetate salt), maleic acid (maleate salt), lactic acid (lactate salt), citric acid (citrate salt), and saccharic acid (saccharate salt).

Salts of benzgalantamine disclosed in the prior art include maleate, lactate saccharate and gluconate. In one preferred embodiment of the claimed methods, the benzgalantamine or a salt thereof is benzgalantamine gluconate.

The chemical structure of benzgalantamine (ALPHA-1062) gluconate is:

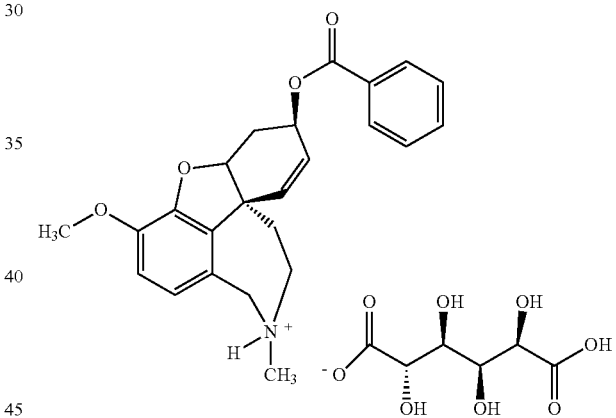

By way of example, the gluconate salt of benzgalantamine can be created according to the following established general scheme:

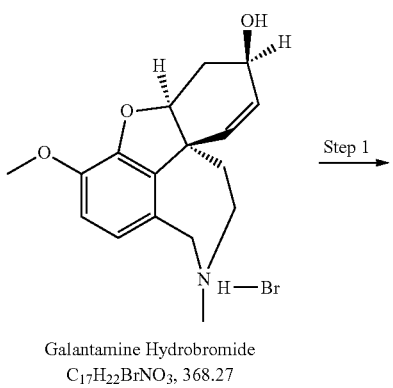

Galantamine Hydrobromide
C$_{17}$H$_{22}$BrNO$_3$, 368.27

-continued

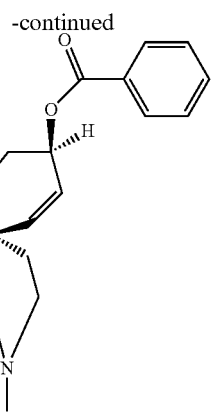

Galantaminebenzoylester
C₂₄H₂₅NO₄, 391.46

Step 2

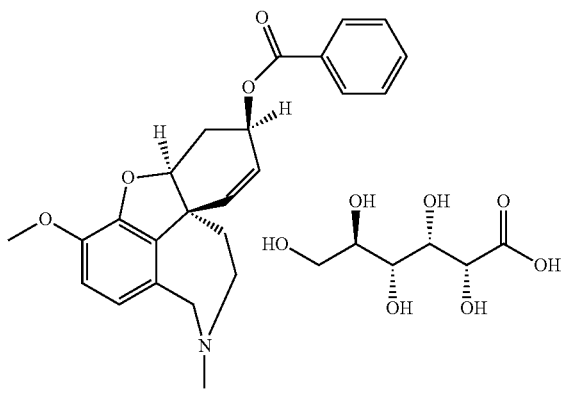

Memogain Gluconate
C₃₀H₃₇NO₁₁, 587.61

In one embodiment, the composition comprises a crystalline solid form of benzgalantamine gluconate (Form A), wherein said crystalline form has prominent peaks at 3.61, 10.98, 14.41 and 18.44 degrees 2-theta (±0.2) in a powder X-ray diffraction pattern. The use of Form A represents a preferred embodiment and may be combined with any one or more other embodiments or aspects of the present disclosure.

These 4 peaks are selected from the prominent peak list provided below and appear to exhibit no substantial overlap with prominent peaks in the XRPD patterns for Forms B-D, or Materials E-G, as disclosed in WO 2022/150917. In one embodiment, Form A can therefore be reliably distinguished using one or more prominent peaks, for example as mentioned above, upon comparison of the corresponding powder X-ray diffraction patterns. In one embodiment, the presence of these peaks in a powder X-ray diffraction pattern may be used to identify Form A and/or distinguish Form A from the solid forms described previously in the art, for example those described in WO2014/016430.

In one embodiment, Form A has one or more additional prominent peaks at 15.20, 17.31, 17.79, 22.77, 23.64, 24.88 and 34.31 degrees 2-theta (±0.2) in a powder X-ray diffraction pattern. These peaks are selected from the prominent peak list and appear to exhibit no substantial overlap with prominent peaks in the XRPD patterns for Forms B-D, or Materials E-G.

In one embodiment, Form A has at least five prominent peaks selected from the list consisting of 3.61, 10.98, 13.80, 14.41, 14.56, 15.08, 15.20, 17.02, 17.31, 17.79, 18.44, 19.24, 20.18, 20.91, 21.22 and 22.40 degrees 2-theta (±0.2) in a powder X-ray diffraction pattern.

Typically, not all peaks from this list need be detected in order to determine the presence of Form A in any given preparation. According to the disclosure, for example, in some embodiments, 1, 2, 3, 4, 5, 6, 7, 8, 9, 10 or more peaks, preferably those with relatively high signal intensity, may be employed to determine any given crystal form. For example, the 4, 5, 6, 7, 8, 9 or 10 most intense peaks may be employed to identify any given crystal form. In one embodiment, sufficient identification of any given crystal form, such as Form A, is achieved when the presence of at least three or four prominent peaks can be determined based on XRPD comparisons.

Typically, prominent XRPD peaks are the strongest low angle, non-overlapping peaks observed in a XRPD pattern. In some embodiments, the "prominent peaks" have preferably a ≥20% relative intensity, preferably ≥30% relative intensity, more preferably ≥40% relative intensity, in a powder X-ray diffraction pattern. The values of relative intensity may however vary depending on device or analysis mode and are not inherently limiting to the solid forms described herein.

In one embodiment, Form A has peaks at 7.25 and/or 12.67 degrees 2-theta (±0.2) in a powder X-ray diffraction pattern. These peaks are of relatively low intensity compared to the peaks outlined above as predominant peaks. However, peaks at 7.25 and/or 12.67 degrees 2-theta appear to be absent in all other patterns for Forms B-D or Materials E-G.

In one embodiment, the peaks are determined using powder X-ray diffraction analysis in transmission mode.

In one embodiment, Form A has at least three peaks selected from the list consisting of 10.98, 14.41, 17.31, 18.44 and 22.40 degrees 2-theta (±0.2) in a powder X-ray diffraction pattern. In one embodiment, said three peaks are within the five peaks with the highest relative intensity in a powder X-ray diffraction pattern obtained using analysis in transmission mode. In one embodiment, these five peaks are the most intense peaks in the XRPD pattern using transmission mode, as outlined in the examples below.

In one embodiment, the peaks are determined using powder X-ray diffraction analysis in reflectance mode.

In one embodiment, Form A has at least three peaks selected from the list consisting of 3.61, 7.25, 10.98, 14.56 and 22.40 degrees 2-theta (±0.2) in a powder X-ray diffraction pattern. In one embodiment, said three peaks are preferably within the five peaks with the highest relative intensity in a powder X-ray diffraction pattern obtained using analysis in reflectance mode. In one embodiment, these five peaks are the most intense peaks in the XRPD pattern using reflectance mode, as outlined in the example below.

In one embodiment, Form A has one or more peaks selected from the list consisting of 3.61, 7.25, 10.98, 14.56, 22.40 degrees 2-theta (±0.2) in a powder X-ray diffraction pattern. These peaks are also observable from the XRPD pattern using reflectance mode.

In one embodiment, Form A has one or more doublets selected from the list consisting of 14.41 and 14.56, 15.08 and 15.20, and 24.88 and 25.09 degrees 2-theta (±0.2) in a powder X-ray diffraction pattern. These doublets may be used to identify Form A, and optionally distinguish the Form from other forms.

Provided below is a Table of the typically observed XRPD pattern peaks for Form A collected in transmission mode.

Peak list Form A: Peak list determined from the powder X-ray diffraction pattern of Form A, according to FIG. 8.

Accuracy of degrees 2-theta is provided at 2 decimal points, some variation dependent on batch or device may be evident.

| 2θ (°) | d (Å) | I (%) | 2θ (°) | d (Å) | I (%) | 2θ (°) | d (Å) | I (%) |
|---|---|---|---|---|---|---|---|---|
| 3.61* | 24.5 | 47 | 18.44* | 4.81 | 67 | 25.89 | 3.44 | 25 |
| 7.25 | 12.2 | 18 | 19.24* | 4.61 | 56 | 26.37 | 3.38 | 12 |
| 10.52 | 8.40 | 14 | 19.43 | 4.56 | 10 | 26.62 | 3.35 | 5 |
| 10.98* | 8.05 | 100 | 19.80 | 4.48 | 24 | 26.91 | 3.31 | 5 |
| 11.71 | 7.55 | 4 | 20.18* | 4.40 | 40 | 27.19 | 3.28 | 17 |
| 12.67 | 6.98 | 23 | 20.91* | 4.24 | 64 | 27.37 | 3.26 | 19 |
| 13.46 | 6.57 | 10 | 21.22* | 4.18 | 57 | 27.82 | 3.20 | 23 |
| 13.80* | 6.41 | 45 | 21.54 | 4.12 | 19 | 27.99 | 3.18 | 35 |
| 14.41* | 6.14 | 71 | 22.09 | 4.02 | 19 | 28.95 | 3.08 | 14 |
| 14.56* | 6.08 | 52 | 22.40* | 3.97 | 86 | 29.34 | 3.04 | 11 |
| 15.08* | 5.87 | 40 | 22.77* | 3.90 | 41 | 29.83 | 2.99 | 21 |
| 15.20* | 5.82 | 46 | 23.64* | 3.76 | 39 | 30.37 | 2.94 | 15 |
| 16.16 | 5.48 | 25 | 24.30 | 3.66 | 13 | 30.92 | 2.89 | 17 |
| 16.44 | 5.39 | 22 | 24.88* | 3.58 | 41 | 31.68 | 2.82 | 6 |
| 17.02* | 5.20 | 46 | 25.09* | 3.55 | 44 | 32.44 | 2.76 | 9 |
| 17.31* | 5.12 | 66 | 25.44 | 3.50 | 9 | 33.39 | 2.68 | 5 |
| 17.79* | 4.98 | 41 | 25.76 | 3.46 | 15 | 34.31 | 2.61 | 34 |
| 18.24 | 4.86 | 8 | | | | | | |

*Peaks may in some embodiments be considered as prominent peaks observed in the XRPD pattern.

In one embodiment, Form A exhibits an onset of melting at a temperature of 116-120° C., preferably at about 117° C., when assessed using differential scanning calorimetry (DSC).

In one embodiment, Form A exhibits a weight loss of <1%, preferably <0.5%, more preferably less than <0.3%, or <0.2%, prior to the onset of melt using DSC when assessed using Thermo-Gravimetric Analysis (TGA).

As used herein, crystalline preferably means a material that has an ordered, long range molecular structure. The degree of crystallinity of a crystal form can be determined by many techniques including, for example, powder X-ray diffraction, moisture sorption, differential scanning calorimetry, solution calorimetry, and dissolution properties.

Crystalline organic compounds consist of a large number of atoms that are arranged in a periodic array in three-dimensional space. The structural periodicity normally manifests distinct physical properties, such as sharp, explicit spectral features by most spectroscopic probes (e.g., X-ray diffraction, infrared and solid-state NMR). X-ray diffraction (XRD) is acknowledged to be one of the most sensitive methods to determine the crystallinity of solids. Crystals yield explicit diffraction maxima that arise at specific angles consistent with the lattice interplanar spacings, as predicted by Bragg's law. On the contrary, amorphous materials do not possess long-range order. They often retain additional volume between molecules, as in the liquid state. Amorphous solids normally unveil a featureless XRD pattern with broad, diffuse halos because of the absence of the long-range order of repeating crystal lattice.

Crystalline forms are preferred in many pharmaceutical applications. Crystalline forms are generally thermodynamically more stable than amorphous forms of the same substance. This thermodynamic stability is preferably reflected in the improved physical stability of the crystalline form. The regular packing of the molecules in the crystalline solid preferably denies the incorporation of chemical impurities. Hence crystalline materials generally possess higher chemical purity than their amorphous counterparts. The packing in the crystalline solid generally constrains the molecules to well defined lattice positions and reduces the molecular mobility that is the prerequisite for chemical reactions. Hence, crystalline solids, with very few notable exceptions, are chemically more stable than amorphous solids of the same molecular composition. Preferably, the crystalline forms of the benzgalantamine gluconate disclosed in the present application possess one or more of the advantageous chemical and/or physical properties disclosed herein.

As used herein, the term stable may relate to either chemical stability or to polymorph stability. Polymorph stability refers to the likelihood of a polymorph form remaining in its specific crystalline state under suitable storage conditions. For example, a stable polymorph form will maintain at least about 95% by weight, preferably at least about 98% by weight, and more preferably at least about 99% by weight or more of the crystalline form, in other words the form remains unchanged after storage under the indicated conditions for the indicated time. In the context of the presently claimed methods, Form A of the benzgalantamine gluconate appears to show good stability for example under conditions of storage at room temperature, and at low water activities, such at or under about 43% RH or of less than 0.12 aw, for multiple months. In some embodiments, Form A shows good chemical stability. In other words, benzgalantamine gluconate as Form A shows low, negligible or no conversion to distinct chemical structures, after storage under the appropriate conditions.

Powder X-ray diffraction (XRPD) measures the diffraction pattern of a crystalline material. Each active pharmaceutical ingredient (API) will produce a specific pattern depending on the structure of its crystal lattice. Each polymorph, pseudopolymorph, polymorph salt, or co-crystalline material will have its own specific pattern. For this reason, XRPD of an API can be carried out in controlled conditions to assess the presence or absence of crystalline material and any form conversions.

PXRD can also be used to determine if any change in crystalline form in the drug product has occurred during e.g. storage or stability studies. The identification of a crystalline form therefore relies on the presence of detectable diffraction peaks for any given crystalline form. In addition, the API peaks must be distinguishable from any crystalline excipient peaks, should a composition be assessed post-formulation. PXRD can also be used as a qualitative and sometime quantitative assessment of the degree of crystallinity of a pure API. A skilled person can assess PXRD patterns and identifying the presence and/or absence of suitable peaks that can be employed to characterize any given crystalline form of an API without undue effort.

In some embodiments, the peaks determined by a PXRD analysis are essentially the same as those presented in the examples below. The term "essentially the same" with reference to PXRD means that variabilities in peak positions and relative intensities of the peaks are to be taken into account. For example, a typical precision of the 2-Theta values is in the range of ±0.2° 2-Theta.

As used herein, characteristic XRPD peaks are a subset of the representative peaks from XRPD patterns of a crystalline form of a material that statistically can be proven to differentiate it from the other crystalline forms of that material. Not all crystalline polymorphs of a material necessarily have characteristic peaks.

As used herein, prominent XRPD peaks are typically the strongest low angle, non-overlapping peaks observed in the XRPD pattern. In some embodiments, the "prominent peaks" have preferably a ≥20% relative intensity, preferably ≥30% relative intensity, more preferably ≥40% relative intensity, in a powder X-ray diffraction pattern.

As used herein, representative XRPD Peaks are peaks from XRPD patterns of a crystalline form of a material that statistically show no bias from particle size/shape or preferred orientation during repeated samples and measurements.

As used herein, preferred orientation is phenomena observed in XRPD analyses where due to size/shape of the particles and the pattern collection technique employed it is very difficult or impossible to randomly orient the particles of the material during collection to achieve a pattern with statistically consistent intensities.

With respect to the relative intensities and the prominent peaks of the powder X-ray diffraction patterns mentioned above, the provided values of relative intensity are not intended as limiting for the identification of the prominent or characteristic peaks mentioned. As is known to a skilled person, the relative peak intensities will show some inter-apparatus variability, batch-to-batch variability, as well as variability due to degree of crystallinity, preferred orientation, sample preparation, and as such are provided as an indication and as a qualitative measure only, but not a limiting definition, of the intensities of the peaks in the powder X-ray diffraction patterns.

The term "prominent peak" in the context of defining the present, claimed methods, is therefore not limited to the respective relative intensities provided above, and any one or more of the respective peaks may be determined as a prominent peak for any given form of benzgalantamine gluconate. Preferably at least 1, 2, 3 or 4 prominent peaks are used to characterize a crystalline form, in other embodiments, at least 5, 6, 7, 8 9 or 10 prominent peaks may be employed. A prominent peak is therefore also not limited to a peak unique to any given crystal form, rather the peak can, optionally in combination with a number of other peaks from the PXRD pattern, be used to identify a crystal form. In the context of the presently claimed methods, crystal Forms A-D may share multiple prominent peaks but also exhibit peaks distinct from one another that can be used to differentiate between any two forms. In some embodiments, the prominent peaks mentioned in the embodiments of the disclosure may also be characteristic peaks and/or representative peaks.

The term "active ingredient" or "API" herein refers to a pharmaceutically active molecule as well as a pro-drug transformed to the pharmaceutically active molecule in the organism (e.g., benzgalantamine (ALPHA-1062)), and a pharmaceutically acceptable and/or therapeutically active salt thereof (e.g., benzgalantamine (ALPHA-1062) gluconate). The term further refers to pharmaceutically acceptable and therapeutically active hydrates, esters, amides, metabolites, enantiomers, polymorphs, analogs, etc. that induce a desired pharmacological or physiological effect or induce a desired pharmacological or physiological effect upon transformation to a pharmaceutically active molecule in the organism. Terms like "active agent", "active pharmaceutical ingredient", "drug substance", may be used synonymously for "active ingredient". The term "pharmaceutically active molecule" herein refers to a molecule that induces a desired pharmacological or physiological effect in an organism and/or subject. Terms like "active drug", "active molecule", "therapeutically active molecule", "therapeutically active drug", may be used synonymously for "pharmaceutically active molecule".

A "tablet" as used herein is considered a solid unit dosage form of a medicament comprising one or more excipients.

The term "excipient" means a pharmacologically inactive component such as a filler, lubricant, binder, disintegrant, glidant, flavoring agent, sweetener, colorant, film formers, gelling agent, acid regulator, preservative agent, absorption enhancers, stabilizing agent and the like, of a pharmaceutical product. The excipients that are useful in preparing a pharmaceutical composition are generally safe, non-toxic and are acceptable for veterinary as well as human pharmaceutical use. Reference to an excipient includes both one excipient and more than one excipient.

Non-limiting examples of oral solid dosage forms include tablets, capsules, powders, granules, and lozenges.

The excipients are described herein in some embodiments according to "wt %", or "percentage by weight" or "% by weight. The % wt values recited herein preferably relate to the percentage of material by weight present in the pharmaceutical composition in the form of a tablet.

According to the presently claimed methods, a filler may be used as a bulking agent in tablets. Fillers used for tablets include but are not limited to sugars and sugar alcohols such as lactose, saccharose, glucose, mannitol, sorbitol, xylitol, and the like, oligo- and polysaccharides such as corn starch, rice starch, potato starch, wheat starch, modified starch derivatives, cellulose, microcrystalline cellulose (MCC), and the like, inorganic binders such as calcium phosphate, calcium hydrogen phosphate, calcium carbonate, and mixtures thereof.

According to embodiments of the claimed methods, the preferred filler is mannitol. Mannitol (CAS No. 69-65-8) is a hexavalent sugar alcohol structurally derived from mannose and is naturally occurring among others in plants, algae and lichens. In the pharmaceutical industry mannitol is used as a filler, sweetener and binder. In the context of the disclosure, mannitol is defined as a filler, preferably a water-soluble filler.

A glidant improves the flow properties of powder mixtures by reducing interparticle friction, so that the powder can flow better from the from the filling shoe into the die of the tablet press. Thus, flow regulators also improve the dosing accuracy. In particular, highly dispersed silicon dioxide such as colloidal silicon dioxide is used as a glidant.

Silicon dioxide is the oxide of silicon. It is a natural substance that occurs for example in crystalline in quartz, granite and sand, and is used in the manufacture of glass. In the pharmaceutical industry, various grades of silicon dioxide find wide application as excipients. Thereby in particular, highly dispersed silicon dioxide such as colloidal silicon dioxide is used as a glidant. The production of colloidal or highly dispersed silicon dioxide is carried out by flame hydrolysis from SiCl4 resulting in submicroscopic amorphous spheres of approx. 7-16 nm in diameter and an extremely large surface area of about 200 m2/g. Addition of low amounts of about 0.5% are usually sufficient to achieve substantially improved flow properties of powders.

A lubricant is an excipient added to facilitate the tableting process. Lubricants may facilitate flowability of a powder to easily fill in a die, may reduce friction between powder particles themselves and friction among a die, punch, granules and powder, and may facilitate tablet compressing and discharge from a die. Lubricants may thus prevent sticking of tablet compounds and tablets to tablet press punches and the die. Lubricants used for the formulation of tablets include magnesium stearate, calcium behenate, glycerol monostearate, stearic acid, sodium stearyl fumarate, talcum, hydrated vegetable fats such as hydrogenated castor oil, hydrogenated cottonseed oil and mixtures thereof. According to the disclosure, the one or more lubricants are preferably selected from the group consisting of sodium stearyl fumarate and magnesium stearate.

Sodium stearyl fumarate (CAS No. 4070-80-8) is synthetically produced by reacting stearyl alcohol with maleic anhydride. The product of this reaction then undergoes an isomerization step followed by salt formation to produce sodium stearyl fumarate. Sodium stearyl fumarate is used in oral pharmaceutical formulations as lubricant and is generally regarded as a nontoxic and nonirritant material.

Magnesium stearate (CAS No. 557-04-0) is the magnesium salt of stearic acid and belongs to the lime soaps. Magnesium stearate is a salt consisting of a magnesium ion (Mg2+) and two stearates. Magnesium stearate is water insoluble. It has a lamellar crystal structure resulting in reduction of the internal friction and a very small particle size of 3 to 15 µm. Thus, magnesium stearate is a well suited as lubricant as it attaches to the surface of other particles in a powder mixture, reducing inter-particulate friction and friction with external surfaces.

In one embodiment, the disclosed composition may optionally comprise additional excipients such as a binder, a disintegrant and/or a flavoring agent.

A binder holds the ingredients in a tablet together and increases hardness and stability of a tablet. Binders are employed during granulation and for direct compression of tablets, ensuring that tablets and granules can be formed with required mechanical strength. Binders are preferably macromolecular polar amorphous substances that exhibit isotropic deformation due to their amorphous nature and provide optimum conditions for pouring into any available cavity during compression. Binders for granulation act as processing aid during the granulation process. During direct compression of tablets binders are used to increase the cohesion of the powdery particles during compression, in order to obtain pharmaceutical forms with a defined hardness.

Binders can be classified into natural binders, semisynthetic polymer binders and synthetic polymer binders. In the context of the present disclosure the expression "natural binder" refers to a natural polymer binder, or a salt thereof or an inorganic binder including starches, processed or pretreated starches or starch salts, e.g., corn starch, potato starch, sodium starch, pregelatinized starch; alginic acid or salts thereof, e.g., sodium alginate; gelatin; Guar gum; gum Arabic; Candelilla wax; Carnauba wax, dextran, sugars and hexitols such as lactose, mannitol, saccharose and inorganic calcium compounds such as calcium hydrogen phosphate and tribasic calcium phosphate.

The expression "semisynthetic polymeric binder" refers to a chemical derivative of natural polymer binder, including chemical derivatives of cellulose or starch, preferably selected from the group consisting of hydrolyzed starches such as dextran and maltodextrin, hydroxypropyl cellulose (HPC, hyprollose), hydroxypropyl methyl cellulose (HPMC, Hypromellose), methyl cellulose (MC), sodium carboxymethyl cellulose, and hydroxypropyl starch, microcrystalline cellulose (MC).

The expression "polymeric binder" refers to a fully chemically synthesized, non-natural polymer or co-polymer binder agent, preferably selected from the group of polyvinyl alcohol, polyvinyl caprolactam-polyvinyl acetate, polyethylene glycol (PEG), polyethylene glycol graft copolymer, and polyethylene glycol-polyvinyl alcohol graft copolymer (PEG-PVA), povidone (PVP), copovidone (COP), crospovidone (XPVP).

A disintegrant is an excipient used in tablets causing disintegration of the tablet, dissolution, and release of the active ingredient upon contact with moisture. Disintegrants can be classified into substances that increase capillarity, absorb moisture and swell, compounds which, when exposed to moisture flare up with gas evolution and substances that increase the wettability of the tablets (hydrophilizing agents).

Substances increasing capillarity include soy polysaccharides, alginic acid, crosslinked alginic acid, calcium alginate, natrium alginate, starches such as corn starch, pretreated starches such as pregelatinized starch, sodium carboxymethyl cellulose, crosslinked sodium carboxymethyl cellulose, sodium carboxymethyl starch, crosslinked sodium carboxymethyl starch, sodium starch glycolate, polyvinylpyrrolidone and crosslinked polyvinylpyrrolidone. Significant for the effect of this group is the exerted swelling pressure, the porosity and wettability of the tablet influencing the penetration of water into the tablet, which is a prerequisite for the disintegration process. These disintegrants are highly effective if they have high swellability, high swelling pressure and form a pore system in the tablet with sufficient wettability.

Highly effective disintegrants, which are more effective at much lower concentrations with greater disintegrating efficiency and mechanical strength compared with other disintegrants, are referred to as superdisintegrants. Superdisintegrants include soy polysaccharides, crosslinked alginic acid, sodium carboxymethyl cellulose, crosslinked sodium carboxymethyl cellulose, sodium carboxymethyl starch, crosslinked sodium carboxymethyl starch, sodium starch glycolate, polyvinylpyrrolidone and crosslinked polyvinylpyrrolidone. These water-insoluble substances have a high swelling capacity as well as a high capillary activity and ensure spontaneous and complete disintegration without slime formation.

Compounds which, when exposed to moisture flare up with gas evolution include sodium hydrogen carbonate and hydrogen carbonate in combination with citric acid or tartaric acid. Tablets with such a disintegrant disintegrate rapidly due to carbon dioxide evolution upon an acid reaction. These disintegrants are commonly used for oral tablets or effervescent tablets.

Hydrophilizing agents include sodium lauryl sulfate, polysorbate, highly dispersed silicon dioxide and microcrystalline cellulose (MCC). The representatives of this group are technically not considered as disintegrants themselves. Rather, they enable disintegrants to become optimally effective. The tableting of lipophilic substances often causes considerable difficulties, since the wettability of such tablets is low, so that the incorporated disintegrants have no effect or only a very delayed effect. The addition of surface-active substances that hydrophilize the tablets (hydrophilizing agents) ensure penetration of water into the tablet and act on the incorporated disintegrants.

To correct the taste, flavoring agents as well as sweeteners such as sugar, sugar substitutes and sugar replacements can optionally be added to the disclosed compositions. The taste receptors of the tongue can distinguish between the following tastes: sweet-sour-bitter-salty-umami. The basic taste of a drug can be harmonized by adding flavoring agents or sweeteners of the same or similar taste-direction (e.g., sour taste with lemon) or covered with the opposite taste-direction (e.g., bitter taste with vanilla). Because of its instability to hydrolysis in the presence of acidic active ingredients and its caries-promoting and calorie-providing effect, sugar (sucrose) as a sweetener is increasingly replaced by sweeteners, such as fructose, sorbitol, mannitol, xylitol, cyclamate, saccharin, or aspartame.

Methods for preparation of tablets include direct tableting (direct compression) and granulation including wet and dry granulation followed by compression. Tablet compression is carried out by a tablet press, which is a high-speed mechanical device. Two types of tablet presses are mainly used including eccentric presses and rotary presses. Both have two movable punches per functional unit (lower and upper punch), a die, and a hopper. These types of presses and their use are known to a person skilled in the art. According to the presently claimed methods direct compression is preferred.

In most cases, it is necessary to granulate the active ingredients and excipients before tableting, i.e., to convert the powder particles into granules. This results in a product with a larger particle size, which, compared to powder particles, has better flowability. This ensures a continuous, uniform filling of the die of the tablet machine resulting in a constant tablet mass and high dosing accuracy. A granule is an asymmetric aggregate of powder particles that normally do not have a harmonious geometric shape and has an uneven, jagged or roughened surface resulting in good compressibility. Techniques for preparation of granulates include wet and dry granulation and are known to a person skilled in the art.

Direct tableting is the compression of powdered active ingredients or mixtures of active ingredients and excipients. According to embodiments of the disclosure, a powder or powder blend also termed "composition blend" or "blend" herein is compressed, which is a substantially dry solid, preferably composed of a large number of fine particles that may flow when shaken or tilted.

Direct tableting is characterized by a low workload and is thus more economical than the compression of granules, which requires the preceding steps of granulation before tablet compression. Direct tableting is further particularly advantageous for the processing of moisture- and heat-sensitive active ingredients whose stability is at risk during granulation operations.

However, not all active ingredients and excipients are suitable for direct compression as cohesion forces between the blend particles might not be sufficient for formation of tablets with sufficient hardness or powder flow properties impede direct processing of the composition blend. By the addition of excipients such as binders, glidants, lubricants powder blends which are suitable for direct tableting can be obtained. Further, a good miscibility of the excipients and the active ingredients is a prerequisite for direct tableting. Powder mixtures tend to segregate e.g., due to different sizes and densities of excipient and active ingredient particles. The homogeneity of the mixture must be ensured during all process steps.

Tablet coating is a process by which an essentially dry, outer layer of coating material is applied to the surface of a dosage form such as a tablet. Typically tablet coating involves the application of a sugar or polymeric coat on the tablet. The advantages of tablet coating may relate to one or more of, taste masking, odor masking, physical and chemical protection or control of release profile. There are two main methods usually applied for coating of pharmaceutical dosage forms: drum coating and fluidized bed coating. Drum coating is usually employed for coating of large, non-fluidizable particles such as tablets and capsules. Whereas drum coating may also be employed for coating pellets. A person skilled in the art is capable of choosing a suitable coating method with respect to the dosage form and coating agent.

For immediate-release tablets, a film coating is applied, which does not change the dissolution profile of core tablets significantly. The film coating is usually applied for better visual differentiation by color of different tablet strengths in order to avoid medication errors, and for improving the patient acceptance, e.g. easier swallowing. As disclosed in the US FDA guidance "Size, Shape, and Other Physical Attributes of Generic Tablets and Capsules" (dated Jun. 18, 2015), the presence of a coating can potentially affect the ease of swallowing tablets. The lack of a film coating can also decrease or prevent tablet mobility and increase esophageal transit times compared with a coated tablet of the same size and shape. Coating also can affect other factors that contribute to patient acceptance, such as palatability and smell.

A film coating may also serve as a basis (also termed sub-coating) for one or more further coatings to be applied on top of the film coating such as an enteric coating and/or a top-coating. A sub-coating may prevent interaction of the active ingredient with the additional coating such as the enteric coating. Materials ("coating agents") for film coating are known to a skilled person and comprise, without limitation, hydroxypropyl methyl cellulose (HPMC, hypromellose), polyethylene glycol (PEG, Macrogol), copovidone, povidone, polyvinyl alcohol and/or methacrylate polymers such as Eudragit E100. Besides a polymer, a film coating may comprise further excipients including without limitation a plasticizer, a colorant, and/or an opacifier.

An "enteric coating" prevents dissolution or disintegration of a tablet in the acidic environment of the stomach. An enteric coating is usually applied for protecting a drug from degradation at acidic pH and by enzymes present in the stomach. Enteric coating may further prevent adverse effects associated with the dissolution of drugs in the stomach. Further, enteric coating may be configured to dissolve at a certain pH to control release of a drug from a tablet within the gastrointestinal tract. In one embodiment the enteric coating is configured to dissolve at pH 5.5 or above. In one embodiment the enteric coating is configured to release benzgalantamine in the small intestine of a subject at pH 5.5 and above. Materials for enteric coating are known to a skilled person and comprise, without limitation poly(meth)acrylate polymer such as a copolymer of methacrylic acid and ethyl acrylate, cellulose acetate phthalate (CAP), cellulose acetate succinate, hydroxypropyl methylcellulose phthalate, hydroxypropyl methylcellulose acetate succinate, polyvinyl acetate phthalate (PVAP), shellack, cellulose acetate trimellitate and/or sodium alginate.

In one embodiment, the enteric coating is, or comprises, a methyl acrylate co-polymer, or derivative thereof. By way of example, products from SheffCoat™ enteric film coatings, such as SheffCoat™ ENT, may be employed to achieve pH dependent release, i.e., dissolution at pH 5.5 and above. SheffCoat™ ENT is a functional delayed release or enteric film coating that releases the API at a specific pH and/or area of the digestive tract. SheffCoat™ ENT provides consistent and reproducible delayed release performance by solubilizing at pH 5.5 or above. For example, the product SheffCoat™ ENT MA is a functional delayed release or enteric film coating based on a methyl acrylate co-polymer that releases the API at a specific pH and/or area of the digestive tract.

In one embodiment, the enteric coating is, or comprises, a hydroxypropyl methylcellulose (HPMC) or hypromellose, or derivative thereof. In one embodiment, the enteric coating is, or comprises, a hydroxypropyl methylcellulose phthalate (HPMC-P). HPMC-P (also known as hypromellose phthalate) is typically known as a modified form of HPMC and is a phthalic half ester. There are at least two types of HPMC-Ps known to a skilled person with different solubilities, for example HP-55 and HP-50, which show relevant pH release profiles. HPMC-P is often used as an enteric coating material to prevent drug degradation in gastric acid. The chemical structure of HPMCP is a monophthalic acid ester of hypromellose. The threshold pH value for rapid disintegration of HPMCP can be controlled by varying the phthalyl content. Moreover, HP-55S, a special type of HP-55, which is distinguished by its higher molecular weight, greater film strength and higher acid resistance properties, has also been introduced. A suitable grade of HPMCP can be selected for a particular purpose in accordance with each preparation. By way of example, SheffCoat™ ENT HPMC-P is a functional delayed release or enteric film coating that releases the API at a specific pH and/or area of the digestive tract. SheffCoat™ ENT HPMC-P provides consistent and reproducible delayed release performance by solubilizing at pH 5.5 or above.

In one embodiment, the enteric coating is, or comprises, a hypromellose acetate succinate (HPMCAS). Hypromellose acetate succinate (HPMCAS) is another enteric coating material that can be used in aqueous or organic media. Hypromellose is a non-toxic material which has been used in pharmaceutical, food, and cosmetic industries for many years. Based on hypromellose, acetyl and succinoyl groups are introduced to the hydroxyl groups of the backbone. By way of example, products such as Shin-Etsu AQOAT®, hypromellose acetate succinate (HPMCAS) may be employed. There are nine grades with different particle sizes (fine, medium, granular) and chemical substitution levels of acetyl and succinoyl groups to obtain an opening pH range from 5.5 to 6.5. Shin-Etsu also offer various products based on HPMC or HPMC-P for enteric coating.

In one embodiment, the enteric coating is, or comprises, a polymer phthalate, or derivative thereof. In one embodiment, the enteric coating is, or comprises, a polyvinyl acetate phthalate (PVAP). Polyvinyl acetate phthalate (PVAP) is a polymer phthalate commonly used in the formulation of pharmaceuticals for the enteric coating of tablets or capsules. It is a vinyl acetate polymer that is partially hydrolyzed and then esterified with phthalic acid. By way of example, products from Sureteric® employ PVAP and enable pH dependent release suitable as an enteric coating. By way of further example, Opadry Enteric is a family of enteric coating products that enable delayed release coating systems for solid oral dosage forms. These products may be applied organic or hydro-alcoholic processing techniques. Specific Opadry Enteric coating formulations have been developed from a choice of enteric polymers, with solubility as a function of the environmental pH in the gastro-intestinal tract. Opadry Enteric products may be based on polyvinyl acetate phthalate (PVAP), hypromellose Phthalate (HPMC-P), or a methacrylic acid copolymer (for example, methacrylic acid-methyl methacrylate 1:1 copolymer).

In one embodiment, the enteric coating is, or comprises, a cellulose ester, or derivative thereof. In one embodiment, the enteric coating is, or comprises, cellulose acetate phthalate (cellacefate). Cellulose acetate phthalate is known under the CAS number [9004-38-0], or under the chemical name cellulose, acetate, 1,2-benzenedicarboxylate. Cellulose acetate phthalate (CAP), also known as cellacefate (INN), is a commonly used polymer phthalate in the formulation of pharmaceuticals, such as the enteric coating of tablets or capsules and for controlled release formulations. It is a cellulose polymer where about half of the hydroxyls are esterified with acetyls, a quarter are esterified with one or two carboxyls of a phthalic acid, and the remainder are unchanged. By way of example, products from Eastman may be employed, for example, Eastman C-A-P enteric coating material is a pH-sensitive cellulose derivative designed for coating pharmaceutical tablets or granules. It may also be used as a matrix material in solid dosage forms. Eastman C-A-P enteric coating material withstands prolonged contact with acidic gastric fluids, but can be configured to dissolve in the mildly acidic to neutral environment of the small intestine.

In one embodiment, the enteric coating is, or comprises, shellac, or derivative thereof. In one embodiment, the enteric coating is, or comprises, a mixture of shellac and sodium alginate. In one embodiment, the enteric coating is, or comprises, a mixture of shellac and an additive, preferably a polymer, such as polyvinyl alcohol (PVA), hydroxypropyl methylcellulose (HPMC), and/or a cross-linked polyacrylic acid polymer, or any other one or more of the coating materials mentioned herein. Shellac is a natural polymer used for various coating applications, for example in pharmaceutical compositions for film coatings or to achieve enteric applications, controlled release properties, taste masking, or seal coating. Shellac is an approved food additive in the United States and in Europe and is also listed in the United States Pharmacopeia, European Pharmacopoeia, Japanese Pharmacopoeia, Food Chemicals Codex. Shellac is a resin derived from insects, the *Kerria lacca* species (family name Coccidae), also known as lac. Shellac is typically produced from the lac insect's resinous secretion, which occurs when lac insects attach themselves to the bark of particular host trees and feed on the tree's sap. Shellac structurally comprises esters from polyhydroxy carboxylic acids and other polar and nonpolar components. By way of example, four common carboxylic acid components ar: aleuritic (approx. 35%), jalaric (approx. 25%), shellolic (approx. 8%), and butolic (approx. 8%). In some enteric coatings, a combination of plasticizers and/or surfactants improves shellac's flexibility and increases the adhesive structural reinforcement properties of the coating. Shellac formulations (e.g., Protect™, Sensient) have proven successful in functional reproducibility and product stability over time. In some coatings, with the addition of sodium alginate, the enteric film-coating system provides gastric protection with good film adhesion and flexibility for particles, tablets, and capsules. In embodiments, an aqueous shellac formulation may be combined with one or more additives, such as a polymer additive, for example polyvinyl alcohol (PVA), hydroxypropyl methylcellulose (HPMC), and/or a cross-linked polyacrylic acid polymer (carbomer 940). Examples are presented in Schad et al, Pharmaceutical Technology, Volume 2013, Supplement Issue 5, or US Patent Publication 2007/0071821A, which are incorporated by reference herein. By way of example, Protect™ (from Sensient) is an effective two-part enteric coating system that combines aqueous shellac and Sodium Alginate. By way of further example, EP 1579771 A1 describes a water-based shellac dispersion which comprises shellac, a basic amino acid, a basic phosphate and water. Aqueous ammoniated shellac dispersions are also commercially available, for example Certiseal® FC 300A. Esterification of the shellac may occur as shellac forms a salt with the ammonia or protonated amino acid. According to US20110002986A1, shellac may be combined with a non-ammonium alkali salt.

In embodiments, the enteric coating is, or comprises, one or more materials selected from the group consisting of a methyl acrylate co-polymer (methacrylic acid copolymer) or derivative thereof (such as a copolymer of methacrylic acid and ethyl acrylate), a hydroxypropyl methylcellulose (HPMC) or derivative thereof (such as a hydroxypropyl methylcellulose phthalate (HPMC-P) or hypromellose acetate succinate (HPMCAS)), a polymer phthalate or derivative thereof (such as polyvinyl acetate phthalate (PVAP)), a cellulose ester or derivative thereof (such as cellulose acetate phthalate (cellacefate)), and shellac or derivative thereof (such as a mixture of shellac and sodium alginate). In embodiments, any of the coating materials, or derivatives of the enteric coating materials, described herein maintain the desired dissolution at pH 5.5 and above, or may be configured to maintain the desired dissolution at pH 5.5. As is evident from the above, the enteric coating of the present invention is configured for dissolution at pH 5.5 and above.

A skilled person is aware of various chemicals, polymers and the like that can be employed to enable such an enteric coating.

The delayed release dosage forms used in the methods disclosed herein may use one or more of these coating to achieve the desired $T_{max}$.

Eudragit L-55 is an anionic copolymer of methacrylic acid and ethyl acrylate in an acid-ester ratio of about 1:1. The polymer is soluble at pH 5.5 or above. The polymer is commercially available as Eudragit L 30 D-55 (30% aqueous dispersion), Eudragit L 100-55 (powder) or Acryl-Eze II.

Upon administration to a subject, a drug undergoes several effects and processes referred to as pharmacokinetics of the drug. The totality of all effects and processes influencing an active ingredient in an organism or subject is referred to as the liberation, absorption, distribution, metabolism and excretion (LADME) model, including liberation after administration, absorption also termed "resorption" herein, distribution, metabolism and excretion of the drug and its metabolites.

Liberation is the release of the active ingredient from the dosage form after administration, i.e., the conversion into a resorbable, dissolved form. The liberation of a drug is influenced by the pharmaceutical composition and excipients used therein. Liberation of the drug from sublingual and buccal tablets for administration in the oral cavity usually occurs fast due to short disintegration times of the tablets.

Absorption is the subsequent uptake of the drug through biological membranes, such as gastrointestinal mucosa, muscle tissue, into the bloodstream or lymphatic system. The absorption of a drug is dependent on the size of the absorption site, contact time and blood perfusion of the application site and further the physicochemical properties of the drug such as lipophilicity. The oral mucosa is well perfused, often resulting in a rapid onset of action and high blood levels of a drug. However, a balance must be found between good dissolution of the drug, which may be hindered in the case of highly lipophilic drug, and good absorption by the lipophilic mucosa, which is promoted by the lipophilicity of the drug.

The distribution of a drug refers to the transport of substances between different body fluids and tissues and is dependent on for example vascular permeability, perfusion rate of the tissue, pH value of the tissue, the blood brain barrier and the plasma protein and tissue binding ability of the drug and its lipophilicity.

A drug is subject to biochemical conversion and degradation processes at various sites in the body, the totality of which is referred to as metabolism or biotransformation. The first-pass effect thereby describes the proportion of substance metabolized during the first passage through the gut and liver.

The excretion of a drug or its metabolites from the bloodstream occurs largely via the kidneys and urine (renal excretion). A small proportion is excreted via the bile into the small intestine and subsequently in the stool. Of minor importance is excretion via skin (sweat) or mucosa (intestinal mucosa, intestinal excretion), as well as via the lungs (pulmonary excretion).

Important parameters describing the pharmacokinetics of a drug include the time of maximum concentration in the plasma ($t_{max}$), the half-life in plasma ($t_{1/2}$), the maximum concentration in plasma ($C_{max}$), the area under the curve (AUC), the distribution volume and the clearance.

For the characterization of absorption and for the estimation of bioequivalence of generic drugs, often the maximal plasma concentration ($C_{max}$) and the time to reach the $C_{max}$ ($t_{max}$) are reported. $T_{max}$ is proportional to the absorption velocity and independent of the dose, providing information about the velocity of drug absorption thus allowing conclusions to be drawn about the expected time of onset of the effect. $C_{max}$ is proportional to the administered dose and provides information about extent and velocity of drug absorption. If there is a direct correlation between plasma levels of the drug and the effect of the drug, $C_{max}$ gives an indication of the intensity of the effect. In addition, it can be assessed whether the plasma concentrations are within the therapeutically acceptable range.

The Area under the curve (AUC) refers to the area under the concentration-time curve (usually plasma level curve). It is a measure of the total amount of substance absorbed thus describing the systemically available amount of drug. The elimination half-life (plasma half-life, $t_{1/2}$) is the time during which the plasma concentration drops to half of the original value. According to the half-lives drugs can be divided into short-, medium- and long and long-acting drugs. The AUC can be calculated by several methods, including the trapezoidal rule and compartmental data analysis. These calculation methods are known to a person skilled in the art.

The Bioavailability of a drug is defined as the rate and extent to which the drug or active ingredient is absorbed from a dosage form and is present in the systemic circulation and/or at the site of action. The absolute bioavailability thereby describes the extent to which the active ingredient from a dosage form is systemically available compared to an intravenous solution of the active ingredient. The absolute bioavailability is determined by the physicochemical properties of the drug, the dosage form, and the physiological conditions at the absorption site. Relative bioavailability describes the extent and rate at which the active ingredient from a dosage form is systemically available compared to a reference dosage form applied by the same administration route. The relative bioavailability is usually determined by the dosage form.

Pharmaceutical load is defined as the amount of a drug in a dosage form, or the initial dose of a drug given to a subject to reach an effective therapeutic level. Decreasing pharmaceutical load is advantageous because it minimizes side effects associated with larger dosages and/or dosing regimens. In the present methods, pharmaceutical load is reduced by administering delayed release formulations (5 mg, 10 mg, 15 mg) at specific time points and with the different formulations being used as an initial dosage given for an initial period of time, a maintenance dosage given over a period of time following the initial dosage, and a maximum dosage following the initial dosage.

EXAMPLES

The claimed methods are demonstrated by way of the examples disclosed herein. The examples provide technical support for a detailed description of potentially preferred, non-limiting embodiments of the disclosure.

Example 1: Compositions

General Procedure for the Preparation of Compositions by a Direct Compression Process:

Step-1 (Blending):
  I. The API (benzgalantamine (ALPHA-1062) gluconate Form A) is milled.
  II. A glidant and a first portion of a filler are blended with the API and subsequently de lumped through a mesh.
  III. A second portion of the filler is de lumped through a mesh and blended with the—mixture of step II.
  IV. One or more lubricants are de lumped through a mesh and blended with the mixture of step III.

Step-2 (Compression):
  The blend from Step-1 IV is compressed into tablets by a compression machine using suitable machine parameters and suitable tooling.

Step-3 (Sub-Coating):
  I. A 7.5% suspension of a film former in purified water is prepared.
  II. The tablets of step-2 are charged into a coating pan and warmed until a bed temperature of 50° C. is obtained.
  III. The suspension of step I. is sprayed onto the tablets.
  IV. Once the target weight of coating is achieved, spraying is stopped, and the tablets are allowed to cool until a bed temperature of <30° C. is reached.

Step-4 (Enteric Coating):
  I. A 20% suspension of a film former for enteric coating is prepared in purified water.
  II. The sub-coated tablets of step-3 are charged into a coating pan and warmed until a bed temperature of 33° C. is obtained.
  III. The suspension of step I. is sprayed onto the tablets.
  IV. Once the target weight of coating is achieved, spraying is stopped, and the tablets are allowed to cool until a bed temperature of <30° C. is reached.

Example Formulations

TABLE 1

Representative benzgalantamine Delayed Release Tablet Formulations (5 mg, 10 mg, 15 mg)

| Component | % w/w | 5 mg | 10 mg | 15 mg |
|---|---|---|---|---|
| Tablet Core | | | | |
| Benzgalantamine Gluconate API (Galantamine Benzoate; Gluconate Form A) | 12.692% | 7.506 | 15.012 | 22.516 |
| Mannitol (Pearlitol 200SD) | 82.768% | 48.949 | 97.898 | 146.833 |
| Colloidal Silicon Dioxide (CaboSil M5P) | 1.000% | 0.591 | 1.182 | 1.774 |
| Sodium Stearyl Fumarate (PRUV) | 2.540% | 1.502 | 3.004 | 4.506 |
| Magnesium Stearate | 1.000% | 0.591 | 1.182 | 1.774 |
| Total | 100.000% | 59.140 | 118.280 | 177.403 |

TABLE 1-continued

Representative benzgalantamine Delayed Release Tablet Formulations (5 mg, 10 mg, 15 mg)

| Component | | % w/w | 5 mg | 10 mg | 15 mg |
|---|---|---|---|---|---|
| Tablet Coating | | | | | |
| Opadry (seal) (sub-coating) | | 5% of tablet core | 2.957 | 5.914 | 8.870 |
| Acryl-EZE II (enteric) | White | 10% of sub-coated tablet core | 6.210 | — | — |
| | Grey | 7.5% of sub-coated tablet core | — | — | 13.970 |
| | Purple | 9% of sub-coated tablet core | — | 11.178 | — |
| Total | | — | 68.306 | 135.372 | 200.244 |

Dissolution Studies:

Methodology:

ALPHA-1062 (benzgalantamine) Delayed Release tablets are tested by two stage dissolution, first in acidic stage followed by buffer stage. The dissolution is conducted as per the USP <711> method using Apparatus I with 1000 ml of dissolution media of 0.01N Hydrochloric acid or phosphate buffer pH 5.5 or 6.8, at temperature of 37.0±0.5° C., with basket rotation of 50 RPM. The duration of dissolution testing is 2 hours in acid stage and 75 minutes in buffer stage.

Results:

TABLE 2a

Dissolution data for benzgalantamine (ALPHA-1062) delayed release tablet 5 mg

| | % dissolved (acidic stage) | % dissolved (buffer stage) | | | | |
|---|---|---|---|---|---|---|
| Vessel | 120 min | 15 min | 30 min | 45 min | 60 min | 120 min |
| 1 | 0 | 0 | 59 | 92 | 97 | 97 |
| 2 | 0 | 0 | 79 | 94 | 94 | 95 |
| 3 | 0 | 1 | 71 | 97 | 99 | 99 |
| 4 | 0 | 0 | 78 | 98 | 98 | 99 |
| 5 | 0 | 0 | 71 | 94 | 97 | 97 |
| 6 | 0 | 1 | 71 | 95 | 96 | 96 |
| Mean (6) | 0 | 1 | 71 | 95 | 97 | 97 |
| % RSD | — | 90.4 | 10.1 | 2.1 | 1.8 | 1.8 |

TABLE 2b

Dissolution data for benzgalantamine (ALPHA-1062) delayed release tablet 10 mg

| Vessel | % dissolved (acidic stage) 120 min | % dissolved (buffer stage) | | | | |
|---|---|---|---|---|---|---|
| | | 15 min | 30 min | 45 min | 60 min | 120 min |
| 1 | 0 | 0 | 46 | 95 | 96 | 96 |
| 2 | 0 | 0 | 60 | 93 | 94 | 94 |
| 3 | 0 | 0 | 22 | 93 | 97 | 97 |
| 4 | 0 | 0 | 71 | 93 | 96 | 98 |
| 5 | 0 | 0 | 40 | 92 | 95 | 95 |
| 6 | 0 | 0 | 53 | 94 | 97 | 97 |
| Mean (6) | 0 | 0 | 49 | 93 | 96 | 96 |
| % RSD | 0.0 | 0.0 | 34.9 | 1.2 | 1.2 | 1.3 |

TABLE 2c

Dissolution data for benzgalantamine (ALPHA-1062) delayed release tablet 15 mg dissolved

| Vessel | % dissolved (acidic stage) 120 min | % dissolved (buffer stage) | | | | |
|---|---|---|---|---|---|---|
| | | 15 min | 30 min | 45 min | 60 min | 120 min |
| 1 | 0 | 0 | 42 | 89 | 102 | 103 |
| 2 | 0 | 1 | 59 | 89 | 103 | 103 |
| 3 | 0 | 0 | 46 | 91 | 101 | 102 |
| 4 | 0 | 5 | 61 | 92 | 105 | 106 |
| 5 | 0 | 0 | 47 | 91 | 101 | 101 |
| 6 | 0 | 0 | 31 | 81 | 102 | 103 |
| Mean (6) | 0 | 1 | 47 | 89 | 102 | 103 |
| % RSD | 0.0 | 19.4 | 23.5 | 4.5 | 1.6 | 1.4 |

Compositions comprising (5 mg, 10 mg or 15 mg benzgalantamine) show no release of benzgalantamine under acidic conditions (pH 1.2). Under buffered conditions (pH 6.8) >80% of benzgalantamine is released after 60 minutes. These results confirm that the disclosed formulations do not release benzgalantamine under acidic conditions such as in the stomach, but release benzgalantamine at pH 5.5 and above such as at pH 6.8. This confirms the advantageous dissolution and release properties of the disclosed compositions resulting in a reduced incidence of adverse effects, in particular gastrointestinal adverse effects, such as nausea and vomiting, and advantageous pharmacokinetic profile in a subject the composition is administered to.

Content Uniformity:
Methodology:

Content uniformity is determined as per USP <905>, each of ten tablets are individually weighed, dissolved in acidified buffer solution with mechanical shaking followed by sonication with acetonitrile and water (50:50) and then filtered. The aliquot of filtrate is diluted with water and analyzed by HPLC to determine the drug percent.

Results:

TABLE 3 content uniformity of disclosed compositions in %.

| Sample | Benzgalantamine (ALPHA-1062) delayed release tablet 5 mg | Benzgalantamine (ALPHA-1062) delayed release tablet 10 mg | Benzgalantamine (ALPHA-1062) delayed release tablet 15 mg |
|---|---|---|---|
| 1 | 93.0 | 96.8 | 100.0 |
| 2 | 99.3 | 100.3 | 100.1 |
| 3 | 101.5 | 100.5 | 98.7 |
| 4 | 96.9 | 100.9 | 99.2 |
| 5 | 96.8 | 99.2 | 99.0 |
| 6 | 95.6 | 98.6 | 101.5 |
| 7 | 95.8 | 100.2 | 99.8 |
| 8 | 95.3 | 96.9 | 99.5 |
| 9 | 95.9 | 97.6 | 97.4 |
| 10 | 95.3 | 103.0 | 101.6 |
| Mean (10) | 96.5 | 99.4 | 99.7 |
| % RSD | 2.4 | 2.0 | 1.3 |
| AV | 7.6 | 4.7 | 3.0 |

The compositions (5 mg, 10 mg and 15 mg benzgalantamine) show a content uniformity ≥96%. These results demonstrate that the composition can be produced in a reliable and reproducible manner independent of the dosage strength.

Example 2: Fasted State Clinical Study (Benzgalantamine (APLPHA-1062) Delayed Release 5 mg Tablet Compared to Immediate Release Galantamine Hydrobromide (Yabao) 4 mg Tablet)

An open label, balanced, randomized, single oral dose, two-treatment, two-period two-way crossover study to evaluate the relative bioavailability (BA) of Benzgalantamine (ALPHA-1062) Delayed Release (DR) 5 mg Tablet compared to a Galantamine Hydrobromide 4 mg Tablet in healthy adult subjects under fasting conditions.

Test treatment (T): Benzgalantamine (ALPHA-1062) Tablet 5 mg according to the presently claimed methods (Delayed Release).

Reference treatment (R): Galantamine Hydrobromide 4 mg tablet (Immediate Release).

Objectives:
Primary: Evaluation of relative bioavailability (BA) of a single-dose of benzgalantamine (ALPHA-1062) 5 mg tablet (test) compared to a galantamine hydrobromide 4 mg tablet (reference) under fasting conditions.

Secondary: Evaluation of the safety and tolerability of single-dose administration of the benzgalantamine (ALPHA-1062) tablet under fasting conditions.

Methodology:
Male and female study participants (in equal proportions) were enrolled in the study. A total of 54 normal, healthy, adult, human study participants were enrolled. All subjects either received test product (test) or reference product (reference) in each period according to the randomization schedule after ensuring maintenance of pre-dose restrictions (fasting for 10 hours prior to administration in sitting posture with 240±2 mL of drinking water at ambient temperature).

A washout period of 7 days was observed between both study periods. Study restrictions with respect to fluid intake and sitting positions were implemented during the restriction periods throughout the study in all periods. The total duration of participation for each subject was approximately 31 days including screening and washout period.

Study participants were instructed not to break, cut, and chew the tablet (test or reference) but to swallow whole and were asked to take it with the specified quantity of water. Water intake was not allowed for 1 hour before dosing until 1 hour after dosing except while administration of the dose. After dosing, the participants remained in sitting position for the first two hours. On dosing days, meals were given as per the following schedule. Meals were the same for all study participants in all the periods.

TABLE 4

Schedule of standardized meals

| Day | Breakfast | Lunch | Snacks | Dinner |
|---|---|---|---|---|
| D − 1 | — | — | — | 11 hours pre dose |
| Dosing day (D) | — | 4 hours post dose | 8 hours post dose | 12 hours post dose |
| D + 1 | 24 hours post dose | 28 hours post dose | 32 hours post dose | 36 hours post dose |

Post dose meals were uniform in all the clinical periods and served at the same time in each study period. Study participants not meeting the requirement of 10 hours fasting prior to dosing were not eligible for dosing and discontinued from the study. No meals were provided for at least 4 hours post dose.

Study Participants:

Fifty-four study participants were enrolled. Among them, 38 participants were found to be eligible for the study. Healthy adult human male and female participants between 18-70 years of age with a body mass index between ≥18.0 kg/m2 and ≤30.0 kg/m2 at the screening visit were enrolled.

Further Study Activities:

Presentation and obtaining of informed consent form, urine drug screening including alcohol, vitals, physical examination, Columbia-Suicide Severity Rating Scale (C-SSRS) assessment, serum pregnancy test (only for female study participants), Covid Rapid Antigen test, body and baggage search, maintenance of pre-dose restrictions and provision of uniform diet were performed on check in day. A blood sample for evaluation of CYP2D6 Genotype was collected during Period-I check in only. Body weight (kg) was recorded at the time of check-in (only in period-I) and at the time of post study. Electrocardiogram (ECG) was measured within 24 hours prior to dosing of each period i.e., at the time of check-in and at 3 & 36 hours post dose (±60 minutes) and at the time of post study assessment. Drug dispensing procedure was done under yellow monochromatic light conditions.

TABLE 5

Investigational Products, Dose, Mode of Administration and Lot/Batch Number:

| Test Product: T (test) | Reference Product: R (reference) |
|---|---|
| Benzgalantamine (gluconate Form A) delayed release tablet 5 mg | Galantamine Tablets USP 4 mg* (*Each tablet contains: Galantamine hydrobromide USP equivalent to 4 mg galantamine.) |
| Manufactured for: ALPHA Cognition, Inc. | Distributed by: State Run Pharmaceuticals, LLC Columbus, Ohio 43215 |
| Dose and Mode of Administration: Single oral dose. | Dose and Mode of Administration: Single oral dose. |
| Storage conditions: 20 to 25° C. (68° to 77° F.); excursions | Storage conditions: at 25° C. (77° F.); excursions permitted to 15 to 30° C. |

TABLE 5-continued

Investigational Products, Dose, Mode of Administration and Lot/Batch Number:

| Test Product: T (test) | Reference Product: R (reference) |
|---|---|
| permitted between 15-30° C. (59°-86° F.) | (59-86° F.) |

Pharmacokinetic Blood Sampling:

A total of 20 blood sampling time points were collected including pre-dose (0 hour) and post-dose samples in each period. In each period, 2 samples of pre-dose (each 5 mL) were collected within 1 hour prior to drug administration, to check for interference from contaminants or endogenous components at the retention time of peaks of interest and to analyze for lack of measurable drug concentrations by adding internal standard (ISTD).

Post dose samples were collected at 0.25, 0.5, 0.75, 1, 1.5, 2, 2.5, 3, 3.5, 4, 4.5, 5, 6, 8, 12, 16, 24, 36 and 48 hours post-dose. For pharmacokinetics (PK) of benzgalantamine (Only for Test Product (test)) post dose samples (each 5 mL) collected at 0.25, 0.5, 0.75, 1, 1.5, 2, 2.5, 3, 3.5, 4, 4.5, 5, 6, 8 and 12 hours were considered. For PK of Galantamine (for both test and reference) post dose samples (each 5 mL) collected at 0.25, 0.5, 0.75, 1, 1.5, 2, 2.5, 3, 3.5, 4, 4.5, 5, 6, 8, 12, 16, 24, 36 and 48 hours were considered.

The total volume of blood collected per study participant in this study did not exceed 255 mL for male and 259 mL for female including 9 mL for screening, 7-9 mL for post clinical assessment of lab parameters and 18 mL for discarding saline mixed blood sample resulting from use of intravenous cannula for 24 hours and an additional 2-9 mL which may be collected for repeat/additional lab tests, if required. Blood samples were collected by means of intravenous cannula until 24 hours post dose and the remaining blood samples were collected by means of direct, sterile venipuncture using pre-labelled 5 mL $K_2$EDTA vacutainers.

After collection, the blood samples were placed in wet ice bath condition maintained below 15° C., i.e., approximately at 4° C. Once blood samples from all the study participants at each time point were available, they were centrifuged at 3800 rpm for 10 minutes at 10° C.±2° C. for plasma collection. Centrifugation of all samples was done within 45 minutes after each sample draw time point. All plasma samples were separated and divided into two aliquots i.e. 1 mL in aliquot #1 and remaining plasma in aliquot #2 in properly labeled polypropylene tubes and immediately stored at −20° C.±4° C. until completion of analysis. After the analysis, the plasma samples were retained for a duration of 90 days from the date of report submission to the sponsor or as per the sponsor requirement. The time from sample collection to placement in the freezer did not exceed 120 minutes. Plasma samples were analyzed for benzgalantamine (ALPHA-1062) and Galantamine using LC-MS/MS analysis. All the clinical activities were performed under yellow monochromatic light conditions.

Pharmacokinetic Analysis:

Pharmacokinetic parameters were calculated for benzgalantamine (ALPHA-1062) and Galantamine in plasma using Phoenix® WinNonlin® 8.0 or higher version (Pharsight Corporation, USA) or SAS® 9.4 with Enterprise Guide 7.1 or higher version.

| | Primary parameters: Cmax, $AUC_{0-t}$ and $AUC0_{0-\infty}$. |
|---|---|
| $C_{max}$ | Maximum measured plasma concentration over the time span specified. |
| $AUC_{0-t}$ | The area under the plasma concentration versus time curve from time '0' to the last measurable concentration, as calculated by the linear trapezoidal method. |
| $AUC_{0-\infty}$ | The area under the plasma concentration versus time curve from time '0' extrapolated infinity. $AUC_{0-\infty}$ was calculated as the sum of the $AUC_{0-t}$ plus the ratio of the last measurable concentration to the elimination rate constant |

| | Secondary parameters: $T_{max}$, $k_{el}$, $AUC_{0-t}/AUC_{0-\infty}$, AUC % extrap, $t_{1/2}$, $T_{lag}$, Vz/F and Cl/F. |
|---|---|
| AUC % extrap | Percent of $AUC_{0-\infty}$ extrapolated, represented as $(1 - AUC_{0-t}/AUC_{0-inf}) * 100$. |
| $T_{max}$ | Time of the maximum measured plasma concentration. If the maximum value occurs at more than one time point, $T_{max}$ is defined as the first time point of $C_{max}$. |
| $k_{el}$ | Apparent first-order elimination or terminal rate constant calculated from a semi-log plot of the plasma concentration versus time curve. The parameter was calculated by linear least-square regression analysis using the last three (or more) non-zero plasma concentrations of the terminal phase. |
| $t_{1/2}$ | The terminal half-life was calculated as $0.693/k_{el}$ |
| $AUC_{0-t}/AUC_{0-\infty}$ | The ratio of $AUC_{0-t}$ and $AUC_{0-\infty}$. |
| Apparent clearance (CL/F) | The steady state con- centration is determined only by clearance for any given dose rate. This is true if the bioavailability (F) of a dose is assumed to be 100% or equivalently, that clearance is the apparent clearance (CL/F) when the ratio of clearance to bioavailability is assumed to be constant. |
| Apparent volume of distribution (Vz/F) | A ratio of the total amount of drug in the body to the plasma concentration of the drugs |
| $T_{lag}$ | Time delay between drug administration and first observed concentration above LOQ in plasma. |

No value of $k_{el}$, $t_{1/2}$ and $AUC_{0-\infty}$ were reported for cases that did not exhibit a terminal log-linear phase in the concentration versus time profile. The actual post-dose time of collection was used in the calculation of the above pharmacokinetic parameters. Drug concentrations that are below limit of quantification (BLQ) were treated as "zero" in all pharmacokinetic and statistical calculations.

Gastrointestinal Adverse Events:

The safety assessments performed during the study included monitoring of gastrointestinal adverse events. Adverse event (AE) monitoring was done throughout the course of the study by clinical examination, vitals check, and participant observation of well-being, monitored throughout the study.

Statistical Analysis & Descriptive Statistics:

Statistical analysis was performed on pharmacokinetic data of samples assayed and quantified for Benzgalantamine and Galantamine in plasma. The statistical analysis was conducted on logarithmically (natural) transformed pharmacokinetic parameters using SAS® 9.4 with Enterprise Guide version 7.1 for Windows (SAS Institute Inc., Cary, NC, USA). The descriptive statistics (such as count (N), mean, median, minimum, maximum, standard deviation (SD) and coefficient of variation (CV) for the relevant pharmacokinetic parameters were estimated for both the tests and reference formulations. The geometric mean and coefficient of variation were estimated for $C_{max}$, $AUC_{0-t}$ and $AUC_{0-\infty}$. In this study, inferential statistics linear regression model was used.

Assessment of Bioavailability:

Assessment of bioavailability was done on the basis of the 90% confidence intervals of the differences of Geometric least squares treatment means for Ln-transformed $C_{max}$, $AUC_{0-t}$ and $AUC_{0-\infty}$ of Galantamine obtained after single-dose administration under fasting conditions. The acceptance criteria for bioavailability are that the entire confidence intervals for the difference of means of Ln-transformed $C_{max}$, $AUC_{0-t}$ and $AUC_{0-\infty}$ should fall within 80%-125%.

Determination of Sample Size

A total of 36 normal healthy adult, male or female study participants (in equal proportions) were dosed in the study.

T/R ratio=90%-111%
Expected Intra-Subject C.V (%)~18%
Significance Level=5%
Power=80%
Bioequivalence Limits=80-125%

Based on the above estimate, a sample size of 36 study participants were sufficient to establish bioequivalence between two formulations with adequate power, considering 10% dropouts due to adverse events or non-compliance or due to personal reasons.

Results

Demographics and Other Baseline Characteristics

TABLE 6

Demographics summary of all participants within the study (N = 34).

| Parameters | Age (yrs) | Weight (kg) | Height (cms) | BMI (kg/m²) |
|---|---|---|---|---|
| Mean (SD) | 36.0 (8.00) | 66.9 (8.80) | 159.9 (8.95) | 26.1 (2.51) |
| Median | 35.5 | 66.9 | 158.1 | 26.3 |
| CV % | 22.2 | 13.2 | 5.6 | 9.6 |
| Range | (24.0, 57.0) | (48.8, 83.3) | (145.0, 175.0) | (20.8, 29.9) |

Treatment Compliance

All the study participants ingested the study drug; this was confirmed by direct observation of administration of study drug as well as by performing hand and mouth checks and further ascertained by the presence of plasma Benzgalantamine (ALPHA-1062) and Galantamine concentrations in individual blood samples following drug administration.

Pharmacokinetic Results:

The pharmacokinetic parameters were calculated by linear mixed effects model. The pharmacokinetic parameters were statistically analyzed to compare the Test and Reference Products in regard to $C_{max}$, $AUC_{0-t}$ and $AUC_{0-\infty}$.

Figure 2:
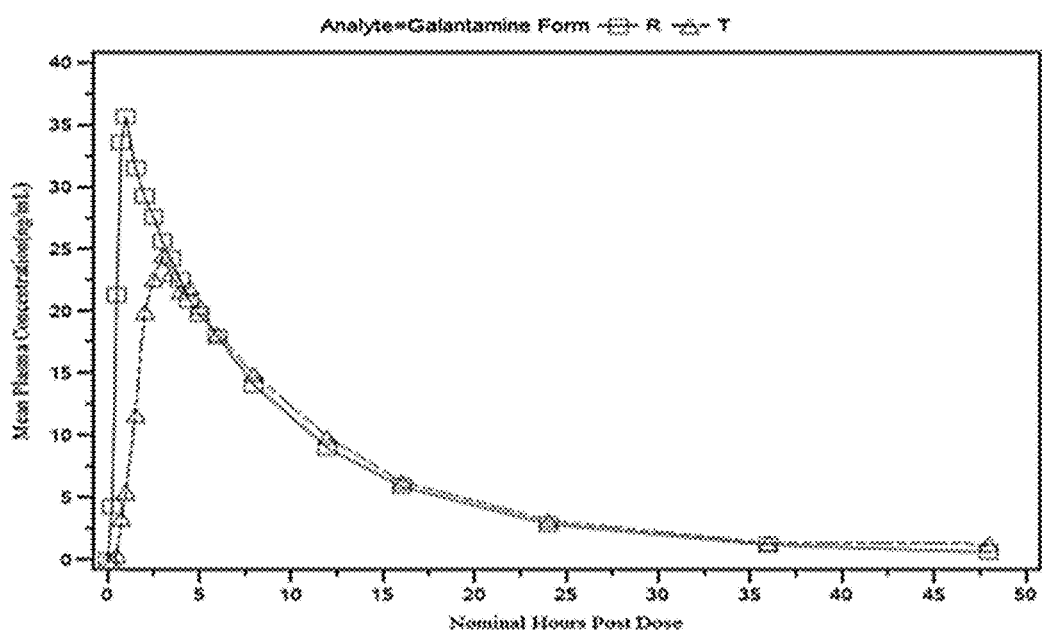
FIG. 2: Mean Plasma Galantamine concentrations Vs. Time Plots-Linear Scale. Clinical study evaluating the disclosed benzgalantamine delayed release tablet 5 mg tablet (T) vs. Galantamine Hydrobromide 4 mg tablet (R).
Figure 3:
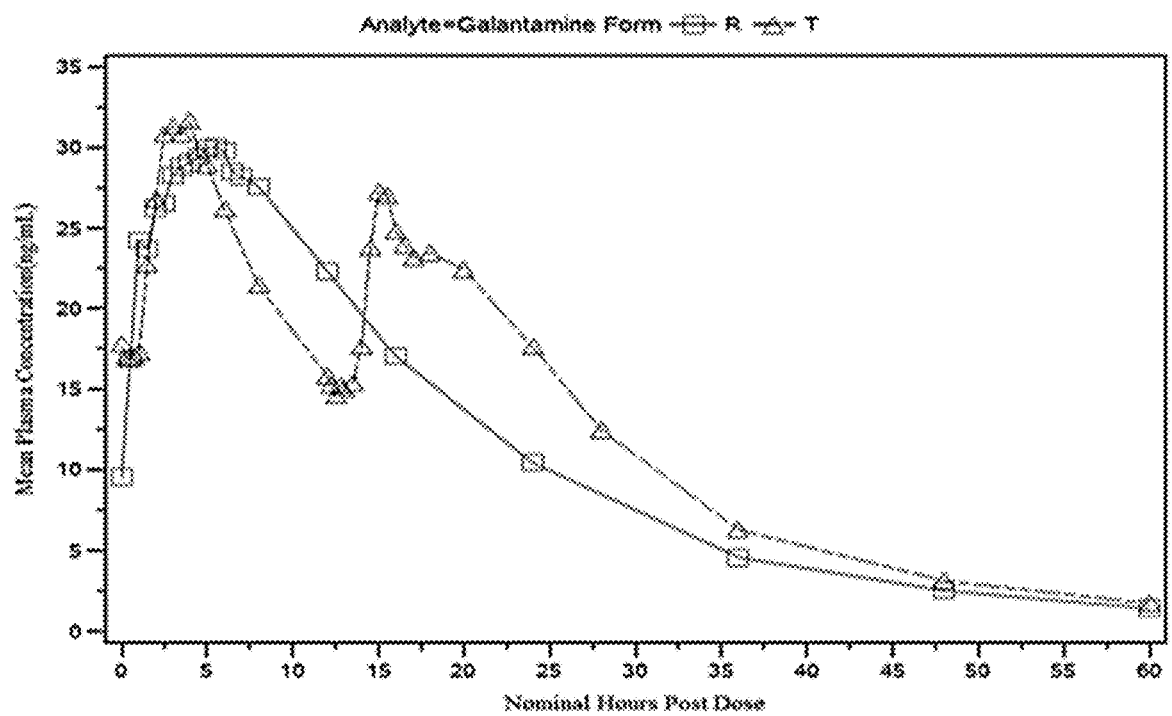
FIG. 3: Mean plasma Galantamine concentrations Vs. Time Plots-Linear Scale. Clinical study evaluating the disclosed benzgalantamine delayed-release tablets, 5 mg vs. Razadyne® ER (galantamine extended-release capsules) 8 mg.

The mean plasma concentration versus scheduled time plots (linear and log-linear scales) for Galantamine were obtained and are presented in FIGS. 2 and 3.

TABLE 7a

Arithmetic Mean (SD) of Pharmacokinetic Parameters of Galantamine.

| PK Parameter (Units) | N | Galantamine Treatment T (Test) | N | Treatment R (Reference) |
|---|---|---|---|---|
| $C_{max}$ (ng/mL) | 34 | 31.461 (7.6143) | 34 | 41.126 (8.0053) |
| $AUC_{0-t}$ (ng · hr/mL) | 34 | 293.983 (61.0105) | 34 | 319.675 (64.9361) |
| $AUC_{0-\infty}$ (ng · hr/mL) | 34 | 324.509 (156.0687) | 34 | 328.256 (68.8577) |
| *$T_{max}$ (hr) | 34 | 2.50 (0.75, 5.03) | 34 | 1.00 (0.50, 2.50) |
| Kel (1/hr) | 34 | 0.074 (0.0166) | 34 | 0.078 (0.0151) |
| $t_{1/2}$ (hr) | 34 | 9.942 (2.8841) | 34 | 9.223 (1.7701) |
| AUC Ratio (%) | 34 | 95.181 (10.5765) | 34 | 97.503 (1.2155) |
| AUC_%extrap_obs# (%) | 34 | 4.819 (10.5765) | 34 | 2.497 (1.2155) |
| $T_{lag}$ (hr) | 34 | 1.08 (0.741) | 34 | 0.04 (0.093) |
| Vz_F_obs (mL) | · | NE | · | NE |
| Cl_F_obs (mL/hr) | · | NE | · | NE |

*For $T_{max}$, Median (Min, Max) are presented.
NE: Not Estimated.

TABLE 7b

Arithmetic Mean (SD) of Pharmacokinetic Parameters of benzgalantamine (ALPHA-1062).

| PK Parameter (Units) | N | Benzgalantamine Treatment T (Test) |
|---|---|---|
| $C_{max}$ (ng/ml) | 34 | 0.174 (0.3372) |
| $AUC_{0-t}$ (ng · hr/mL) | 9 | 0.439 (0.3552) |
| $AUC_{0-\infty}$ (ng · hr/mL) | 0 | NE |
| *$T_{max}$ (hr) | 34 | 0.00 (0.00, 4.50) |
| $K_{el}$ (1/hr) | 0 | NE |
| $t_{1/2}$ (hr) | 0 | NE |
| AUC Ratio (%) | 0 | NE |
| AUC_%extrap_obs# (%) | 0 | NE |
| $T_{lag}$ (hr) | 9 | 1.53 (1.433) |
| Vz_F_obs (mL) | · | NE |
| Cl_F_obs (mL/hr) | · | NE |

*For $T_{max}$, Median (Min, Max) are presented.
NE: Not Estimated.

TABLE 8

Analysis of Variance for Galantamine (test (T) Vs reference (R))

| PK Parameter | P-Value Sequence | Period | Treatment |
|---|---|---|---|
| $C_{max}$ (ng/ml) | 0.1667 | 0.7538 | <.0001 |
| $AUC_{0-t}$ (ng · hr/mL) | 0.8333 | 0.2420 | 0.0003 |
| $AUC_{0-\infty}$ (ng · hr/mL) | 0.8719 | 0.2060 | 0.2969 |

TABLE 9

Statistical analysis results for the assessment of bioequivalence of Galantamine under fasting conditions.

| PK Parameter | Geometric Means Test | Reference | Ratio | CV% | 90% Confidence Interval |
|---|---|---|---|---|---|
| | Ln-Transformed: | | | | |
| $C_{max}$ (ng/mL) | 30.6791 | 40.4968 | 75.76 | 19.83 | (69.87, 82.14) |
| $AUC_{0-t}$ (ng · hr/mL) | 288.4345 | 313.4687 | 92.01 | 8.37 | (88.90, 95.23) |
| $AUC_{0-\infty}$ (ng · hr/mL) | 306.8242 | 321.4596 | 95.45 | 18.23 | (88.60, 102.82) |

The geometric mean (GM) Ratio with 90% CI of Ratio galantamine estimates of $C_{max}$, $AUC_{0-t}$ and $AUC_{0-\infty}$ values of the Benzgalantamine Delayed Release (DR) Tablet 5 mg (test) over those of the Galantamine Hydrobromide 4 mg tablet (reference) were 75.76 (69.87, 82.14), 92.01 (88.90, 95.23) and 95.45 (88.60, 102.82) respectively (Table 9). The 90% confidence interval (CI) for $C_{max}$ was not within 80-125% range for Galantamine. The 90% CI for $AUC_{0-t}$ and $AUC_{0-\infty}$ were within 80-125% range for Galantamine (Table 9).

$AUC_{0-t}$ and elimination related parameters ($AUC_{0-\infty}$, $AUC_{extrapolation}$, $K_{el}$ and $T_{1/2}$) for benzgalantamine (ALPHA-1062) have not been estimated due to insufficiently measurable concentration profile (i.e., almost all values are zero or below limit of quantification (BLQ) at all times) (Table 7b). So, the maximum concentrations ($C_{max}$ points) were also observed to be zero. Therefore ln (0) is not mathematically predictable, so statistical analysis is performed after applying the transformed log.

Gastrointestinal Adverse Events

Adverse event monitoring in the form of clinical examination, vitals check and participant well-being was monitored during the study. The reported results were normal which concludes that all treatments were well tolerated and found to be safe.

TABLE 10

Incidence of gastrointestinal adverse events.

| Body System/ Adverse Event | Reported Incidence by Treatment Groups Fasting Bioequivalence Study | |
|---|---|---|
| | Test Treatment (test, T) | Reference Treatment (reference, R) |
| Gastro Intestinal Disorders | | |
| Vomiting | — | 1 (2.78%) |
| Diarrhea | — | 1 (2.78%) |
| Total | 0 (0%) | 2 (5.56%) |

N = Number of subjects with incidence of adverse events (AEs).
% = Percentage of the adverse event calculated by total number of study subjects that participated in the study.

A total of 2 gastrointestinal adverse events (AE) were reported. Of these 2 AE, 1 AE (i.e., vomiting) was reported during period-I, 1 AE (i.e., diarrhea) was reported during period-II. No Serious Adverse Events, Significant Adverse Events or deaths occurred in this study.

Overall subjects who were administered the disclosed compositions showed a lower incidence of gastrointestinal adverse events in comparison to the galantamine 4 mg tablet (reference) (Table 10). This demonstrates that the disclosed composition comprising benzgalantamine and an enteric coating configured for dissolution at pH 5.5 or above shows an advantageous dissolution and release profile and improved pharmacokinetic properties in comparison to the reference composition comprising galantamine and no such enteric coating, advantageously resulting in a reduced incidence of gastrointestinal adverse events.

Conclusion

Overall, the disclosed compositions show a surprising, improved pharmacokinetic profile over the immediate release Galantamine Hydrobromide 4 mg tablet (reference). Thereby, the disclosed compositions result in a decreased $C_{max}$ of Galantamine while maintaining an AUC of Galantamine ($AUC_{0-t}$ and $AUC_{0-\infty}$) comparable to the immediate release reference formulation (90% CI within 80-125% range for Galantamine) (Table 9).

A lower $C_{max}$ leads to a reduction of side effects associated with Galantamine, in particular gastrointestinal side effects, as side effects of a drug increase with the peak drug concentration present in blood/target organs. The observation of an equivalent AUC means that overall, the same amount of drug is being absorbed, (albeit at a slower rate), meaning that treatment effectiveness is maintained.

Due to the enteric coating of the disclosed compositions the release of benzgalantamine occurs in the small intestine above pH 5.5, resulting in a slower rise to $C_{max}$ of Galantamine ($T_{max}$ approx. 1.5 h for the disclosed composition (test), from the time of first appearance of drug in plasma ($T_{lag}$)]) compared to the immediate release reference composition which results in the majority of Galantamine being absorbed in the stomach before reaching the intestine ($t_{max}$=1 h, with essentially no $T_{lag}$] (Table 7a). Both the rate at which plasma concentrations of galantamine increase and the absolute concentration of galantamine in plasma influence the side effect profile. The slower rise to $C_{max}$ and lower $C_{max}$ of the disclosed composition thus advantageously reduces gastrointestinal side effects. The delayed release ZUNVEYL® tablet composition both protects from benzgalantamine release in the gastric acid environment as well as promotes drug release at pH 5.5.

The negligible (or below limit of quantitation) plasma benzgalantamine concentrations, observed after administration of the disclosed composition further means that benzgalantamine is rapidly and completely or nearly completely converted to galantamine after release of the drug and its absorption in the small intestine, advantageously resulting only in pharmacologically active galantamine and no or only negligible amounts of benzgalantamine being present in the systemic circulation of a subject.

After release of benzgalantamine from the disclosed compositions in the intestine the drug is potentially subject to conversion to galantamine through esterase action in the following compartments: (a) in the lumen of the intestine [esterases resulting from microbial production], (b) during its transport across the intestinal wall (Ho et al. 2017, Xu et al. 2015), and (c) exposed to esterase activity in (portal) blood (Rudakova et al. 2010).

The results obtained within this study however show that even though benzgalantamine is converted to galantamine in any of the compartments (a), (b) and/or (c) the conversion surprisingly does not result in free galantamine concentrations in the gastrointestinal tract that are sufficiently high to provoke the side effect profile observed with the galantamine hydrobromide immediate release formulation. This represents a surprising effect, as it would have rather been expected that by conversion of benzgalantamine in compartments (a-c) after release in the intestine would have resulted in galantamine concentrations activating the enteric cholinergic nervous system, resulting in traditional gastrointestinal adverse events such as nausea, vomiting, diarrhea.

The disclosed formulation comprising an enteric coating configured to release benzgalantamine at pH 5.5 or above thus surprisingly and advantageously provides protection against gastrointestinal adverse events, while achieving complete conversion of the prodrug to galantamine and a similar AUC compared to the immediate reference formulation.

Further, without being bound to theory, the results can be interpreted as indicating that the rate ($T_{max}$ ca 1.5 h from $T_{lag}$) at which the drug is presented to the liver for first pass metabolism, is such that it doesn't overwhelm its metabolic capacity to completely/nearly completely, convert benzgalantamine to galantamine. This is consistent with increased safety and an increased effectiveness of the disclosed compositions.

Example 3: Steady State Clinical Study (Benzgalantamine (ALPHA-1062) Delayed Release 5 mg Tablet Compared to ER Galantamine Hydrobromide 8 mg Tablet)

An open label, balanced, randomized, multiple-dose, two-treatment, two arm, two-period, comparative steady state study of Benzgalantamine Delayed Release Tablets 5 mg (BID) in comparison to Razadyne® ER (galantamine extended-release capsules) 8 mg (QD) manufactured for Janssen Pharmaceuticals.
Test treatment (T): Benzgalantamine (ALPHA-1062) Delayed Release Tablets 5 mg, as disclosed herein.
Reference treatment (R): Razadyne® ER (galantamine extended-release capsules) 8 mg.
Objectives and Endpoints:
Primary: Evaluation of the steady-state relative bioavailability (BA) of benzgalantamine (ALPHA-1062) 5 mg delayed release tablets (BID, test) compared to 8 mg Razadyne® ER (galantamine extended-release capsules) (QD, reference) in healthy adult subjects.
Secondary: Evaluation of the safety and tolerability of administration of benzgalantamine delayed release tablets compared to Razadyne® ER (galantamine extended-release capsules) in healthy adult subjects.
Primary Endpoints: $AUC_{0-24}$, $C_{max,ss}$ (test and reference) on Day 7
Secondary Endpoints: Other parameters including but not limited to:
$C_{trough}$ Day 4 (equivalent to predose morning trough on Day 5)
$C_{trough}$ Day 5 (equivalent to predose morning trough on Day 6)
$C_{trough}$ Day 6 (equivalent to predose morning trough on Day 7)
$C_{trough}$ Day 7 (equivalent to 24-hour sample after Day 7 morning dose)
Day 7 pharmacokinetics: $AUC_{0-12,ss}$, $T_{max}$ (test and reference), $C_{max1}$ (test only), $C_{max2}$ (test only), $T_{max1}$ (test only), $T_{max2}$ (test only), $C_{avg}$ ($AUC_{0-24/24}$), $C_{min}$ (lowest concentration over 24 hours), $T_{min}$ (time of lowest concentration over 24 hours), $C_{trough}$ (concentration at the end of the dosing interval, i.e., $C_{24h}$—same as above), $C_{12h}$ (Test product trough for morning dose), CL/F (Apparent Clearance [Dose/AUC$_{0-24}$]), Flux (degree of fluctuation [$(C_{max}-C_{min})/C_{avg}$]), Swing [$(C_{max}-C_{min})/C_{min}$], $K_{el}$, $T_{1/2}$ Methodology:

Male and female study participants (in equal proportions) were enrolled in the study. A total of 52 normal, healthy, adult, human study participants were enrolled. All subjects either received test product or reference product in each period according to the randomization schedule after ensuring maintenance of pre-dose restrictions (fasting prior to administration in sitting posture with 240±2 mL of drinking water at ambient temperature).

A washout period of 6.5 days was observed between both of the study periods. Study restrictions with respect to fluid intake and sitting positions were implemented during the restriction periods throughout the study in all periods. The total duration of participation for each subject was approximately 51 days including screening.

In each period, on Dosing days (1-7), subjects received either twice daily dosing of 5 mg benzgalantamine delayed release tablet (test) or once daily dosing of 8 mg RAZADYNE® ER (galantamine hydrobromide) extended-release capsule (reference) in a crossover fashion, as per randomization scheme.

Study participants were instructed not to break, cut and chew the tablets or capsules, but to swallow whole and were asked to take it with specified quantity of water. Water intake was not allowed for 1 hour before dosing until 1 hour after dosing except while administration of the dose. After dosing, the participants remained seated for the first 2 hours post dose. On dosing days, meals were given as per the following schedule. Meals were the same for all study participants in all the periods.

TABLE 11

Schedule of standardized meals

| Day | Breakfast | Lunch | Snacks | Dinner |
| --- | --- | --- | --- | --- |
| D − 1 | — | — | — | 11 hours pre-dose |
| Dosing day (D) – Day 1 | 1 hours post morning dose | 5 hours post morning dose | 9 hours post morning dose | 13 hours post morning dose |
| Dosing day (D) – Day 2 | 1 hours post morning dose | 5 hours post morning dose | 9 hours post morning dose | 13 hours post morning dose |
| Dosing day (D) – Day 3 | 1 hours post morning dose | 5 hours post morning dose | 9 hours post morning dose | 13 hours post morning dose |
| Dosing day (D) – Day 4 | 1 hours post morning dose | 5 hours post morning dose | 9 hours post morning dose | 13 hours post morning dose |
| Dosing day (D) – Day 5 | 2 hours post morning dose | 6 hours post morning dose | 9.5 hours post morning dose | 14 hours post morning dose |
| Dosing day (D) – Day 6 | 2 hours post morning dose | 6 hours post morning dose | 9.5 hours post morning dose | 13 hours post morning dose |
| Dosing day (D) – Day 7 | — | 5 hours post morning dose | 9.5 hours post morning dose | 14 hours post morning dose |
| Day − 8 | 24 hours post morning dose of Day 7 | 28 hours post morning dose of Day 7 | 32 hours post morning dose of Day 7 | 36 hours post morning dose of Day 7 |
| Day − 9 | 48 hours post morning dose of Day 7 | 52 hours post morning dose of Day 7 | 56 hours post morning dose of Day 7 | — |

Post dose meals were uniform in all the clinical periods and served at the same time in each study period.

Study participants were served dinner to maintain the following criteria: In each period, Dosing occurs on Days 1-7 inclusive.

Days 5 & 6 Morning dosing: Pre-dose on mornings of Days 5 and 6, subjects were fasted for at least 8 hours, have their pharmacokinetic (PK) sample for $C_{trough}$ taken before dosing, and then fast for 2 hours post-morning dose on Days 5 and 6.

Day 7 Morning dosing: Beginning on the evening of Day 6, subjects fasted for at least 10 hours before morning dosing on Day 7, have their PK sample for $C_{trough}$ taken before dosing, and then fasted for at least 5 hours after the morning dosing on Day 7.

Day 5 and 7 Evening Dosing: Subjects fasted for at least 2 hours before and 2 hours after evening dose.

Day 6 Evening Dosing: Subjects fasted for at least 2 hours before and 1 hour after evening dose.

Day 1-4: Study participants fasted for at least 10 hours prior to the morning drug administration.

Evening dose of test product was administered at 12 hours post morning dose.

When confined, standard meals and snacks were provided at appropriate times, except when they are required to fast. Study participants fasted for at least 10 hours prior to morning drug administration on Day 1 to Day 4. When confined in the Clinical Pharmacology Unit (CPU), study participants fasted from all food and drink except water between meals and snacks.

Study Participants:

Fifty-two study participants were enrolled. Among them, 47 participants were found eligible for the study. Signed informed consent form was obtained from each volunteer before enrolling them in the study. Healthy adult human male and female participants between 18-70 years of age with a body mass index between ≥18.0 kg/m2 and ≤30.0 kg/m2 at the screening visit were enrolled. 40 study participants completed all the study periods and were included for pharmacokinetic analysis and 38 study participants were included for Statistical analysis.

Further Study Activities:

Presentation and obtaining of informed consent form, urine drug screening including alcohol, vitals, physical examination, C-SSRS assessment, serum pregnancy test (only for female study participants), Covid Rapid Antigen test, 12-Lead ECG, body and baggage search, maintenance of pre-dose restrictions and provision of uniform diet on check in day. A blood sample for evaluation of CYP2D6 genotype was collected during Period-I check-in only. Body weight (kg) was recorded at the time of check-in and check-out of each period. ECG was measured at the time of check-in, 3 hours post morning dose (±60 minutes) of Day 7 in each period and at the time of checkout, commencing from 180 minutes prior to checkout in each period. Pre-dose safety monitoring, dosing, sample collection and processing as well as safety monitoring, maintenance of post-dose restrictions and a uniform diet was provided throughout participants' confinement in the CPU.

TABLE 12

Investigational Products, Dose, Mode of Administration and Lot/Batch Number.

| Test Product: T (test) | Reference Product: R (reference) |
| --- | --- |
| Benzgalantamine (gluconate form A) delayed-release tablet 5 mg | Razadyne ® ER (galantamine extended-release capsules) 8 mg Each capsule Contains 8 mg of galantamine as 10.25 mg galantamine hydrobromide |
| Manufactured for: Alpha Cognition, Inc. | Manufactured for: Janssen Pharmaceuticals, Inc., Titusville, NJ 08560 |

TABLE 12-continued

Investigational Products, Dose, Mode of Administration and Lot/Batch Number.

| Test Product: T (test) | Reference Product: R (reference) |
|---|---|
| Dose and Mode of Administration: Single dose for (morning & evening) multiple days, oral. Storage conditions: 20° C.-25° C.; Excursions permitted to 15° C.-30° C. | Dose and Mode of Administration: Single dose for (morning) multiple days, oral. Storage conditions: 25° C.; excursions permitted between 15° C. to 30° C. |

Pharmacokinetic Blood Sampling:

A total of 38 blood sampling time points were collected for test treatment including Pre-dose (0 hour) and post-dose samples in each period for measuring Galantamine and benzgalantamine. A total of 25 blood sampling time points were collected for reference treatment including Pre-dose (0 hour) and post-dose samples in each period for measuring Galantamine. In each period, 2 samples of pre-dose i.e., 0 hours pre-dose (each 5 mL) on Day 1 was collected within 1 hour prior to drug administration. Pre-dose samples i.e., 0 hours pre-dose (each 5 mL) on Day 5, 6 and 7 were collected within 0-10 minutes prior to dosing. Morning pre-dose samples were collected on Days 5, 6 and 7 for $C_{trough}$ for both reference and test.

On Day 7 for test-Post morning dose samples were collected at 0.25, 0.5, 0.75, 1, 1.5, 2, 2.5, 3, 3, 4, 4.5, 5, 6, 8, 12, 12.25, 12.5, 12.75, 13, 13.5, 14, 14.5, 15, 15.5, 16, 16.5, 17, 18, 20, 24, 28, 36, 48 and 60 hours. On Day 7 for reference-Post-morning dose samples were collected at 0.50, 1, 1.5, 2, 2.5, 3, 3.5, 4, 4.5, 5, 5.5, 6, 6.5, 7, 8, 12, 16, 24, 36, 48 and 60 hours.

The total volume of blood collected per study participant in this study was not exceed 384 mL for male and 388 mL for female including 9 mL for screening, 7-9 mL for post clinical assessment of lab parameters, and 26 mL for discarding saline mixed blood sample resulting from use of intravenous cannula for 24 hours on day 7 and an additional 2-9 mL which may be collected for repeat/additional lab tests, if required. Blood samples were collected by direct venipuncture on Day 1, 5 & 6 and by means of intravenous cannula until 24 hours post morning dose of Day 7 using pre-labelled 5 mL $K_2$EDTA vacutainers.

After collection, the blood samples were placed in wet ice bath condition to maintain the temperature at below 15° C. (i.e., approximately at 4° C.). Once blood samples from all the study participants at each time point were available, they were centrifuged at 3800 rpm for 10 minutes at 10° C.±2° C. to separate the plasma. Centrifugation of all samples was done within 45 minutes after each sample draw time point. All plasma samples were separated and divided into two aliquots i.e. at least 1 mL in aliquot #1 and remaining plasma in aliquot #2 in properly labelled polypropylene tubes and immediately stored at −20° C.±4° C. until completion of analysis. After the analysis, the plasma samples were retained for a duration of 90 days from the date of report submission to the sponsor or as per the sponsor's requirement. The time from sample collection to placement in the freezer did not exceed 120 minutes. Plasma samples were analyzed for benzgalantamine (ALPHA-1062) and Galantamine using LC-MS/MS analysis. All the clinical activities were performed under yellow monochromatic light conditions.

Pharmacokinetic Analysis:

The following pharmacokinetic parameters were calculated for benzgalantamine and Galantamine in plasma using Phoenix® WinNonlin® 8.0 or higher version (Pharsight Corporation, USA) or SAS® 9.4 with Enterprise Guide 7.1 or higher version.

| Primary parameters: $AUC_{0-24,ss}$ and $C_{max,ss}$ | |
|---|---|
| $AUC_{0-24,ss}$ | The daily area under the concentration-time curve at steady state, as calculated by the linear trapezoidal method. |
| $C_{maxss}$ | Maximum observed concentration at steady state. |

| Secondary parameters: $C_{trough}$ Day 4, $C_{trough}$ Day 5, $C_{trough}$ Day 6, $C_{trough}$ Day 7, $C_{12h}$, $AUC_{0-12,ss}$, $T_{max,ss}$, $C_{max1,ss}$, $C_{max2,ss}$, $T_{max1,ss}$, $T_{max2,ss}$, $C_{avg}$ ($AUC_{0-24/24}$), $C_{min}$ (lowest concentration over 24 hours), $T_{min}$ (Time of lowest concentration over 24 hours), $K_{el}$, $t_{1/2}$, CL/F (Apparent Clearance [Dose/$AUC_{0-24}$]), % FLUX (degree of fluctuation [($C_{max} - C_{min}$)/$C_{avg}$]), Swing [($C_{max} - C_{min}$)/$C_{min}$]. | |
|---|---|
| $C_{trough}$ Day 4 | Concentration observed at the end of the Day 4 dosing interval (equivalent to predose morning trough on Day 5). |
| $C_{trough}$ Day 5 | Concentration observed at the end of the Day 5 dosing interval (equivalent to predose morning trough on Day 6). |
| $C_{trough}$ Day 6 | Concentration observed at the end of the Day 6 dosing interval (equivalent to predose morning trough on Day 7). |
| $C_{trough}$ Day 7 | Concentration observed at the end of the Day 7 dosing interval (equivalent to 24 hours sample after Day 7 morning dose [$C_{24h}$]). |
| $C_{12h}$ | Concentration observed at 12 hours post Day 7 morning dose. |
| $AUC_{0-12,ss}$ | The area under the concentration-time curve from time '0' to 12 hours post dose at steady state, as calculated by the linear trapezoidal method. |
| $T_{max,ss}$ | Time to reach $C_{max}$. If the maximum value occurs at more than one time point within the dosing interval(s), $T_{max,ss}$ is defined as the first time point with this value. |
| $C_{max1,ss}$ | Maximum observed concentration during morning dosing interval at steady state (Test product only). |
| $C_{max2,ss}$ | Maximum observed concentration during evening dosing interval at steady state (Test product only). |
| $T_{max1,ss}$ | Time to reach $C_{max1,ss}$. If the maximum value occurs at more than one time point within the dosing interval, $T_{max1,ss}$ is defined as the first time point with this value (Test product only). |
| $T_{max2,ss}$ | Time to reach $C_{max2,ss}$. If the maximum value occurs at more than one time point within the dosing interval, $T_{max2,ss}$ is defined as the first time point with this value (Test product only). |
| $C_{avg,ss}$ | Average daily concentration over the dosing interval(s) at steady state, calculated as $AUC_{0-24/24}$ |
| $C_{min,ss}$ | Minimum observed concentration over 24 hours at steady state. |
| $T_{min,ss}$ | Time of minimum observed concentration over 24 hours at steady state. |
| $K_{el}$ | Apparent first-order terminal elimination rate constant calculated from a semi-log plot of the plasma concentration versus time curve. The parameter was calculated by linear least-squares regression analysis using the maximum number of points in the terminal log-linear phase (e.g., three or more non-zero plasma concentrations). |
| $t_{1/2}$ | Apparent first-order terminal elimination half-life was calculated as 0.693/Kel. |
| $CL_{ss}/F$ | Apparent total plasma clearance after oral (extravascular) administration, calculated as Dose/$AUC_{0-24,ss}$. |
| % FLUX | Degree of peak-to-trough fluctuation expressed as a percentage, calculated as follows: ([$C_{max,ss} - C_{min,ss}$]/$C_{avg,ss}$)*100. |
| Swing | Swing, calculated as follows: ([$C_{max,ss} - C_{min,ss}$]/$C_{min,ss}$). |

Gastrointestinal Adverse Events:

The safety assessments performed during the study included but not limited to body weight assessment, blood samples for organ function, adverse event monitoring, vital sign monitoring, and cardiology and physical assessments. Adverse event (AE) monitoring was done throughout the course of the study by clinical examination, vitals check, and participant observation of well-being.

Statistical Analysis & Descriptive Statistics:

Statistical analysis was performed on pharmacokinetic data of samples assayed and quantified for Galantamine in plasma. The ln-transformed pharmacokinetic parameters $AUC_{0-24}$ and $C_{max}$ for Galantamine were statistically analyzed using linear mixed effects model using the SAS® system version 9.4 or higher with Enterprise Guide 7.1 or higher version for Windows, (SAS® Institute Inc. USA). The descriptive statistics (such as count (N), mean, median, minimum, maximum, standard deviation (SD) and coefficient of variation (CV) for the relevant pharmacokinetic parameters were estimated for both the Tests and Reference formulations. The geometric mean and coefficient of variation were estimated for $AUC_{0-24}$, $C_{max}$, $AUC_{0-12}$, $T_{max}$, $C_{max1}$ (test only), $C_{max2}$ (test only), $T_{max1}$ (test only), $T_{max2}$ (test only), $C_{avg}$ ($AUC_{0-24/24}$), $C_{min}$ (lowest concentration over 24 hours), $T_{min}$ (Time of lowest concentration over 24 hours), $C_{trough}$ (concentration at the end of the dosing interval, i.e., $C_{24\,h}$), $C_{12\,h}$ (test product trough for morning dose), CL/F (Apparent Clearance [Dose/$AUC_{0-24}$]), Flux (degree of fluctuation [$(C_{max}-C_{min})/C_{avg}$]), Swing [$(C_{max}-C_{min})/C_{min}$], $K_{el}$ und $T_{1/2}$. In this study, inferential statistics linear regression model was used.

Assessment of Bioavailability:

Similarity in bioavailability was concluded if the 90% confidence intervals for the ratios of least squares means of the PK parameters $AUC_{0-24,ss}$ and $C_{max,ss}$ for galantamine fall within the reference range of 80 and 125%. In addition, the peak exposure of the test product ($C_{max,ss}$) would be concluded to be not inferior to that of the reference product if the entire 90% CI for the ratio of least square mean of the PK parameter $C_{max,ss}$ for galantamine falls above the 80% lower reference limit.

Determination of Sample Size

A total of 40 normal healthy adult, male and female study participants were dosed in the study.

T/R ratio=90%-111%
Expected Intra-Subject C.V (%)~18%
Significance Level=5%
Power=80%
Bioequivalence Limits=80-125%

Based on the above estimate, calculated sample size of 40 study participants was sufficient to establish bioequivalence between two formulations with adequate power, considering 10% dropouts due to adverse events or non-compliance or due to personal reasons. Forty healthy adult, male and female study participants were sufficient for the study.

Results
Demographics and Other Baseline Characteristics

TABLE 13

Demographics summary of all participants within the study (N = 40).

| Parameters | Age (yrs) | Weight (kg) | Height (cms) | BMI (kg/m²) |
|---|---|---|---|---|
| Mean (SD) | 35.9 (9.06) | 66.1 (9.68) | 160.1 (9.20) | 25.7 (2.49) |
| Median | 35.5 | 64.0 | 158.8 | 25.7 |
| CV % | 25.2 | 14.7 | 5.7 | 9.7 |
| Range | 21.0-56.0 | 50.0-90.9 | 143.5-179.0 | 20.0-29.9 |

Treatment Compliance

All the study participants ingested the study drug; this was confirmed by direct observation of administration of study drug as well as by performing hand and mouth checks and further ascertained by the presence of plasma benzgalantamine and Galantamine concentrations in individual blood samples following drug administration.

Pharmacokinetic Results:

The pharmacokinetic parameters were calculated by linear mixed effects model. The pharmacokinetic parameters were statistically analyzed to compare the Test and Reference formulations with regard to $C_{max,ss}$, and $AUC_{0-24}$.

Figure 4:
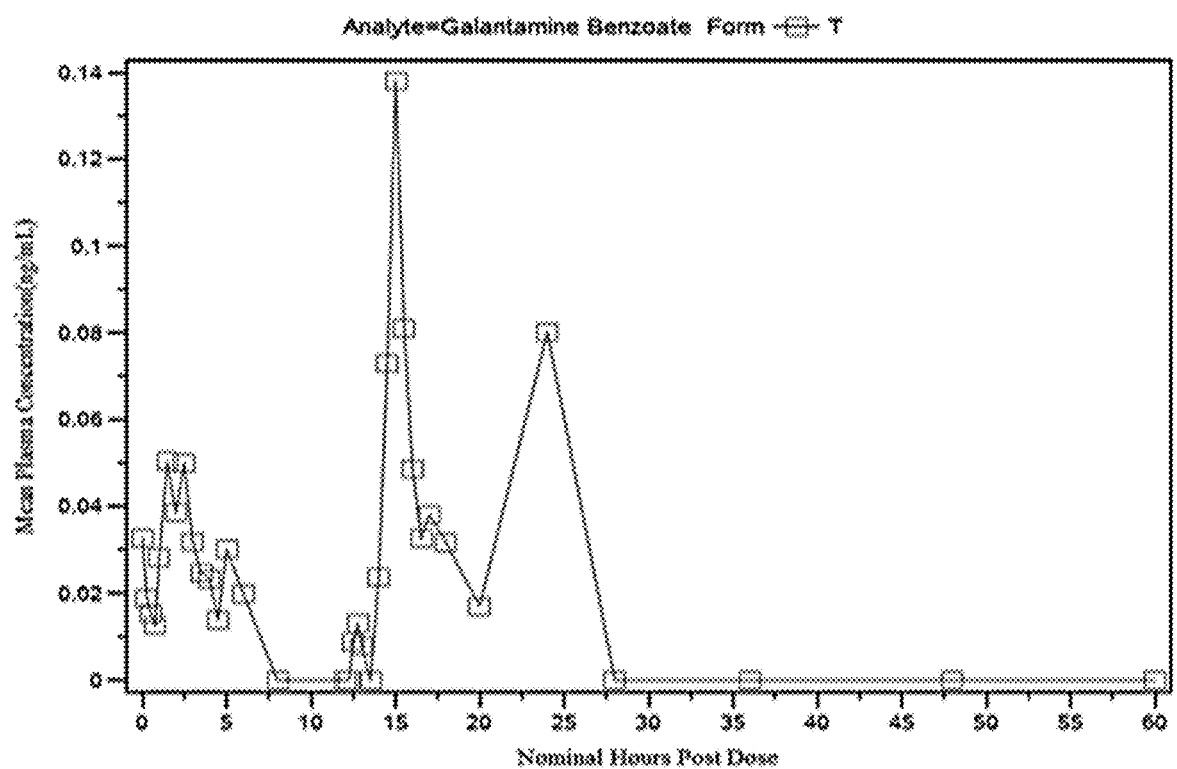
FIG. 4: Mean plasma benzgalantamine concentrations Vs. Time Plots-Linear Scale. Clinical study evaluating the disclosed benzgalantamine delayed-release tablets, 5 mg vs. Razadyne® ER (galantamine extended-release capsules) 8 mg.
Figure 5:
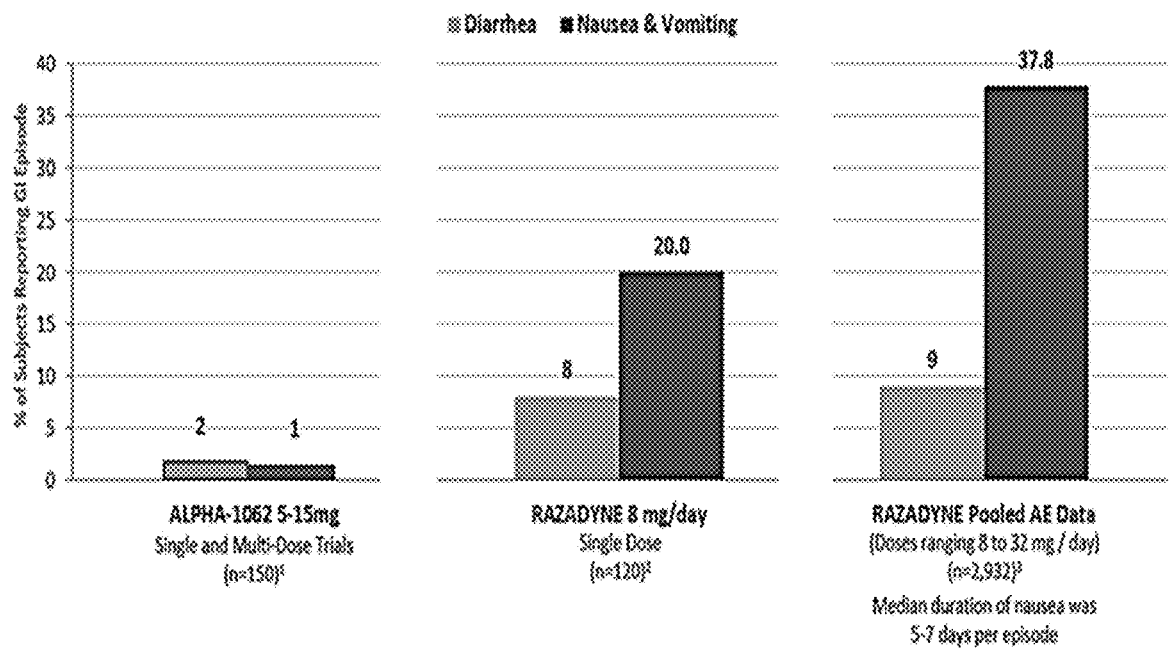
FIG. 5: Comparison of the incidence of gastrointestinal adverse events in subjects who were treated with the disclosed pharmaceutical composition comprising benzgalantamine or a single dose galantamine composition (Razadyne® ER (galantamine extended-release capsules) 8 mg). [1]The benzgalantamine data was consolidated from different clinical studies, including the bioequivalence trial of benzgalantamine vs immediate release (IR) (Example 2: benzgalantamine Delayed Release Tablet 5 mg (T) vs. Galantamine Hydrobromide (Yabao) 4 mg tablet (RT)) and the bioequivalence trial of benzgalantamine vs. extended release (ER) (Example 3: benzgalantamine (delayed-release tablets 5 mg vs. Razadyne® ER (galantamine extended-release capsules) 8 mg). [2]Integrated Summary of Safety (ISS): Completed Phase 1 trials in healthy adults; J&J Reminyl (later renamed RAZADYNE®) NDA package submission (prior art), available on the World-Wide-Web at: accessdata.fda.gov/drugsatfda_docs/nda/2001/21-169_Reminyl.cfm. [3]RAZADYNE® full prescribing information (prior art).

The mean plasma concentration versus scheduled time plots (linear and log-linear scales) for Galantamine were obtained and are presented in FIG. 3. The mean plasma concentration versus scheduled time plots (linear and log-linear scales) for benzgalantamine were obtained and are presented in FIG. 4.

TABLE 14

Arithmetic Mean (SD) of Pharmacokinetic Parameters of Galantamine. *For $T_{max,SS}$, Median (Min, Max) are presented.

| | Galantamine | | | |
|---|---|---|---|---|
| PK Parameter (Units) | N | Treatment T (Test) | N | Treatment R (Reference) |
| $C_{maxss}$ | 40 | 42.101 (8.602) | 40 | 33.435 (6.825) |
| $AUC_{0\_24ss}$ | 40 | 533.947 (113.993) | 40 | 501.154 (122.33) |
| $AUC_{0\_12ss}$ | 40 | 280.211 (54.375) | 40 | 312.845 (69.029) |
| Fluctuation % | 40 | 134.479 (34.811) | 40 | 106.521 (25.862) |
| $C_{avg}$ | 40 | 22.876 (4.478) | 40 | 23.416 (5.677) |
| $C_{tau}$ | 40 | 16.283 (4.548) | 40 | 16.293 (7.073) |
| $C_{minss}$ | 40 | 11.897 (3.564) | 40 | 9.333 (3.53) |
| CLss_F | 40 | 0.017 (0.004) | 40 | 0.017 (0.004) |
| Swing | 40 | 2.844 (1.393) | 40 | 2.898 (1.131) |
| $T_{maxss}$ | 40 | 3 (1, 15.5) | 40 | 5 (1, 6.5) |
| HL_Lambda_z | 40 | 11.533 (1.471) | 40 | 12.69 (1.977) |
| Lambda_z | 40 | 0.061 (0.008) | 40 | 0.056 (0.009) |
| $T_{minss}$ | 40 | 6.885 (6.492) | 40 | 3.038 (8.025) |

*For $T_{max}$, Median (Min, Max) are presented.

TABLE 15

Statistical Results of Assessment of bioavailability of Galantamine steady state study benzgalantamine Delayed Release Tablets 5 mg (Form T) with Razadyne ® ER (Galantamine extended-release capsules) 8 mg (Form R).

| | Geometric Means | | Ratio | CV % | 90% Confidence Interval | Power: |
|---|---|---|---|---|---|---|
| PK Parameter | Test | Reference | | | | |
| | Ln-transformed: | | | | | |
| Log ($C_{maxss}$) (ng/mL) | 41.6814 | 32.8507 | 126.88 | 13.12 | (120.62, 133.47) | 1.62 |
| log($AUC_{[0-24]ss}$) (ng · hr/mL) | 527.4567 | 492.0781 | 107.19 | 8.41 | (103.76, 110.73) | 100.00 |

TABLE 16

Analysis of Variance for Galantamine (test (T) Vs reference (R))

| | P-Value | | |
|---|---|---|---|
| PK Parameter | Sequence | Period | Treatment |
| Log ($C_{maxss}$)(ng/mL) | 0.3199 | 0.0164* | 0.0000* |
| log($AUC_{[0-4]ss}$)(ng · hr/mL) | 0.7814 | 0.0020* | 0.0009* |

The GM Ratio with 90% CI of Ratio galantamine estimates of $C_{max,ss}$ and $AUC_{0-24ss}$ values of the benzgalantamine delayed release tablet 5 mg (Test) over those of the Razadyne® ER (galantamine extended-release capsules) 8 mg (reference) were 126.88 (120.62, 133.47) and 107.19 (103.76, 110.73) respectively (Table 15). The 90% CI for $AUC_{0-24,ss}$ of the disclosed composition (test) was within 80-125% range for Galantamine (Table 15). The two formulations, i.e., benzgalantamine delayed release Tablet 5 mg (test) and Razadyne® ER (galantamine extended-release capsules) 8 mg (reference) are similar in bioavailability under fasting conditions with respect to $AUC_{0-24ss}$.

Gastrointestinal Adverse Events

TABLE 17

Incidence of gastrointestinal adverse events. N = Number of subjects with incidence of adverse events (AEs). % = Percentage of the adverse event calculated by total number of study subjects that participated in the study

| Body System/ Adverse Event | Reported Incidence by Treatment Groups Fasting Bioequivalence Study Study No. 03333/22-23 | |
|---|---|---|
| | Test Treatment (T) | Reference Treatment (R) |
| Gastro Intestinal Disorders | | |
| Nausea | — | 1 (2.5%) |
| Vomiting | — | 1 (2.5%) |
| Diarrhea | 1 (2.5%) | — |
| Total | 1 (2.5%) | 2 (5%) |

A total of 3 gastrointestinal adverse events (AE) were reported. Of these 3 AE, 2 AE (i.e., Nausea and Vomiting) were reported during period-I, 1 AE (i.e., Diarrhea) was reported during period-II. No Serious Adverse Events, Significant Adverse Events or Deaths occurred in this study.

Overall subjects who were administered the disclosed compositions showed lower incidence of gastrointestinal adverse events in comparison to the RAZADYNE® galantamine extended-release capsules 8 mg (reference) (Table 17). This further demonstrates that the disclosed compositions comprising benzgalantamine and an enteric coating configured for dissolution at pH 5.5 or above show surprising, advantageous dissolution and release profiles and improved pharmacokinetic properties in comparison to the reference composition comprising Galantamine, advantageously resulting in a reduced incidence of gastrointestinal adverse events.

Conclusion

Overall, the disclosed compositions show an improved pharmacokinetic profile over the Razadyne® ER (galantamine extended-release capsules) 8 mg (reference). Thereby, the disclosed composition results in an increased $C_{max,ss}$ of Galantamine while maintaining an AUC of Galantamine ($AUC_{0-24,ss}$) comparable to the extended-release reference formulation (90% CI within 80-125% range for Galantamine) (Table 14 and 15).

A higher $C_{max}$ leads to high levels of efficacy, while the observation of an equivalent AUC means that overall, the same amount of drug is being absorbed.

A higher $C_{max,ss}$ of Galantamine for the disclosed compositions compared to Razadyne® ER (galantamine extended-release capsules) 8 mg (reference) but the same AUC results in greater benefit to the patient and is desirable. Whereas the comparative Razadyne® ER (galantamine extended-release capsules) 8 mg (reference) provides constant slow release of galantamine the disclosed compositions provide a more acute release of benzgalantamine followed by conversion to galantamine after the pH sensitive enteric coat breaks in the intestine at or above pH 5.5.

The disclosed compositions result in a higher $C_{max}$ than the Razadyne® ER (galantamine extended-release capsules) 8 mg (reference), but a lower $C_{max}$ than the immediate release galantamine 4 mg tablets (reference example 3) and a similar AUC to both reference formulations thus provide a benefit to a patient over both reference formulations, as adverse effects, in particular gastrointestinal adverse events are reduced while treatment efficacy is maintained. Such beneficial effects of the disclosed compositions could not have been expected by person skilled in the art.

Example 4: Fed State Clinical Study (Benzgalantamine (ALPHA-1062) Delayed Release 5 mg Tablet Compared to Galantamine Hydrobromide (Yabao) 4 mg Tablet)

An open label, balanced, randomized, single-dose, two-treatment, two-period two-way crossover study to evaluate the relative bioavailability of Galantamine Benzoate Delayed Release 5 mg tablet compared to Galantamine Hydrobromide (Yabao) 4 mg tablet in healthy adult subjects under fed (nourished) conditions.

Methodology

Male and female study participants were enrolled for an open label, balanced, randomized, single oral dose, two-treatment, two-period two-way crossover relative bioavailability study. A total of 51 (including reserve volunteers) normal, healthy, adult, human study participants were enrolled to evaluate relative bioavailability of oral formulations. All subjects either received test product or reference product in each period according to the randomization schedule after ensuring maintenance of pre-dose restrictions (fasting for 10.00 hours prior to start of consumption of high fat high calories breakfast and drug product administration in sitting posture with 240±2 mL of drinking water at ambient temperature).

On dosing days, meals with a standardized menu were given as per the following schedule. Standardized meals were the same for all study participants in all the periods.

| Day | Breakfast | Lunch | Snack | Dinner |
|---|---|---|---|---|
| D-1 | — | — | — | 11.50 hours pre dose |
| Dosing Day (D) | 30 minutes pre-dose* | 04.00 hours post dose | 08.00 hours post dose | 12.00 hours post dose |
| D + 1 | 24.00 hours post dose | 28.00 hours post dose | 32.00 hours post dose | 36.00 hours post dose |

*High Fat High Calorie Breakfast

Post dose meals were uniform in all the clinical periods and served at the same time in each study period. Due to safety reasons, meals were provided in bed during the entire study. No extra snacks or beverages were served during the study. Information on the amount of meal consumed and the time of consumption of meal was recorded in the study participants' CRF. Study participants not meeting the requirement of 10.00 hours fasting prior to start of consumption of high fat high calorie breakfast were not eligible for dosing and discontinued from the study. No meals were provided for at least 04.00 hours post dose.

Participants were allowed to engage in normal activities without any physical exertion throughout their stay in the CPU in all study periods. The movements of the participants inside the CPU were supervised by the Clinical staff as and when required they were escorted to toilets to avoid injuries and prevent any untoward incidents.

Study Activities

Presentation and obtaining of informed consent form, urine drug screening including alcohol, vitals, Physical Examination, C-SSRS Assessment, Serum pregnancy test (only for female study participants), Covid Rapid Antigen test, body and baggage search, maintenance of pre-dose restrictions and provision of a uniform diet on check in day.

A blood sample for evaluation of CYP2D6 Genotype was collected during Period-I check-in only.

Body weight (kg) was recorded at the time of check-in (only in period-I) and at the time of post study.

ECG was measured within 24 hours prior to dosing of each period i.e., at the time of check-in, and at 03.00, 36.00 hours post dose (±60 minutes) and at the time of post study assessment.

Pre-dose safety monitoring, dosing, sample collection and processing as well as safety monitoring, maintenance of post-dose restrictions and a uniform diet were provided throughout their stay.

Study participants were served dinner on D-1 to ensure minimum of 10.00 hours fasting prior to the start of a high fat high calorie breakfast. After consumption of the high fat high calorie breakfast, a single oral dose of either the test (T) or the reference product (R) was administered orally with 240±2 mL of drinking water at ambient temperature in each period under fed conditions.

The below-mentioned Test product (treatment T) and the Reference product (treatment R) were administered:

| | |
|---|---|
| Test Treatment (T) | Galantamine Benzoate DR Tablet 5 mg Manufactured by: Alcami Corporation Manufactured for: Alpha Cognition |
| Reference Treatment (R) | Galantamine Hydrobromide (Yabao) 4 mg tablet Manufactured by: Yabao Pharmaceutical Co., Ltd. Beijing. China Manufactured for: Yabao Pharmaceutical Co., Ltd. Beijing. China |

The total duration of participation for each subject was approximately 32 days including screening and washout period.

Bioanalytical Methods

Plasma samples were analyzed for Galantamine Benzoate and Galantamine using a validated LC-MS/MS analytical method developed at the CRO, Vimta Labs Ltd. Analysis of samples was performed under yellow monochromatic light condition.

Pharmacokinetic Blood Sampling

A total of 20 blood sampling time points were collected, including Pre-dose (00.00 hour) and post-dose samples in each period.

In each period, 02 samples of pre-dose (each 05 mL) were collected within 90 minutes prior to consumption of high fat high calorie breakfast, to check for interference from contaminants or endogenous components at the retention time of peaks of interest and to analyze for lack of measurable drug concentrations by adding internal standard (ISTD).

Post dose samples were collected at 00.25, 00.50, 00.75, 01.00, 01.50, 02.00, 02.50, 03.00, 03.50, 04.00, 04.50, 05.00, 06.00, 08.00, 12.00, 16.00, 24.00, 36.00 and 48.00 hours post-dose.

For PK of Galantamine Benzoate (Only for Test Product) post dose samples (each 05 mL) collected at 00.25, 00.50, 00.75, 01.00, 01.50, 02.00, 02.50, 03.00, 03.50, 04.00, 04.50, 05.00, 06.00, 08.00 and 12.00 hours were considered.

For PK of Galantamine (for both T and R) post dose samples (each 05 mL) collected at 00.25, 00.50, 00.75, 01.00, 01.50, 02.00, 02.50, 03.00, 03.50, 04.00, 04.50, 05.00, 06.00, 08.00, 12.00, 16.00, 24.00, 36.00 and 48.00 hours were considered.

Note: All clinical activities were performed under yellow monochromatic light conditions.

Pharmacokinetic Analysis

The following pharmacokinetic parameters were calculated for Galantamine Benzoate (only for test) and Galantamine (for T & R) in plasma using Phoenix® WinNonlin® 8.0 or higher version (Pharsight Corporation, USA) or SAS® 9.4 with Enterprise Guide 7.1 or higher version.

Primary parameters: $C_{max}$, $AUC_{0-t}$ and $AUC_{0-\infty}$.

Secondary parameters: Tmax, kel, $AUC_{0-t}/AUC_{0-\infty}$, AUC % extrap, $t_{1/2}$, $T_{lag}$, Vz/F and Cl/F.

Statistical Analysis

Statistical analysis was performed on pharmacokinetic data of samples assayed and quantified for Galantamine Benzoate and Galantamine in plasma using SAS® 9.4 with Enterprise Guide or higher version for Windows (SAS Institute Inc., Cary, NC, USA).

Descriptive Statistics

The descriptive statistics (such as count (N), mean, median, minimum, maximum, standard deviation (SD) and coefficient of variation (% CV) for the relevant pharmacokinetic parameters was estimated for both of the Tests and Reference formulations.

The geometric mean and coefficient of variation was estimated for $C_{max}$, $AUC_{0-t}$ and $AUC_{0-\infty}$. In this study, an inferential statistics linear regression model was used.

Assessment of Bioavailability

Assessment of bioequivalence was done based on the 90% confidence intervals of the differences of Geometric least squares treatment means for Ln-transformed $C_{max}$, $AUC_{0-t}$ and $AUC_{0-\infty}$ of Galantamine obtained after single-dose administration under fed conditions.

Figure 7:
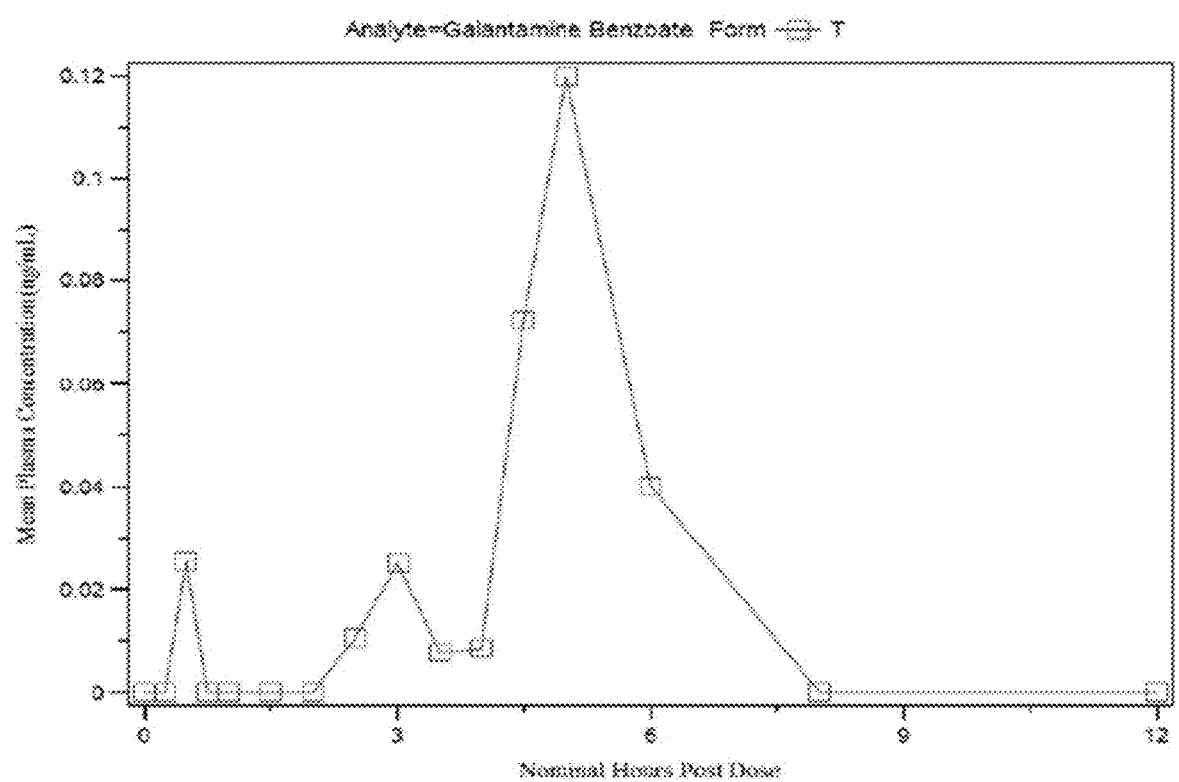
FIG. 7: Mean Plasma benzgalantamine Concentrations Vs. Time Plots-Linear Scale.

The acceptance criteria for bioequivalence were that the entire confidence intervals for the difference of means of Ln-transformed $C_{max}$, $AUC_{0-t}$ and $AUC_{0-\infty}$ would be fall within 80.00%-125.00%. A plot of Mean Plasma Galantamine Concentrations Vs. Time Plots-Linear Scale is shown in FIG. 6. A plot of Mean Plasma Galantamine Benzoate Concentrations Vs. Time Plots-Linear Scale is shown in FIG. 7.

Pharmacokinetic Results:

TABLE 18a

Arithmetic Mean (SD) of Pharmacokinetic Parameters of Galantamine

| PK Parameter (Units) | Galantamine | | | |
|---|---|---|---|---|
| | N | Treatment T (Test) | N | Treatment R (Reference) |
| $C_{max}$ (ng/mL) | 34 | 29.247 (10.3162) | 34 | 30.672 (5.5630) |
| $AUC_{0-t}$ (ng · hr/mL) | 34 | 282.521 (69.0699) | 34 | 327.713 (73.2138) |
| $AUC_{0-\infty}$ (ng · hr/mL) | 34 | 295.023 (73.5248) | 34 | 338.157 (77.4419) |
| *Tmax (hr) | 34 | 6.00 (3.00, 16.00) | 34 | 2.26 (0.50, 8.10) |
| Kel (1/hr) | 34 | 0.080 (0.0155) | 34 | 0.076 (0.0144) |
| $t_{1/2}$ (hr) | 34 | 9.028 (2.1504) | 34 | 9.354 (1.5560) |
| AUC Ratio (%) | 34 | 96.069 (4.9030) | 34 | 97.087 (2.6951) |

TABLE 18a-continued

Arithmetic Mean (SD) of Pharmacokinetic Parameters of Galantamine

| PK Parameter (Units) | Galantamine | | | |
|---|---|---|---|---|
| | N | Treatment T (Test) | N | Treatment R (Reference) |
| AUC_% extrap_obs# (%) | 34 | 3.931 (4.9030) | 34 | 2.913 (2.6951) |
| $T_{lag}$ (hr) | 34 | 3.07 (2.034) | 34 | 0.07 (0.128) |
| Vz_F_obs (mL) | | NE | | NE |
| Cl_F_obs (mL/hr) | | NE | | NE |

*For $T_{max}$, Median (Min, Max) are presented.

TABLE 18b

Arithmetic Mean (SD) of Pharmacokinetic Parameters of Galantamine Benzoate

| PK Parameter (Units) | Galantamine Benzoate | |
|---|---|---|
| | N | Treatment T (Test) |
| $C_{max}$ (ng/mL) | 34 | 0.201 (0.4298) |
| $AUC_{0-t}$ (ng · hr/mL) | 11 | 0.478 (0.7629) |
| $AUC_{0-\infty}$ (ng · hr/mL) | 0 | NE |
| *Tmax (hr) | 34 | 0.00 (0.00, 6.00) |
| Kel (1/hr) | 0 | NE |
| $t_{1/2}$ (hr) | 0 | NE |
| AUC Ratio (%) | 0 | NE |
| AUC_% extrap_obs# (%) | 0 | NE |
| $T_{lag}$ (hr) | 11 | 3.48 (1.380) |
| Vz_F_obs (mL) | — | NE |
| Cl_F_obs (mL/hr) | — | NE |

*For Tmax, Median (Min, Max) are presented.
NE: Not Estimated.

TABLE 19

Statistical analysis results for the assessment of bioequivalence of Galantamine under fed conditions (N = 34).

| PK Parameter | Geometric Means | | Ratio | CV % | 90% Confidence Interval |
|---|---|---|---|---|---|
| | Test | Reference | | | |
| | LN-Transformed: | | | | |
| $C_{max}$ (ng/mL) | 27.5510 | 30.1572 | 91.36 | 30.16 | (80.91, 103.15) |
| $AUC_{0-t}$ (ng · hr/mL) | 275.1816 | 320.1572 | 85.97 | 8.96 | (82.87, 89.19) |
| $AUC_{0-\infty}$ (ng · hr/mL) | 286.7159 | 329.9088 | 86.91 | 8.98 | (83.76, 90.17) |

The 90% CI for $C_{max}$, AUC0-t and AUC0-∞ were within 80.00-125.00 % range for Galantamine.

Conclusion

The study evaluated the relative bioavailability of oral formulations of Galantamine Benzoate DR Tablet 5 mg with Galantamine Hydrobromide (Yabao) 4 mg tablet, in normal healthy, adult, human male and female study participants. Each participant was given the test and the reference product based on a randomized, two-way cross-over in fed condition with a washout period of 07 days.

The GM Ratio with 90% CI galantamine estimates for $C_{max}$, $AUC_{0-t}$ and $AUC_{0-\infty}$ values of the Galantamine Benzoate DR Tablet 5 mg (Test treatment) over those of the Galantamine Hydrobromide (Yabao) 4 mg tablet (Reference treatment) were 91.36 (80.91, 103.15), 85.97 (82.87, 89.19) and 86.91 (83.76, 90.17) respectively.

The 90% CI for $C_{max}$, $AUC_{0-t}$ and $AUC_{0-\infty}$ were within 80.00-125.00% range for Galantamine.

Based on the above-mentioned criteria, it was concluded that the two formulations, i.e., Galantamine Benzoate DR Tablet 5 mg (T) and Galantamine Hydrobromide (Yabao) 4 mg tablet (R) were bioequivalent under the fed condition.

Overall, both the Test and Reference formulations when given under fed conditions have been well tolerated.

Galantamine Vs. Galantamine Hydrobromide

The following tables summarize data from Example 2 (Fasted State), Example 3 (Steady State) and Example 4 (Fed State).

TABLE 20

Summary of $T_{max}$ values from Fasting State, Steady State and Fed State Studies

| Study | Median $T_{max}$ |
|---|---|
| Fasting State (Example 2, from Table 7a) | 2.5 hours |
| Steady State (Example 3, from Table 14) | 3 hours |
| Fed State (Example 4, from Table 18a) | 6 hours |

In all of the studies, Galantamine Benzoate DR Tablet 5 mg (Benzgalantamine), was coated with a methacrylic acid enteric coating ("Acryl-Eze II (enteric)", see Table 1).

TABLE 21

Bioequivalence Studies vs. Immediate Release

| PK Parameter | Alpha-1062 Prodrug Delayed Release 5 mg (n = 36) | Gal HBr Immediate Release 4 mg (n = 36) | % to Reference Drug (80-125%) |
|---|---|---|---|
| $AUC_{0-\infty}$ (ng · hr/mL) Fasted State | 306.8 | 321.5 | 95% |
| $C_{max}$ (ng/mL) Fasted State | 30.7 | 40.5 | 76% |
| $AUC_{0-\infty}$ (ng · hr/mL) Fed State | 286.7 | 329.9 | 87% |
| $C_{max}$ (ng/mL) Fed State | 27.6 | 30.2 | 91% |

TABLE 22

Bioequivalence Study vs. Extended Release

| PK Parameter | Alpha-1062 Prodrug Delayed Release 5 mg (n = 20) | Gal HBr Immediate Release 8 mg (n = 20) | % to Reference Drug (80-125%) |
|---|---|---|---|
| $AUC_{0-24}$ (ng · hr/mL) Steady State | 527.5 | 492.1 | 107% |
| $C_{max}$ (ng/mL) Steady State | 41.7 | 32.8 | 127% |

Conclusions

1. Under fasting or steady-state conditions, the $T_{max}$ is from 2.5 to 3 hours. To achieve these $T_{max}$ values, a subject may be either: (a) under fasting conditions (eat no food for at least 10 hours before administration and eat food at 4 hours after administration; or (b) under steady state conditions (eat no food at least 10 hours before administration and eat food at 1 hour after administration, for example. The average gastric emptying time under fasting conditions when one consumes a cup of water is estimated to be 1 hour.

2. Under Fed conditions, the $T_{max}$ is about 6 hours. To achieve this $T_{max}$ value, a subject should eat food 30 minutes before administration and 4 hours after administration.
3. The AUC data show that the prodrug Alpha-1062 (Delayed Release) is bioequivalent to galantamine hydrobromide (Immediate Release and Extended-Release forms).
4. The $C_{max}$ for Alpha-1062 is bracketed between Immediate Release and Extended Release.

Example 5: Methods of Achieving Specific Pharmcokinetic Effects by Administering Zunveyl (Galantamine Prodrug) Vs. Razadyne ER (Galantamine Hydrobromide)

The following compare Absorption and Distribution of the RAZADYNE® ER label to novel aspects of ZUN-VEYL® label:
RAZADYNE® ER Label, (Absorption and Distribution)
Galantamine is absorbed with time to peak concentration of about 2.5 to 3 hours. The absolute bioavailability of galantamine is about 90%.
ZUNVEYL® Label
Effect of Food: Food did not affect the $C_{max}$ or AUC of galantamine, but $T_{max}$ was 6 hours, when ZUNVEYL was administered with food.
UNEXPECTED ADVANTAGES OF DELAYING TIME TO PEAK CONCENTRATION: The galantamine prodrug ZUNVEYL® achieves a relatively delayed time to peak concentration of about 2.5 to 3 hours compared to the comparable time to peak concentration of about 1 hour for galantamine hydrobromide (RAZADYNE® ER). The delayed release formulation was designed to release in the small intestine so that it would take longer post-administration to achieve a time to peak concentration compared galantamine-IR (both under fasting conditions). A further delay in the time to peak concentration (to 6 hours) can be achieved by administering ZUNVEYL® with food. The delayed $T_{max}$ may allow a potentially greater therapeutic effect to be achieved over a longer period of time. The pharmacokinetic properties of the methods described herein are therefore beneficial and may represent improvements over the earlier RAZADYNE formulations. The prodrug design allows ZUNVEYL® to remain inactive until after first pass metabolism in the liver, which then converts benzgalantamine to active galantamine. The delayed-release formulation protects from peripheral and central cholinergic side effects and minimizes stomach absorption, enabling targeted delivery to the intestine and may minimize central emetic activation. ZUNVEYL® is the first and only FDA-approved acetylcholinesterase inhibitor to utilize prodrug enteric-coated, delayed-release technology to enhance acetylcholine levels while minimizing absorption in the stomach and overstimulation of neurons in the GI nervous system.

Following the period of conversion of benzgalantamine to active galantamine, circulating levels of benzgalantamine were not measurable in our studies. $AUC_{0-t}$ and elimination related parameters ($AUC_{0-\infty}$, AUCextrapolation, Kel and $T_{1/2}$) for galantamine benzoate have not been estimated due to insufficiently measurable concentration profile (i.e., almost all values are zero or Below Limit of Quantification (BLQ) at all times). So, the maximum concentrations ($C_{max}$ points) were also observed to be zero. Therefore ln (0)=is not mathematically predictable so statistical analysis is performed after applying the transformed log.

Example 6: Methods of Decreasing Pharmaceutical Load by Administering Zunveyl® (Galantamine Prodrug) Vs. Razadyne ER (Galantamine Hydrobromide), Achieved by Reducing Effective Dosage Strengths Across Dosing Regimen The pharmaceutical load of benzgalantamine is decreased by reducing effective dosage strengths across a dosing regimen, based on difference in dosages of the ZUNVEYL® label (Recommended Dosage and Administration), and the RAZADYNE® ER label.
Recommended Dosage and Administration
Dosage
The recommended starting dosage is 5 mg twice a day (10 mg/day) by mouth. Increase to initial maintenance dosage of 10 mg twice daily (20 mg/day) after a minimum of 4 weeks, based on clinical response and tolerability. Dosage may be increased to the maximum recommended dosage of 15 mg twice a day (30 mg/day) after a minimum of 4 weeks at 10 mg twice daily.
Administration
ZUNVEYL can be taken with or without food. ZUN-VEYL should not be taken with alcohol. Swallow whole; do not split, crush or chew. Ensure adequate fluid intake during treatment. Interruption of Therapy: If therapy has been interrupted for more than three days, the patient should be restarted at the lowest dosage and the dosage escalated to the current dose.
Recommended Dosage in Patients with Hepatic Impairment
No dosage adjustment is recommended for patients with mild hepatic impairment (Child-Pugh score of 5-6). In patients with moderate hepatic impairment (Child-Pugh score of 7-9), the dosage should generally not exceed 10 mg twice daily (20 mg/day). The use of ZUNVEYL in patients with severe hepatic impairment (Child-Pugh score of 10-15) is not recommended.
Recommended Dosage in Patients with Renal Impairment
In patients with creatinine clearance of 9 to 59 mL/min, the dosage should generally not exceed 10 mg twice daily (20 mg/day). In patients with creatinine clearance less than 9 mL/min, the use of ZUNVEYL is not recommended.
Examples of Dosage Forms
RAZADYNE® ER (galantamine hydrobromide extended-release capsules):
  8 mg white opaque, size 4 hard gelatin capsules with the inscription "GAL 8"—bottles of 30 (50458-387-30)
  16 mg pink opaque, size 2 hard gelatin capsules with the inscription "GAL 16"—bottles of 30 (NDC 50458-388-30)
  24 mg caramel opaque, size 1 hard gelatin capsules with the inscription "GAL 24"—bottles of 30 (NDC 50458-389-30)
ZUNVEYL®:
ZUNVEYL delayed-release tablets are enteric coated and supplied in child-resistant packages as follows:
  5 mg white tablet debossed with "B05" in grey-bottles of 60 (NDC 84054-005-60)
  10 mg purple tablet debossed with "B10" in grey-bottles of 60 (NDC 84054-010-60)
  15 mg grey tablet debossed in dark grey-bottles of 60 (NDC 84054-015-60)
A steady-state of galantamine from ZUNVEYL® is achieved within one week, within two weeks, within three weeks or within four weeks.

Example 7: Stability of the Disclosed Compositions

TABLE 23

Summary of stability results-Benzgalantamine (ALPHA-1062) delayed release tablets 5 mg. RH: room humidity; M: months.

| | | Storage (Test Interval Range) | | | | | |
|---|---|---|---|---|---|---|---|
| | | Batch 1 | | Batch 2 | | Batch 3 | |
| Attribute | Acceptance Criteria | 25° C./ 75% RH (range in 12M) | 40° C./ 60% RH (range in 6M) | 25° C./ 75% RH (range in 12M) | 40° C./ 60% RH (range in 6M) | 25° C./ 75% RH (range in 12M) | 40° C./ 60% RH (range in 6M) |
| Appearance | White to off-white, round, convex, coated tablet laser printed with B05 in grey packaged in a white, round, plastic bottle with pharmaceutical coil, desiccant, intact induction seal, and child resistant cap. | Conforms | Conforms | Conforms | Conforms | Conforms | Conforms |
| Assay | 90.0% to 110.0% of label claim (content uniformity) | 95.6 to 97.5 | 97.0 to 98.8 | 93.5 to 95.7 | 93.2 to 95.8 | 95.0 to 98.5 | 94.7 to 97.9 |
| Galantamine benzoylester N-oxide | no more than 0.5% | <0.10 to <0.10 | <0.10 to 0.19 | <0.10 to <0.10 | <0.10 to 0.15 | <0.10 to <0.10 | <0.10 to 0.18 |
| Any individual impurity | no more than 0.2% | <0.10 to <0.10 | <0.10 to <0.10 | <0.10 to <0.10 | <0.10 to <0.10 | <0.10 to <0.10 | <0.10 to <0.10 |
| Total impurities | No more than 1.5% | <0.10 to <0.10 | <0.10 to 0.20% | <0.10 to <0.10 | <0.10 to 0.2 | <0.10 to <0.10 | <0.10 to 0.2 |
| Dissolution | Acid stage, no individual release, >10% | 0 | 0 | 0 | 0 | 0 | 0 |
| | Buffer stage, not less than 80% (Q) release at 60 min | 93 to 97 | 94 to 98 | 91 to 95 | 90 to 96 | 92 to 97 | 94 to 97 |
| Water content | For information only at time of test. Current acceptance criteria: not more than 2.0% | 0.37 to 1.37 | 0.57 to 0.89 | 0.32 to 1.20 | 0.38 to 0.55 | 0.35 to 1.37 | 0.42 to 0.49 |

TABLE 24

Summary of stability results-Benzgalantamine (ALPHA-1062) delayed release tablets 10 mg. RH: room humidity; M: months

| | | Storage (Test Interval Range) | | | | | |
|---|---|---|---|---|---|---|---|
| | | Batch 1 | | Batch 2 | | Batch 3 | |
| Attribute | Acceptance Criteria | 25° C./ 75% RH (range in 12M) | 40° C./ 60% RH (range in 6M) | 25° C./ 75% RH (range in 12M) | 40° C./ 60% RH (range in 6M) | 25° C./ 75% RH (range in 12M) | 40° C./ 60% RH (range in 6M) |
| Appearance | Purple, round, convex, coated, laser printed B10 tablet, packaged in a white round plastic bottle with intact induction seal, desiccant and child resistant cap. Tablets may contain multi-colored specks. | Conforms | Conforms | Conforms | Conforms | Conforms | Conforms |
| Assay | 90.0% to 110.0% of label claim (content uniformity) | 97.6 to 100 | 97.5 to 98.4 | 98.8 to 99.6 | 97.5 to 103.2 | 94.7 to 101.8 | 94.7 to 97.5 |
| Galantamine benzoylester N-oxide | no more than 0.5% | <0.10 to 0.16 | <0.10 to 0.32 | <0.10 to <0.10 | <0.10 to 0.22 | <0.10 to <0.10 | <0.10 to 0.24 |
| Any individual impurity | no more than 0.2% | <0.10 to <0.10 | <0.10 to <0.10 | <0.10 to <0.10 | <0.10 to 0.14 | <0.10 to <0.10 | <0.10 to 0.15 |
| Total impurities | NMT 1.5% | <0.10 to 0.2 | <0.10 to 0.40 | <0.10 to <0.10 | <0.10 to 0.4 | <0.10 to <0.10 | <0.10 to 0.4 |
| Dissolution | Acid stage, no individual release, >10% | 10 | 0 | 0 | 0 | 0 | 0 |
| | Buffer stage, not less than 80% (Q) release at 60 min | 96 to 99 | 97 to 98 | 94 to 98 | 90 to 96 | 92 to 96 | 87 to 92 |
| Water content | For information only at time of test. Current acceptance criteria: no more than 2.0% | 0.61 to 1.20 | 0.57 to 1.05 | 0.45 to 1.56 | 0.45 to 0.55 | 0.46 to 1.52 | 0.49 to 0.54 |

TABLE 25

Summary of stability results-Benzgalantamine (ALPHA-1062) delayed release tablets 15 mg. RH: relative humidity; M: months

| | | Storage (Test Interval Range) | | | | | |
|---|---|---|---|---|---|---|---|
| | | Batch 1 | | Batch 2 | | Batch 3 | |
| Attribute | Acceptance Criteria | 25° C./ 75% RH (range in 12M) | 40° C./ 60% RH (range in 6M) | 25° C./ 75% RH (range in 12M) | 40° C./ 60% RH (range in 6M) | 25° C./ 75% RH (range in 12M) | 40° C./ 60% RH (range in 6M) |
| Appearance | Gray, round, convex, coated, laser printed B15 tablet packaged in a white round plastic bottle with intact induction seal, desiccant and child resistant cap. Tablets may contain multi-colored specks | Conforms | Conforms | Conforms | Conforms | Conforms | Conforms |
| Assay | 90.0% to 110.0% of label claim (content uniformity) | 99.6 to 101.3 | 97.9 to 100.0 | 96.9 to 100.2 | 97.8 to 98.6 | 98.0 to 99.0 | 94.1 to 97.6 |
| Galantamine benzoylester N-oxide | no more than 0.5% | <0.10 to <0.10 | 0.11 to 0.23 | <0.10 to <0.10 | <0.10 to 0.24 | 0.49 to 0.54 | <0.10 to 0.24 |
| Any individual impurity | no more than 0.2% | <0.10 to <0.10 | <0.10 to <0.10 | <0.10 to <0.10 | <0.10 to <0.10 | <0.10 | <0.10 to 0.10 |
| Total impurities | no more than 1.5% | <0.10 to <0.10 | 0.11 to 0.2 | <0.10 to <0.10 | <0.10 to 0.2 | <0.10 | <0.10 to 0.2 |
| Dissolution | Acid stage, no individual release, >10% | 0 | 0 | 0 | 0 | 0 | 0 |
| | Buffer stage, not less than 80% (Q) release at 60 min | 97 to 102 | 91 to 94 | 88 to 96 | 81 to 88 | 91 to 94 | 83 to 95 |
| Water content | For information only at time of test. Current acceptance criteria: no more than 2.0% | 0.40 to 1.21 | 0.43 to 0.86 | 0.47 to 1.27 | 0.42 to 0.51 | 0.44 to 1.36 | 0.46 to 0.62 |

The disclosed compositions comprising benzgalantamine (ALPHA-1062) gluconate as crystalline solid form A (anhydrous form) (5 mg, 10 mg and 15 mg) were tested for stability at 25° C./75% RH for 12 months and under accelerated conditions at 40° C./60% RH for 6 months.

The compositions showed high stability of the tablet formulation and API upon storage under the tested conditions. No impurities or decomposition products were detected, showing high chemical stability of benzgalantamine within the composition. Further, no changes in dissolution under acid stage and buffered stage were observed, when compared to the dissolution data shown in example 1 (measured after preparation of the compositions). Since API solubility (dissolution) is different for different crystalline forms of benzgalantamine gluconate, similar dissolution profiles at an initial time point (after preparation) and also after storage indicates no change in the crystalline form.

The compositions comprising benzgalantamine as crystalline solid form A (anhydrous form) thus possess high chemical and crystalline stability and advantageous dissolution properties even upon long term storage and under accelerated conditions.

REFERENCES

Baakman et al., First in human study with a prodrug of galantamine: Improved benefit-risk ratio? Alzheimers Dement (N Y). 2016 Jan. 20; 2 (1): 13-22.

Ho M D, Ring N, Amaral K, Doshi U, Li A P. Human Enterocytes as an In Vitro Model for the Evaluation of Intestinal Drug Metabolism: Characterization of Drug-Metabolizing Enzyme Activities of Cryopreserved Human Enterocytes from Twenty-Four Donors. Drug Metab Dispos. 2017 June; 45 (6): 686-691. doi: 10.1124/dmd.116.074377. Epub 2017 Apr. 10. PMID: 28396528.

Rudakova E V, Boltneva N P, Makhaeva G F. Comparative analysis of esterase activities of human, mouse, and rat blood. Bull Exp Biol Med. 2011 November; 152 (1): 73-5. English, Russian. doi: 10.1007/s10517-011-1457-y. PMID: 22803044.

Bakker C, van der Aart J, Hart E P, Klaassen E S, Bergmann K R, van Esdonk M J, Kay D G, Groeneveld G J. Safety, pharmacokinetics, and pharmacodynamics of Gln-1062, a prodrug of galantamine. Alzheimers Dement (N Y). 2020 Oct. 13; 6 (1): e12093. doi: 10.1002/trc2.12093. PMID: 33083515; PMCID: PMC7551138.

What is claimed is:

1. A method of effectively reducing the pharmaceutical load of galantamine relative to oral administration of galantamine in a subject in need of galantamine therapy for the treatment of mild to moderate dementia of the Alzheimer's type, the method comprising orally administering a dosage form of benzgalantamine gluconate according to the following dosage regime:
   administering a starting dosage of 5 mg benzgalantamine gluconate, twice daily, for a minimum of four weeks.

2. The method according to claim 1, further comprising administering a maintenance dosage of 10 mg benzgalantamine gluconate, twice daily, after the starting dosage has been administered for the minimum of four weeks.

3. The method according to claim 2, wherein the 10 mg of benzgalantamine gluconate is administered for at least four weeks.

4. The method according to claim 3, further comprising administering a maximum dosage of 15 mg benzgalantamine gluconate, twice daily after administering the 10 mg benzgalantamine gluconate.

5. The method according to claim 1, wherein a steady state of galantamine is achieved within one week.

6. The method according to claim 1, wherein the dosage form is a tablet.

7. The method according to claim 5, wherein the dosage form is a delayed release tablet.

8. The method according to claim 5, wherein the dosage form comprises calcium silicate.

9. The method according to claim 7, wherein the dosage form comprises at least one of colloidal silicon dioxide, mannitol, and methacrylic acid.

10. The method according to claim 6, wherein the delayed release tablet comprises an enteric coating comprising methacrylic acid.

11. The method according to claim 10, wherein the enteric coating comprises a methacrylic acid-ethyl acrylate copolymer.

12. A method of effectively administering galantamine to a subject in need of treatment for mild to moderate dementia of the Alzheimer's type, the method comprising orally administering a dosage form of benzgalantamine gluconate according to the following dosage regime:
    administering a starting dosage of 5 mg benzgalantamine gluconate, twice daily, for a minimum of four weeks.

13. The method according to claim 12, further comprising administering a dosage of 10 mg benzgalantamine gluconate, twice daily, after the starting dosage has been administered for the minimum of four weeks.

14. The method according to claim 13, further comprising administering a maximum dosage of 15 mg benzgalantamine gluconate, twice daily.

15. The method according to claim 12, wherein a steady state of galantamine is achieved within one week.

16. The method according to claim 12, wherein the dosage form is a tablet.

17. The method according to claim 16, wherein the dosage form is a delayed release tablet.

18. The method according to claim 12, wherein the dosage form comprises calcium silicate.

19. The method according to claim 12, wherein the dosage form comprises at least one of colloidal silicon dioxide, mannitol, and methacrylic acid.

20. The method according to claim 17, wherein the delayed release tablet comprises an enteric coating comprising methacrylic acid.

21. The method according to claim 18, wherein the enteric coating comprises a methacrylic acid-ethyl acrylate copolymer.

* * * * *